(12) United States Patent
Noda

(10) Patent No.: US 7,698,630 B2
(45) Date of Patent: Apr. 13, 2010

(54) DOCUMENT ADMINISTRATION APPARATUS, DOCUMENT ADMINISTRATION METHOD, STORAGE MEDIUM STORING COMPUTER-READABLE PROGRAM, AND PROGRAM

(75) Inventor: Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 492 days.

(21) Appl. No.: 10/858,072

(22) Filed: Jun. 2, 2004

(65) Prior Publication Data
US 2005/0162668 A1 Jul. 28, 2005

(30) Foreign Application Priority Data

| Jun. 13, 2003 | (JP) | 2003-169569 |
| Mar. 23, 2004 | (JP) | 2004-084046 |
| Apr. 22, 2004 | (JP) | 2004-126782 |

(51) Int. Cl.
G06F 17/24 (2006.01)
(52) U.S. Cl. .......... 715/232; 715/229; 715/230; 715/231; 715/233; 715/246
(58) Field of Classification Search .......... 715/511, 715/512, 520, 526, 539, 902, 229, 230, 231, 715/232, 233, 246, 272, 273
See application file for complete search history.

(56) References Cited

U.S. PATENT DOCUMENTS

| 4,118,122 A | * | 10/1978 | Rees et al. ............... 355/77 |
| 4,884,107 A | * | 11/1989 | Watanabe ............... 399/183 |
| 5,038,316 A | * | 8/1991 | Hempleman et al. ......... 715/531 |
| 5,991,760 A | * | 11/1999 | Gauvin et al. ............. 707/10 |
| 6,859,909 B1 | * | 2/2005 | Lerner et al. ............. 715/203 |
| 7,243,301 B2 | * | 7/2007 | Bargeron et al. .......... 715/205 |
| 7,337,389 B1 | * | 2/2008 | Woolf et al. ............. 715/230 |

FOREIGN PATENT DOCUMENTS

| JP | 2-295343 | 12/1990 |
| JP | 2001-034692 | 2/2001 |
| JP | 2001-101169 | 4/2001 |
| JP | 2001-222521 | 8/2001 |
| JP | 2002-207725 | 7/2002 |
| JP | 2003/067372 | 3/2003 |
| JP | 2003-067666 | 3/2003 |

* cited by examiner

*Primary Examiner*—Joshua D Campbell
(74) *Attorney, Agent, or Firm*—Fitzpatrick, Cella, Harper & Scinto

(57) ABSTRACT

The invention aims to provide a document administration apparatus for processing input original data, which comprises: a first memory for storing the original data; a mask data generator for generating mask data capable of masking at least one predetermined area of the original data; a second memory for storing the mask data generated by the mask data generator; a selector enabling to select the original data stored in the first memory and the mask data stored in the second memory; a display enabling to display the mask data selected by the selector in a state that the mask data is superposed on the original data, without changing the original data selected by the selector; and a mask data editor enabling to edit the mask data displayed on the display in the state that the mask data is superposed on the original data.

21 Claims, 37 Drawing Sheets

INVESTIGATION DATE ___ YEAR ___ MONTH ___ DAY   INSURANCE PERSON NUMBER ___   INSURANT NUMBER ___

RECOGNITION INVESTIGATION FORM (SPECIAL MENTION)

1 SPECIAL MENTION OF ITEMS CONCERNING PARALYSIS AND CONTRACTURE
  1-1 PRESENCE OF PARALYSES, 1-2 PRESENCE OF LIMITATION OF JOINT MOVABLE RANGE
    ( ) _____
    ( ) _____
    ( ) _____

2 SPECIAL MENTION OF ITEMS CONCERNING MOVEMENT
  2-1 TURNING OVER, 2-2 GETTING UP, 2-3 MAINTENANCE OF SITTING POSITION WITH BOTH FEET SET ON GROUND,
  2-5 MAINTENANCE OF STANDING POSITION WITH BOTH FEET, 2-6 WALKING, 2-7 TRANSFERRING
    ( ) _____
    ( ) _____
    ( ) _____

3 SPECIAL MENTION OF ITEMS CONCERNING COMPLEX OPERATIONS
  3-1 STANDING UP, 3-2 MAINTENANCE OF STANDING POSITION WITH ONE FOOT, 3-3 IN/OUT TO/FROM GENERAL DOMESTIC BATHTUB, 3-4 WASHING
    ( ) _____
    ( ) _____
    ( ) _____

4 SPECIAL MENTION OF ITEMS CONCERNING SPECIAL CARE, ETC.
  4-1 PRESSURE GANGRENE, 4-2 ONE-HAND LIFT UP TO BREAST, 4-3 DEGLUTITION, 4-4 MICTURITION DESIRE/ DEFECATION DESIRE, 4-5 SETTLEMENT AFTER URINATION, 4-6 SETTLEMENT AFTER DEFECATION, 4-7 MEAL INTAKE
    ( ) _____
    ( ) _____
    ( ) _____

5 SPECIAL MENTION OF ITEMS CONCERNING PERSONAL CARE, ETC.
  5-1 CLEANNESS, 5-2 DRESSING/UNDRESSING, 5-3 REACTION TO INSTRUCTION BY CARE SIDE, 5-4 TAKING OF MEDICINE, 5-5 CLEANING OF ROOM, 5-6 MANAGEMENT OF MONEY, 5-7 AWFUL FORGETTING, 5-8 DISREGARD FOR SURROUNDINGS
    ( ) _____
    ( ) _____
    ( ) _____

6 SPECIAL MENTION OF ITEMS CONCERNING COMMUNICATION
  6-1 EYESIGHT, 6-2 HEARING, 6-3 TRANSMISSION OF INTENTION, 6-4 REACTION TO INSTRUCTION, 6-5 UNDERSTANDING
    ( ) _____
    ( ) _____
    ( ) _____

7 SPECIAL MENTION OF ITEMS CONCERNING PROBLEM BEHAVIOR
  7 ACTION
    ( ) _____
    ( ) _____
    ( ) _____

8 SPECIAL MENTION OF ITEMS CONCERNING SPECIAL MEDICAL TREATMENT
  8 SPECIAL MEDICAL TREATMENT
    ( ) _____
    ( ) _____
    ( ) _____

※ PLEASE ADD FORM PROPERLY WHEN WRITTEN ITEMS CANNOT BE HELD ON THIS FORM

FIG. 4

[INVESTIGATION INFORMATION]     EXECUTED ON   YEAR  MONTH  DAY
                                INVESTIGATED ON  YEAR  MONTH  DAY

| | |
|---|---|
| CODE | : 20030317 |
| NAME | : KANNON TARO |
| AGE | : OCTOBER 10, 1935 (67 YEARS) |
| SEX | : MALE |
| INSURANCE NUMBER | : 9999-9999 |
| POSTAL CODE | : 108-8011 |
| ADDRESS 1 | : 3-12-15 MITA MINATO-KU TOKYO |
| ADDRESS 2 | : 402 MITA CITY BUILDING |
| PHONE NUMBER | : 03-3455-9672 (FAX 03-5443-0437) |
| LAST-TIME RECOGNITION RESULT | : |
| THIS-TIME RECOGNITION RESULT | :   YEAR   MONTH   DAY |
| NAME OF FAMILY | : KANNON HANAKO |
| POSTAL CODE OF FAMILY | : 108-8011 |
| ADDRESS 1 OF FAMILY | : 3-12-15 MITA MINATO-KU TOKYO |
| ADDRESS 2 OF FAMILY | : 402 MITA CITY BUILDING |
| PHONE NUMBER OF FAMILY | 03-3455-9672 (FAX 03-5443-0437) |
| RELATION TO SUBJECT PERSON | : SPOUSE |
| CURRENT SITUATION | : IN RESIDENCE |
| VISITING CARE (HOME HELP SERVICE) | : TIMES/MONTH |
| VISITING BATHING CARE | : TIMES/MONTH |
| VISITING NURSING | : TIMES/MONTH |
| VISITING REHABILITATION | : TIMES/MONTH |
| GUIDANCE OF MANAGEMENT FOR IN RESIDENCE RECUPERATION | : TIMES/MONTH |
| DAY CARE (DAY SERVICE) | : TIMES/MONTH |
| DAY REHABILITATION (DAY CARE) | : TIMES/MONTH |
| WELFARE TOOLS LOAN | : ITEMS |
| SHORT-TIME IN-HOSPITAL LIFE CARE (SPECIAL ELDERLY NURSING HOME) | : TIMES/DAY |
| SHORT-TERM IN-HOSPITAL RECUPERATION CARE (WELFARE INSTITUTION FOR ELDERLY PEOPLE, NURSING HOME) | : TIMES/DAY |
| SYMBIOSIS LIFE CARE FOR PEOPLE WITH DEMENTIA | : TIMES/DAY |
| LIFE CARE FOR PEOPLE IN SPECIFIC FACILITY | : TIMES/DAY |
| WELFARE TOOLS PURCHASE | : ITEMS/SIX MONTHS |
| MODIFICATION OF HOUSING | : NONE |
| LOCAL FRINGE BENEFIT | : |
| EXTRA-BENEFIT SERVICE | : |
| NAME OF FACILITY | : |
| POSTAL CODE OF FACILITY | : |
| ADDRESS 1 OF FACILITY | : |
| ADDRESS 2 OF FACILITY | : |
| PHONE NUMBER OF FACILITY | : |

INDEPENDENCE LEVEL OF HANDICAPPED ELDERLY PERSON : NORMAL    INDEPENDENCE LEVEL OF ELDERLY PERSON WITH DEMENTIA : NORMAL

<BASIS TIME FOR CERTIFICATION OF ELIGIBILITY FOR LONG-TERM CARE>     <INTERIM EVALUATION ITEM TABLE>

| (1) DIRECT LIFE HELP | 10 MIN. |
|---|---|
| DRESSING | 2.1 MIN. |
| EXCRETION | 1.0 MIN. |
| MEAL INTAKE | 3.9 MIN. |
| BATHING | 8.9 MIN. |
| MOVEMENT | 1.5 MIN. |
| (2) INDIRECT LIFE HELP | 6 MIN. |
| (3) PROBLEM BEHAVIOR - RELATION HELP | 1 MIN. |
| (4) ACTION RELATED TO FUNCTION TRAINING | 3 MIN. |
| (5) ACTION RELATED TO MEDICAL TREATMENT | 5 MIN. |
| ACTION RELATED TO MEDICAL TREATMENT | 4.2 MIN. |
| SPECIAL MEDICAL TREATMENT | 0.0 MIN. |
| | 25 MIN. |
| | 9 MIN. |

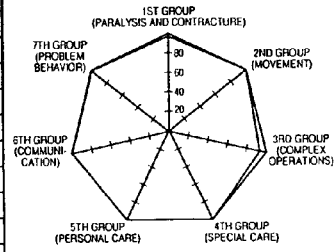

<POINTS OF INTERIM EVALUATION ITEMS>
(AVERAGES ARE SHOWN IN LOWER ROW)

| 1ST GROUP | 2ND GROUP | 3RD GROUP | 4TH GROUP | 5TH GROUP | 6TH GROUP | 7TH GROUP |
|---|---|---|---|---|---|---|
| 100.0 | 100.0 | 100.0 | 100.0 | 100.0 | 100.0 | 100.0 |
| 97.2 | 98.8 | 94.0 | 99.7 | 98.1 | 99.3 | 99.3 |

RESULT OF PRIMARY JUDGMENT (SIMULATION) : INDEPENDENCE     PRIMARY JUDGMENT WARNING CODE :

<SPECIAL MEDICAL TREATMENT>

| | | | |
|---|---|---|---|
| 1. MANAGEMENT OF DRIP | : | 7. TREATMENT OF TRACHEA INCISION | : |
| 2. CENTER VEIN NOURISHMENT | : | 8. NURSING OF PAIN | : |
| 3. DIALYSIS | : | 9. PASSING TUBE NOURISHMENT | : |
| 4. TREATMENT OF STOMA | : | 10. MONITOR MEASUREMENT | : |
| 5. OXYGEN THERAPY | : | 11. TREATMENT OF PRESSURE GANGRENE | : |
| 6. RESPIRATOR | : | 12. CATHETER | : |

1ST GROUP (PARALYSIS AND CONTRACTURE)
1. PARALYSIS   (LEFT-LEG)      :
               (RIGHT-LEG)     :
               (LEFT-LOWER LIMB)  :
               (RIGHT-LOWER LIMB) :
               (OTHER)         :
2. CONTRACTURE (SHOULDER JOINT) :
               (CUBITAL JOINT)  :
               (HIP JOINT)      :
               (ARTICULATIO GENUS) :
               (ANKLE)          :
               (OTHER)          :

2ND GROUP (MOVEMENT)
1. TURNING OVER                                :
2. GETTING UP                                  :
3. SITTING POSITION WITH BOTH FEET             :
4. SITTING POSITION WITHOUT USING BOTH FEET    :
5. STANDING POSITION WITH BOTH FEET            :
6. WALKING                                     :
7. TRANSFERRING                                :

3RD GROUP (COMPLEX OPERATIONS)
1. STANDING UP                                 :
2. STANDING POSITION WITH SINGLE FOOT          :
3. IN/OUT TO/FROM BATHTUB                      :
4. WASHING                                     :

4TH GROUP (SPECIAL CARE)
1. a. PRESSURE GANGRENE                        :
   b. SKIN DISORDER                            :
2. ONE-HAND LIFT UP TO BREAST                  :
3. DEGLUTITION                                 :
4. a. MICTURITION DESIRE                       :
   b. DEFECATION DESIRE                        :
5. SETTLEMENT AFTER URINATION                  :
6. SETTLEMENT AFTER DEFECATION                 :
7. MEAL INTAKE                                 :

5TH GROUP (PERSONAL CARE)
1. a. CLEANNESS OF ORAL CAVITY                 :
   b. PREENING                                 :
   c. HAIRDRESSING                             :
   d. NAIL CUTTING                             :
2. a. FASTENING/UNFASTENING OF BUTTON          :
   b. DRESSING/UNDRESSING OF UPPER WEAR        :
   c. DRESSING/UNDRESSING OF PANTS, ETC.       :
   d. DRESSING/UNDRESSING OF SOCKS             :
3. CLEANING OF ROOM                            :
4. INTERNAL USE OF MEDICINE                    :
5. MANAGEMENT OF MONEY                         :
6. AWFUL FORGETTING                            :
7. DISREGARD FOR SURROUNDINGS                  :

6TH GROUP (COMMUNICATION)
1. EYESIGHT                                    :
2. HEARING                                     :
3. TRANSMISSION OF INTENTION                   :
4. REACTION TO INSTRUCTION                     :
5. a. UNDERSTANDING OF DAILY ROUTINE           :
   b. SAYING OF BIRTH DATE                     :
   c. SHORT-TERM MEMORY                        :
   d. SAYING OF OWN NAME                       :
   e. UNDERSTANDING OF CURRENT SEASON          :
   f. UNDERSTANDING OF PLACE                   :

7TH GROUP (PROBLEM BEHAVIOR)
1. a. DELUSION OF INJURY                       :
   b. MAKING UP OF STORY                       :
   c. OPTICAL ILLUSION AND AUDITORY HALLUCINATION :
   d. UNSTABLE AFFECTION                       :
   e. REVERSAL DAY AND NIGHT                   :
   f. VIOLENT LANGUAGE AND ASSAULT             :
   g. REPETITION OF SAME STORY                 :
   h. LOUD VOICE                               :
   i. RESISTANCE AGAINST CARE                  :
   j. CONTINUOUS PROWL                         :
   k. NO COMPOSURE                             :
   l. IMPOSSIBLE TO RETURN AFTER GOING OUT     :
   m. INCLINABLE TO GO OUT ALONE               :
   n. COLLECTING MANIA                         :
   o. CARELESSNESS OF FIRE                     :
   p. DESTRUCTION OF THINGS AND CLOTHES        :
   q. DIRTY ACTION                             :
   r. ALLOTRIOPHAGY ACTION                     :
   s. SEXUAL TROUBLE ACTION                    :

FIG. 7

| | COMBINATION OF PAPER SIZES | EXPLANATION |
|---|---|---|
| ORIGINAL D-1 | A4 SINGLE-SIDED ORIGINAL + A4 SINGLE-SIDED ORIGINAL + A3 SINGLE-SIDED ORIGINAL<br>■ PAPER ORIGIAL<br><br>[A4 SINGLE-SIDED] [A4 SINGLE-SIDED] [A3 SINGLE-SIDED]<br><br>■ SCAN DATA (ORIGINAL DATA) | IN CASE OF DATA TRANSMISSION WITH ORIGINAL MIXED LOADING AND DOUBLE-SIDED ORIGINAL OFF, SCAN DATA OF FOLLOWING 3 PAGES ARE OBTAINED<br>· 1ST PAGE FRONT (A4)<br>· 2ND PAGE FRONT (A4)<br>· 3RD PAGE FRONT (A3) |
| ORIGINAL D-2 | A4 SINGLE-SIDED ORIGINAL + A4 SINGLE-SIDED ORIGINAL + A4 SINGLE-SIDED ORIGINAL + A4 SINGLE-SIDED ORIGINAL<br>■ PAPER ORIGIAL<br><br>[A4 SINGLE-SIDED] [A4 SINGLE-SIDED] [A4 SINGLE-SIDED] [A4 SINGLE-SIDED]<br><br>■ SCAN DATA (ORIGINAL DATA) | IN CASE OF DATA TRANSMISSION WITH DOUBLE-SIDED ORIGINAL OFF, SCAN DATA OF FOLLOWING 4 PAGES ARE OBTAINED<br>· 1ST PAGE FRONT (A4)<br>· 2ND PAGE FRONT (A4)<br>· 3RD PAGE FRONT (A4)<br>· 4TH PAGE FRONT (A4) |
| ORIGINAL D-3 | A4 SINGLE-SIDED ORIGINAL + A4 SINGLE-SIDED ORIGINAL + A4 DOUBLE-SIDED ORIGINAL<br>■ PAPER ORIGIAL<br><br>[A4 SINGLE-SIDED] [A4 SINGLE-SIDED] [A4 DOUBLE-SIDED FRONT] [A4 DOUBLE-SIDED BACK]<br><br>■ SCAN DATA (ORIGINAL DATA) | IN CASE OF DATA TRANSMISSION WITH ORIGINAL MIXED LOADING AND DOUBLE-SIDED ORIGINAL ON, SCAN DATA OF FOLLOWING 6 PAGES ARE OBTAINED<br>· 1ST PAGE FRONT (A4)<br>· 1ST PAGE BACK (A4) (BLANK)<br>· 2ND PAGE FRONT (A4)<br>· 2ND PAGE BACK (A4) (BLANK)<br>· 3RD PAGE FRONT (A4)<br>· 3RD PAGE BACK (A4) |

FIG. 8

| FORMAT OF MATERIAL | EXPLANATION |
|---|---|
| A3 DOUBLE STAPLING | ■ OUTPUT FORM<br>A3/LANDSCAPE/DOUBLE-SIDED COPY/LEFT SIDE (TWO POINTS) BINDING |
| OUTPUT O-1 | |

FIG. 15

| FIG. 25A |
| FIG. 25B |

FIG. 29

MASK POSITION PATTERN INFORMATION TABLE

| NO. | FILE NAME | FORM ID |
|---|---|---|
| 01 | mask position-A4A4A3-basic.iwd | 1 |
| 02 | mask position-A4A4A3-exception 1.iwd | 2 |
| 03 | mask position-A4A4A3-exception 2.iwd | 2 |
| 04 | mask position-A4A4A4-basic.iwd | 3 |
| 05 | mask position-A4A4A4-exception 1.iwd | 4 |
| 06 | mask position-A4A4A4-exception 2.iwd | 4 |
| 07 | mask position-A4A4A4-exception 3.iwd | 4 |

FIG. 30

FORM INFORMATION TABLE

| FORM ID | FORM PAGE ID | FORM INFORMATION |
|---|---|---|
| 1 | 1 | A4, P, T1 (X11, Y11, X12, Y12), T2 (X21, Y21, X22, Y22), . . . |
|   | 2 | A4, P, T1 (X11, Y11, X12, Y12), T2 (X21, Y21, X22, Y22), . . . |
|   | 3 | A3, L, T1 (X11, Y11, X12, Y12), T2 (X21, Y21, X22, Y22), . . . |
| 2 | 1 | A4, P, T1 (X11, Y11, X12, Y12), T2 (X21, Y21, X22, Y22), . . . |
|   | 2 | A4, P, T1 (X11, Y11, X12, Y12), T2 (X21, Y21, X22, Y22), . . . |
|   | 3 | A3, L, T1 (X11, Y11, X12, Y12), T2 (X21, Y21, X22, Y22), . . . |
| 3 | 1 | A4, P, T1 (X11, Y11, X12, Y12), T2 (X21, Y21, X22, Y22), . . . |
|   | 2 | A4, P, T1 (X11, Y11, X12, Y12), T2 (X21, Y21, X22, Y22), . . . |
|   | 3 | A4, P, T1 (X11, Y11, X12, Y12), T2 (X21, Y21, X22, Y22), . . . |
|   | 4 | A4, P, T1 (X11, Y11, X12, Y12), T2 (X21, Y21, X22, Y22), . . . |
| 4 | 1 | A4, P, T1 (X11, Y11, X12, Y12), T2 (X21, Y21, X22, Y22), . . . |
|   | 2 | A4, P, T1 (X11, Y11, X12, Y12), T2 (X21, Y21, X22, Y22), . . . |
|   | 3 | A4, P, T1 (X11, Y11, X12, Y12), T2 (X21, Y21, X22, Y22), . . . |
|   | 4 | A4, P, T1 (X11, Y11, X12, Y12), T2 (X21, Y21, X22, Y22), . . . |

FIG. 31

OUTPUT FORMAT INFORMATION TABLE

| MATERIAL FORMAT ITEM | REFERENCE DATA |
|---|---|
| "A3 DOUBLE STAPLING" | A3DoubleStaple.dat |
| "A3 NO STAPLING" | A3NoStaple.dat |
| "A4 DOUBLE STAPLING" | A4DoubleStaple.dat |

FIG. 32

```
=========== LOG ===========
FILE NAME    xxxx
DATA         yy. mm. dd

> 4TH PAGE: UPSIDE-DOWN PAGE IS DETECTED
  →AUTOMATIC CORRECTION
> 8TH PAGE: BLANK IS DETECTED
  →UNPROCESSED, AND PROCESS IS CONTINUED
> 10TH PAGE: PAGE ORDER INCONSISTENCY IS DETECTED
  →NOT PROCESSED
> 11TH PAGE: PAGE ORDER INCONSISTENCY IS DETECTED
  →NOT PROCESSED
> 10TH PAGE, 11TH PAGE: PAGES ORDER INCONSISTENCY
  →PAGES ARE REPLACED
> 13TH PAGE: UNREGISTERED FORM IS DETECTED
  →PROCESS IS STOPPED
=========== ===========
```

FIG. 33

FORM ABNORMALITY ADMINISTRATION TABLE

| PAGE NUMBER | MASK POSITION PATTERN FORM PAGE ID | ORIGINAL DATA FORM ID |
|---|---|---|
| 10 | 1 | 2 |
| 11 | 2 | 1 |

FIG. 37

STORAGE MEDIUM SUCH AS FD, CD-ROM, ETC.

| DIRECTORY INFORMATION |
|---|
| 1ST DATA PROC PROGRAM<br>GROUP OF PROGRAM CODES CORRESPONDING TO STEPS OF FLOW CHART SHOWN IN FIG. 18 |
| 2ND DATA PROC PROGRAM<br>GROUP OF PROGRAM CODES CORRESPONDING TO STEPS OF FLOW CHART SHOWN IN FIG. 25 |
| 3RD DATA PROC PROGRAM<br>GROUP OF PROGRAM CODES CORRESPONDING TO STEPS OF FLOW CHARTS SHOWN IN FIGS. 28-34 |
| 4TH DATA PROC PROGRAM<br>GROUP OF PROGRAM CODES CORRESPONDING TO STEPS OF FLOW CHART SHOWN IN FIG. 49 |

MEMORY MAP OF STORAGE MEDIUM

DOCUMENT ADMINISTRATION APPARATUS, DOCUMENT ADMINISTRATION METHOD, STORAGE MEDIUM STORING COMPUTER-READABLE PROGRAM, AND PROGRAM

BACKGROUND OF THE INVENTION

1. Field of the Invention

The present invention relates to document administration apparatus and method which obtain electronic data by reading a paper original existing as, e.g., a form and electrically form a predetermined material by using the obtained electronic data, a storage medium which stores a computer-readable program to achieve the document administration method, and a program itself which is used to achieve the document administration method.

2. Related Background Art

Presently, the country, prefectures, and municipalities such as cities, towns and villages adopt various systems, and thus provide various administrative services. For example, these systems and administrative services include nursing care insurance services for the people who need various cares, pension plans for physically handicapped people, and the like. Here, when a citizen intends to enjoy the right based on these services and systems, it is generally necessary to file an application to a service providing side (or a service provider).

In many cases, the application is filed by using a dedicated application document (i.e., application format). More specifically, the citizen enters and fills necessary items on the application document by using a pen and/or application software such as a word processor. Then, the service provider confirms the items which have been filled on the application document filed by the citizen (i.e., an applicant), and then examines based on the filled items whether the applicant has a right to receive the necessary service.

In this case, the service provider performs the examination on the basis of the application document filed by the applicant. Here, it should be noted that the application document includes the information which is necessary when the application is filed and the service is actually provided but is unnecessary when the content of the application document is examined, and the information which should be concealed with the object of protecting applicant's privacy and performing proper and fair examination. For example, personal information such as applicant's name, address and the like often becomes unnecessary and should be thus concealed in the examination.

For this reason, in the examination of the application document which concerns the administrative services and was filed by the citizen, it is necessary to form a document for examination on which specific sections are appropriately masked (concealed) with respect to each document. More specifically, to provide such a document, the application document is accepted, the accepted document is duplicated, the sections to be masked on the duplicated document are judged by an operator, and then the judged sections are actually painted by using a pen or the like.

Such an operation is inefficient because it is mainly performed manually. Moreover, in a case where the section to be masked has not been appropriately masked due to an operation mistake, there is a fear that a critical problem concerning human rights may occur from the viewpoint of privacy protection. In addition, because the original and the document for examination must be administrated respectively, it is troublesome to administrate the information as a whole.

To cope with such problems, Japanese Patent Application Laid-Open No. 2001-101169 proposes a system which forms an examination document as electronic data by converting an application document (i.e., an original) written on a predetermined application format with use of a scanner or through a predetermined application.

For example, this system is used to form a material to be examined to decide whether to apply insurance to an applicant in a public nursing care insurance system. More specifically, this system consists of a first processing unit for registering a definition of a paper constituting a document (i.e., an application document) in a storage unit, a second processing unit for actually registering the document in the storage unit according to the registered definition and also recording information concerning the registration of the paper constituting the document in the storage unit, and a third processing unit for registering a definition of mask information indicating a section to be masked when the paper is output, in the storage unit as one of the definitions of the paper constituting the document. Thus, the application document filled by the applicant is read by a scanner to generate image data, and the mask definition is applied to the generated image data to perform a concealing process, whereby the material to be considered when the insurance examination is performed can be appropriately formed.

On one hand, Japanese Patent Application Laid-Open No. 2002-207725 proposes a system which processes electronic data to have a form according to need in various services and business for opening information to public.

This system aims to perform a concealing process to a specific section on a PDF (Portable Document Format) document. More specifically, in this system, a PDF file including character codes is first input as original data from an original data input unit, the input original data is stored in a storage unit, the stored original electronic document (PDF file) is displayed on a document display unit, a concealing area is set on a part of the original electronic document by a concealing area setting unit through operator's handling to the displayed document, and then the set concealing area is stored in the storage unit.

Then, the character code in the original data is decompressed into bitmap data, and a part of the bitmap data is concealed by mask data, whereby intermediate data of TIFF (Tag Image File Format) is generated. Incidentally, the intermediate data is returned to the PDF data, and the processed data is then stored in the storage unit. As the result, the PDF file to which the concealing process has been performed to the area designated by the operator can be obtained.

However, in the system proposed in Japanese Patent Application Laid-Open No. 2001-101169, the mask process is directly performed to the read original image data on the basis of the predetermined mask definition. Thus, if the written contents to be concealed protrude beyond the predetermined area, it is necessary to correct the definitions themselves such as a predefined mask position, a predefined mask shape, and the like. Of course, because the application documents are filled with necessary items by an unspecified large number of applicants, various kinds of errors are made on the application documents by the various applicants. In other words, according to increase in the number of application documents, a correction process for mask definitions becomes extremely complicated, thereby inefficient.

In particular, because the mask process is directly performed to the original image data in this system, if the mask process is once performed, it is impossible to return the original image data to the state before the mask process is performed. That is, in a case where an operator intends to confirm the originally written content of the mask-processed area, the operator cannot confirm it.

Moreover, when the application document includes plural pages, that is, for example, when it is necessary to append a certificate of tax payment, a medical certificate and the like to the application document which has been filled with personal information of the applicant, there are a lot of cases with improper order on pages of the application document. Here, Japanese Patent Application Laid-Open No. 2001-101169 described as above does not disclose that, when page order of the application document to be read is different from defined order, such a difference is recognized. As the result, in a case where the technique disclosed in Japanese Patent Application Laid-Open No. 2001-101169 is simply applied, when the operator reads the application document, it is necessary to confirm entirely the page order of the application document, thereby inefficient. Moreover, when the operator makes a mistake in case of correcting the page order, there is a fear that the information to be necessarily concealed is not masked correctly. In such a case, privacy protection cannot be achieved, and thus there is a high possibility of occurring a critical problem concerning human rights.

On one hand, the above system disclosed in Japanese Patent Application Laid-Open No. 2002-207725 premises that the PDF text data is used as the target of the mask process, whereby this system is improper for a mask process to image data obtained by scanning a paper (i.e., an application document). Moreover, in this system, because the mask process is performed to the input original data, if the mask process is once performed, it is impossible to read and obtain the information existing at the mask-concealed area.

That is, such problems as described above can be eliminated by providing a system which can surely and easily perform the mask process to a predetermined area even what state the original data to be input is, and also by providing a system which can assure originality of the original data by not performing the mask process to the original data itself from the viewpoint of easy administration of information and assurance of originality.

SUMMARY OF THE INVENTION

The present invention which has been made to solve the above problems is featured by providing a document administration apparatus for processing input original data, which comprises: a first storage means adapted to store the original data; a mask data generation means adapted to generate mask data capable of masking at least one predetermined area of the original data; a second storage means adapted to store the mask data generated by the mask data generation means; a selection means adapted to be able to select the original data stored in the first storage means and the mask data stored in the second storage means; a display means adapted to be able to display the mask data selected by the selection means in a state that the mask data is superposed on the original data, without changing the original data selected by the selection means; and a mask data editing means adapted to be able to edit the mask data displayed on the display means in the state that the mask data is superposed on the original data.

BRIEF DESCRIPTION OF THE DRAWINGS

FIG. 2 is a diagram showing an example of an application document original input by a scanner from a multifunctional machine shown in FIG. 1;

FIG. 3 is a diagram showing an example of the application document original input by the scanner from the multifunctional machine shown in FIG. 1;

FIG. 4 is a diagram showing an example of the application document original input by the scanner from the multifunctional machine shown in FIG. 1;

FIG. 7 is a diagram showing examples of paper size combinations of the application document (original) set to the scanner of the multifunctional machine shown in FIG. 1;

FIG. 8 is a diagram showing an example of a paper size of an examination material output from the multifunctional machine shown in FIG. 1;

FIG. 15 is a diagram showing an example of a mask area setting screen to be displayed on the display unit of the host shown in FIG. 1;

FIG. 29 is a diagram showing an example of the structure of a mask position pattern information table;

FIG. 30 is a diagram showing an example of the structure of a form information table;

FIG. 31 is a diagram showing an example of an output format information table;

FIG. 32 is a schematic diagram showing an example of a log file;

FIG. 33 is a diagram showing an example of the structure of a form abnormality administration table;

FIG. 37 is a diagram for explaining a memory map of a storage medium which stores various data processing programs capable of being read by the document administration system according to the present invention.

DETAILED DESCRIPTION OF THE PREFERRED EMBODIMENTS

Figure 1:
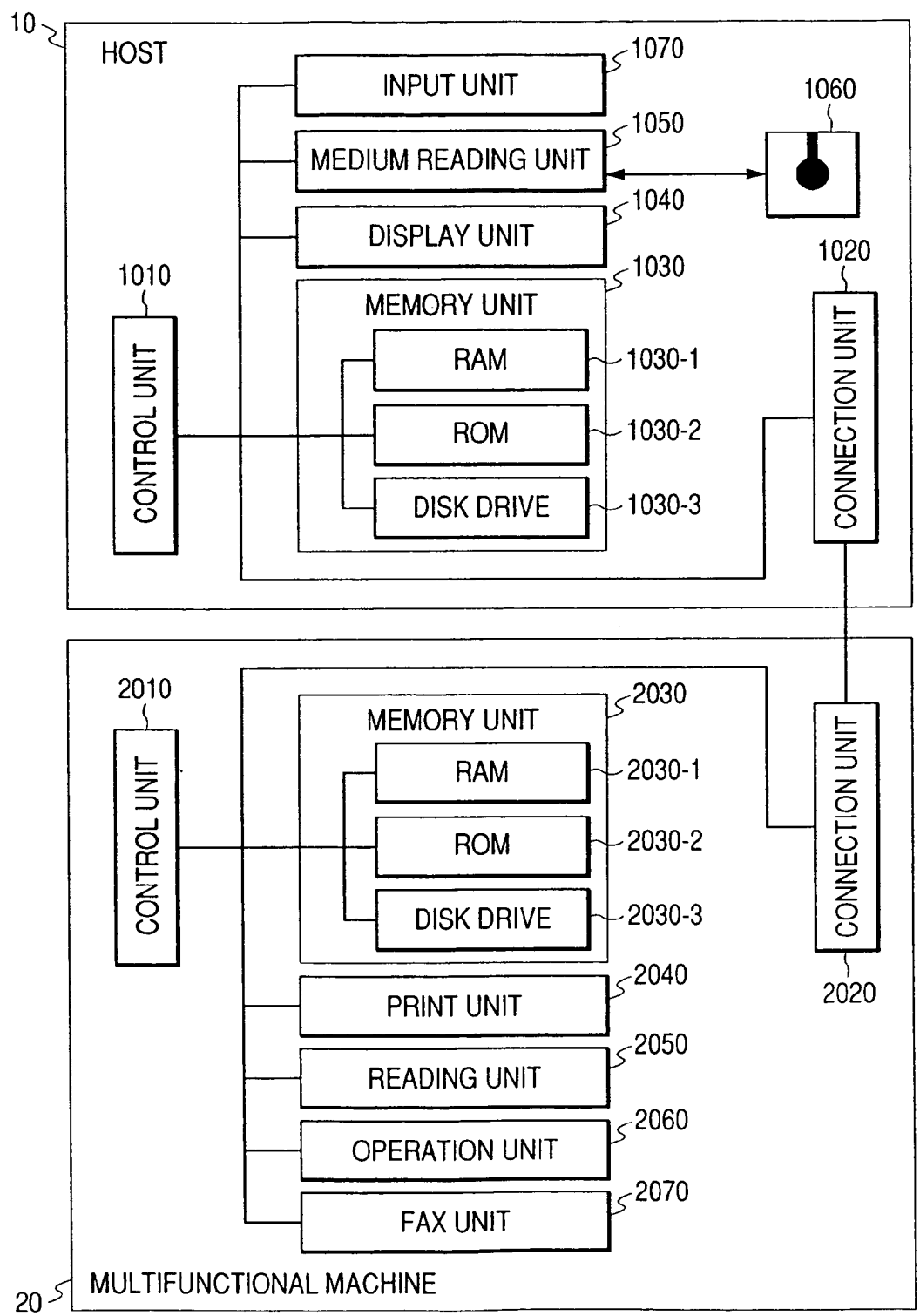
FIG. 1 is a block diagram showing the structure of a document administration system according to the first embodiment of the present invention.

FIG. 1 is a block diagram showing the structure of a document administration system to which a document administration apparatus according to the first embodiment of the present invention is applicable, and this system corresponds to a system in which a multifunctional machine 20 of performing an image process can communicate with a host 10 through a network or the like. It should be noted that the following explanation premises that the multifunctional machine 20 shown in FIG. 1 has functions to scan a paper original, generate original data by digitizing the scanned original, and transmit the original data to the arbitrary host 10. However, of course, the present invention is not limited to such a structure.

Figure 5:
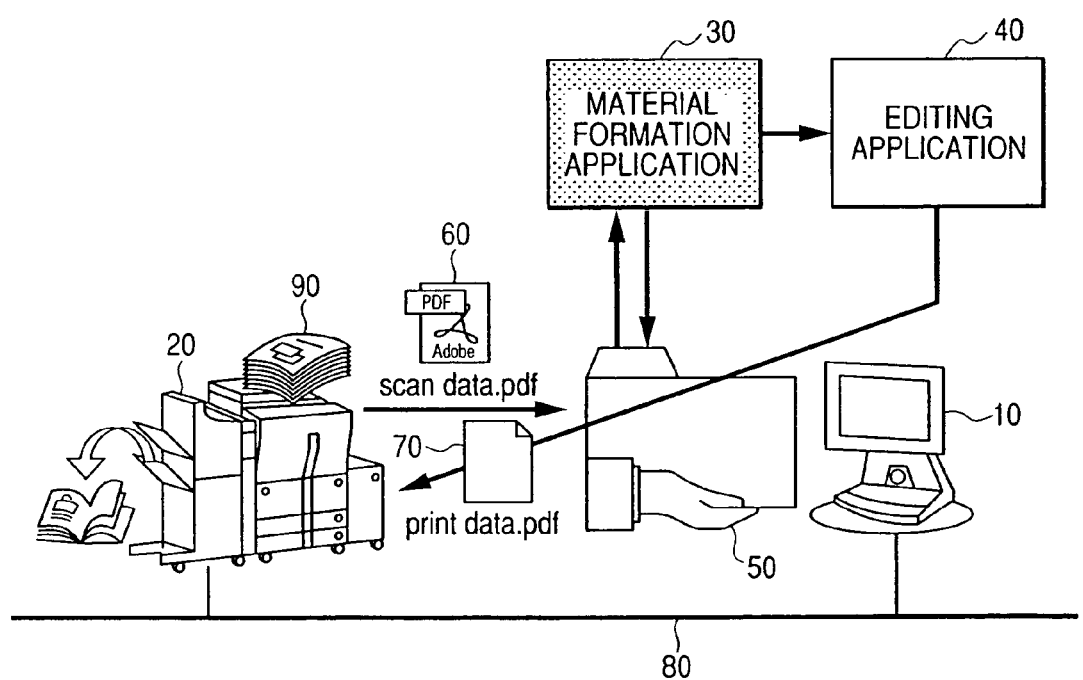
FIG. 5 is a diagram for explaining a data processing state of an application document in the document administration system shown in FIG. 1.

In FIG. 1, numeral 20 denotes the multifunctional machine which is a single printer having plural functions such as a copy function, a printer function, a facsimile function and the like (hereinafter, the multifunctional machine may be simply called a printer). As shown in FIG. 5, together with the host 10, a material formation application 30 and an editing application 40 both installed in the host 10, the multifunctional machine 20 is used form an application examination material based on an application document. Here, the material formation application 30 and the editing application 40 are downloaded from a disk device 1030-3 in a storage unit 1030 to a work memory such as a RAM 1030-1 or the like, and are executed as program modules by a control unit 1010 under the control of a not-shown OS (operating system). The details of these applications will be described later.

Numeral 1030 denotes the storage unit which consists of the RAM 1030-1, a ROM 1030-2 and the disk device 1030-3, and numeral 1010 denotes the control unit which consists of a CPU and the like. The control unit 1010 executes the module (program) downloaded in the RAM 1030-1 and entirely controls the host 10.

Numeral 1070 denotes an input unit which consists of a keyboard, a pointing device and the like, numeral 1050 denotes a medium reading unit which is structured to be able to read information stored in various media such as a flexible disk 1060, a CD-ROM, a DVD and the like, numeral 1040 denotes a display unit which appropriately displays an instruction screen and the like necessary to set and execute various applications, and numeral 1020 denotes a connection unit which is connected to a connection unit 2020 of the multifunctional machine 20 so that the host 10 can communicate with the multifunctional machine 20 based on a predetermined protocol.

In the multifunctional machine 20, numeral 2010 denotes a control unit which consists of a CPU and the like. The control unit 2010 executes various modules (programs) loaded in a RAM 2030-1 of a storage unit 2030, and entirely controls a print process of a print unit 2040, a scan process of a reading unit 2050, a data transmission/reception process of a FAX (or facsimile) unit 2070, a display process for inputs from an operation unit 2060 and a user interface, and the like.

The storage unit 2030 consists of the RAM 2030-1, a ROM 2030-2, a disk device 2030-3 and the like. Various optional devices, e.g., a finishing device such as a stapling sorter can be connected to the print unit 2040. Moreover, various original transportation devices such as an ADF (Automatic Document Feeder), an RDF (Recirculation Document Feeder) and the like can be connected to the reading unit 2050 to automatically scan an original image on the application document.

Incidentally, an area where the electronic data of the application document read from the reading unit 2050 is converted, stored and administrated in a specific file of a directory secured and administrated as a folder with a specific name is secured on the disk device 1030-3 in the storage unit 1030 of the host 10.

Figure 2:
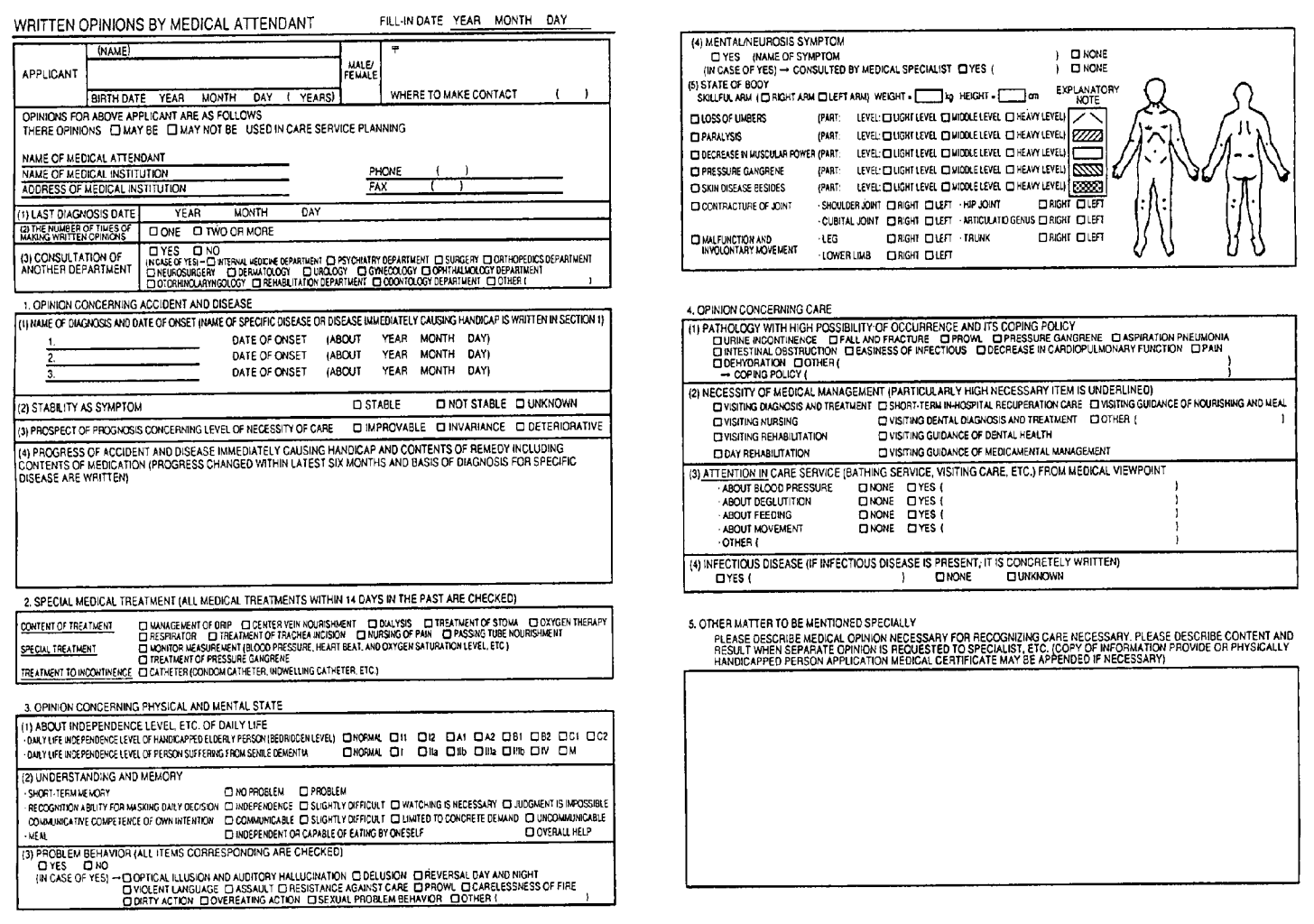

Moreover, as shown in FIGS. 2 to 4, it is assumed that the application document original has a form with a predetermined format previously printed, and that necessary items have already been written at predetermined positions on the form.

FIGS. 2 to 4 are diagrams showing examples of the forms of the application document original input by a scanner from the multifunctional machine 20 shown in FIG. 1. Here, although the document for a nursing care insurance service is used as the form by way of example in the present embodiment, the range to which the present invention is applied is not limited to the present embodiment and the background of the invention described as above. Moreover, the present invention is not applied only to an examination document formation process in some kind or another application process.

FIG. 2 shows a medical attendant's written opinion form on which various opinions by a medical attendant concerning nursing care insurance are written, FIG. 3 shows a recognition investigation form which is used by a care recognizer concerning nursing care insurance to investigate personal conditions of an insurant, and FIG. 4 shows an investigation item list form for the insurant concerning the nursing care insurance. It should be noted that kinds and contents of these forms are irrelevant to the essence of the present invention.

The present embodiment aims to form the examination material in which specific items in an application document are masked, by cooperation of the material formation application 30 and the editing application 40. However, the present invention is not limited to formation of the examination material. That is, the present invention is applicable to a situation that a concealing process to a predetermined area is necessary for input data.

Subsequently, a process in the system of performing document administration will be explained according to its processing order.

FIG. 5 is a diagram for explaining a data processing state of an application document in the document administration system shown in FIG. 1. In FIG. 5, the thick lines indicate the data flow, and the same parts as those in FIG. 1 are denoted by the same numerals as those in FIG. 1 respectively.

In FIG. 5, numeral 60 denotes scan data, and more specifically, the scan data 60 is equivalent to an application document original 90 which has been provided as an image file by a scanner function of the reading unit 2050 of the multifunctional machine 20. The image file 60 is the data of a predetermined file format, e.g., PDF (Portable Document Format) developed by Adobe Systems in United States.

Numeral 70 denotes print data. As described later in detail, the print data 70 is processed according to the material formation application 30 and the editing application 40 executed by the control unit 1010 of the host 10, whereby an arbitrary area in the print data is obtained as the masked (concealed) data. Here, it should be noted that the print data 70 may be output not only to the multifunctional machine 20 (used as an original input device) but also to an apparatus which has a printer function capable of performing communication through a network.

The multifunctional machine 20 and the host 10 both shown in FIG. 1 are connected to each other in the state of enabling to perform data communication by some communication means such as a network 80 or the like. Here, it is assumed in FIG. 1 that the multifunctional machine 20 can transmit electronic data to an arbitrary shared folder (see FIG. 5) provided in the disk device 1030-3 of the storage unit 1030 of the host 10.

Moreover, it is assumed in FIG. 1 that the electronic data transmitted from the multifunctional machine 20 can be stored in the arbitrary shared folder (e.g., "¥MaskManager¥Send" in the present embodiment) provided in the disk device 1030-3 of the storage unit 1030 of the host 10.

Figure 6:
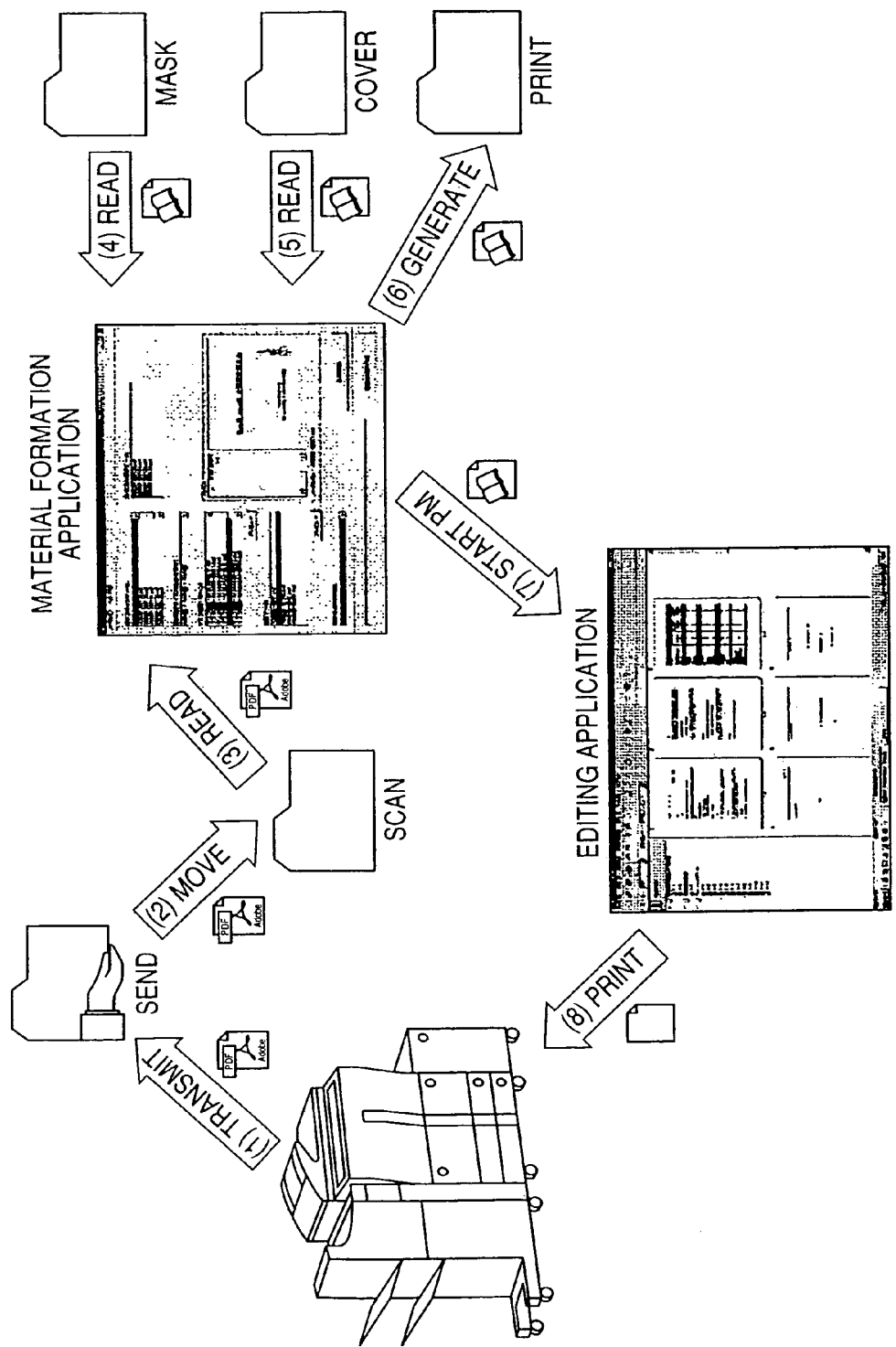
FIG. 6 is a diagram for explaining a data process in the document administration system according to the present invention.

FIG. 6 is a diagram for explaining a data process in the document administration system according to the present invention. Here, it should be noted that the data 60 shown in FIG. 5 is processed in due order according to steps (1) to (8) shown in FIG. 6.

The data process shown in FIG. 6 will be explained in due order. An original captured by the multifunctional machine 20 is first digitized to generate original data, the digitized original data is transmitted to the host 10, and the transmitted data is stored in a later-described send folder (step (1)). Then, the digitized original data is transferred from the send folder to a scan folder (step (2)), and the original data is read from the scan folder by the material formation application 30 (step (3)). Further, mask data already generated and stored in a mask folder and cover data already generated and stored in a cover folder are respectively read, whereby mask-processed material data is generated (steps (4) and (5)). The mask processing condition of the material data is confirmed by an operator, print data based on the examination material data (that is, necessary sections are masked and concealed on the application document) is generated (step (6)), and the generated print data is stored in a print folder. Then, the editing application (PM) 40 is started by the material formation application 30 (step (7)), and the operator performs a later-described predetermined editing operation by using the editing application 40. When the editing operation ends, the print data is transmitted to the multifunctional machine 20, and an actual print operation is performed (step (8)).

The material formation application 30 and the editing application 40 installed as a module group for achieving the present invention exist in the disk device 1030-3 of the storage unit 1030 of the host 10 shown in FIG. 1. The module group premises that the material formation application 30 and the editing application 40 have been already loaded on the RAM 1030-1 acting as a work area and are respectively in executable states.

Here, it should be noted that modules for achieving the present invention are obtained by program codes based on flow charts shown in later-explained FIGS. 13, 18, 20 to 26 and 35.

Moreover, it should be also noted that these modules and relative data can be installed from the medium reading unit 1050 such as a CD-ROM drive or the like provided in the host 10 to the multifunctional machine 20 through the host 10, and then the installed modules can be executed.

On the above premise, the data process according to the present invention will be explained in detail.

First, examples of input and output data used to explain the present embodiment will be explained.

In the present embodiment, a paper original (i.e., the application document original 90 in FIG. 5) is scanned by an operator through the scan function of the multifunctional machine 20 to generate electronic data (or digital data) as input data. It is often the case that the application document original 90 is a set of plural papers.

Examples of combinations of paper sizes and post-scan electronic data (referred to as original data hereinafter) in one set of the application document 90 are shown in FIG. 7.

That is, FIG. 7 is the diagram showing the examples of the paper size combinations of the paper originals read by the scanner of the multifunctional machine 20 shown in FIG. 1. In FIG. 7, each of originals D-1, D-2 and D-3 corresponds to the above-described set.

The original D-1 consists of two A4 portrait (or vertical) single-sided papers and one A3 landscape (or horizontal) single-sided paper, whereby the original data obtained by scanning the original D-1 in a single-sided mode constitutes one set consisting of two A4 portrait pages and one A3 landscape page. Therefore, when there are the ten originals D-1, the total 30-page data of ten sets is obtained.

The original D-2 consists of four A4 portrait single-sided papers, whereby the original data obtained by scanning the original D-2 in the single-sided mode consists of four A4 portrait pages. Therefore, when there are the ten originals D-2, the total 40-page data of ten sets is obtained.

The original D-3 consists of two A4 portrait single-sided papers and one A4 portrait single-sided paper, whereby the original data obtained by scanning the original D-3 in a double-sided mode consists of six A4 portrait pages of which the second and fourth pages are blank. Therefore, when there are the ten originals D-3, the total 60-page data of ten sets is obtained.

Figure 9:
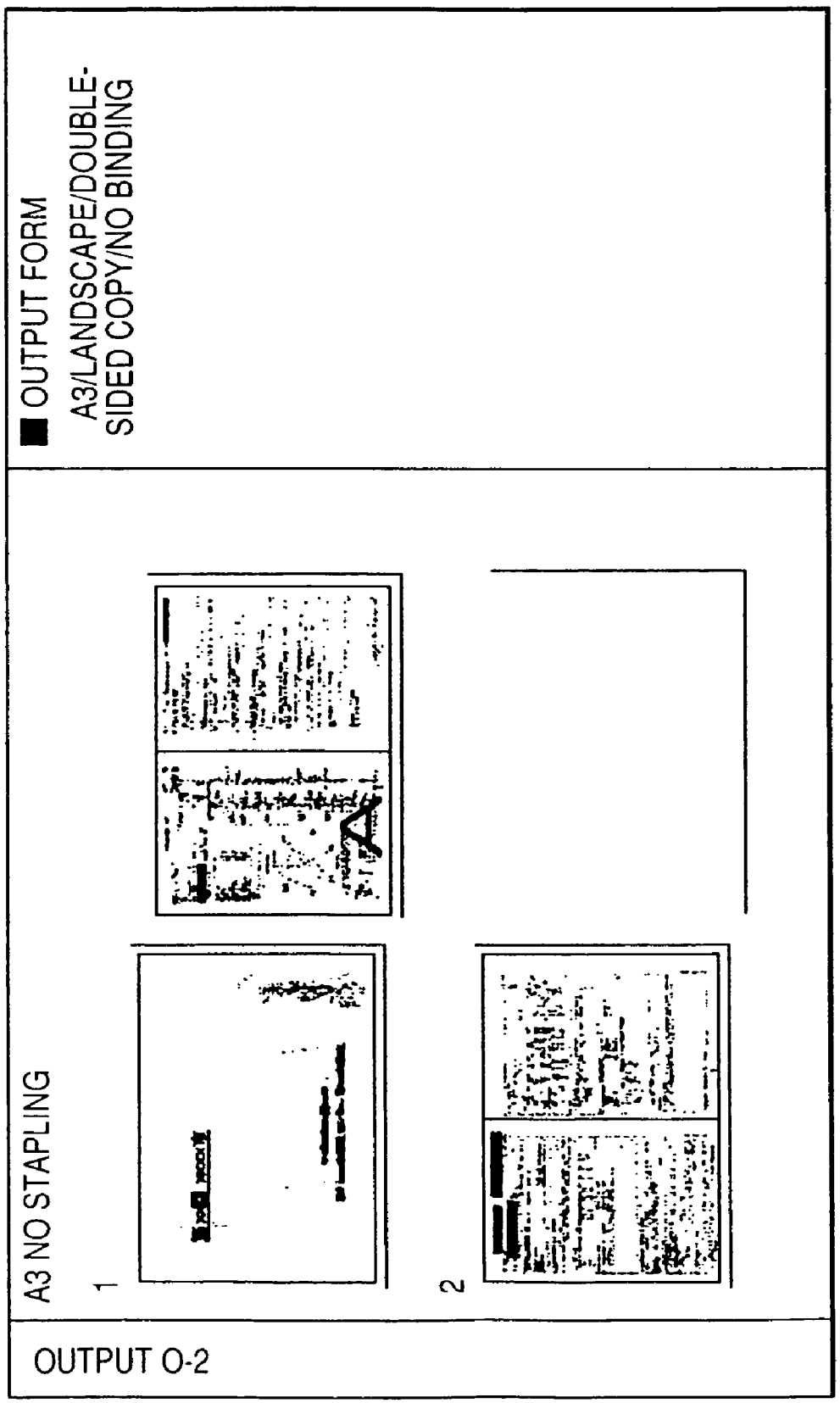
FIG. 9 is a diagram showing an example of the paper size of the examination material output from the multifunctional machine shown in FIG. 1.
Figure 10:
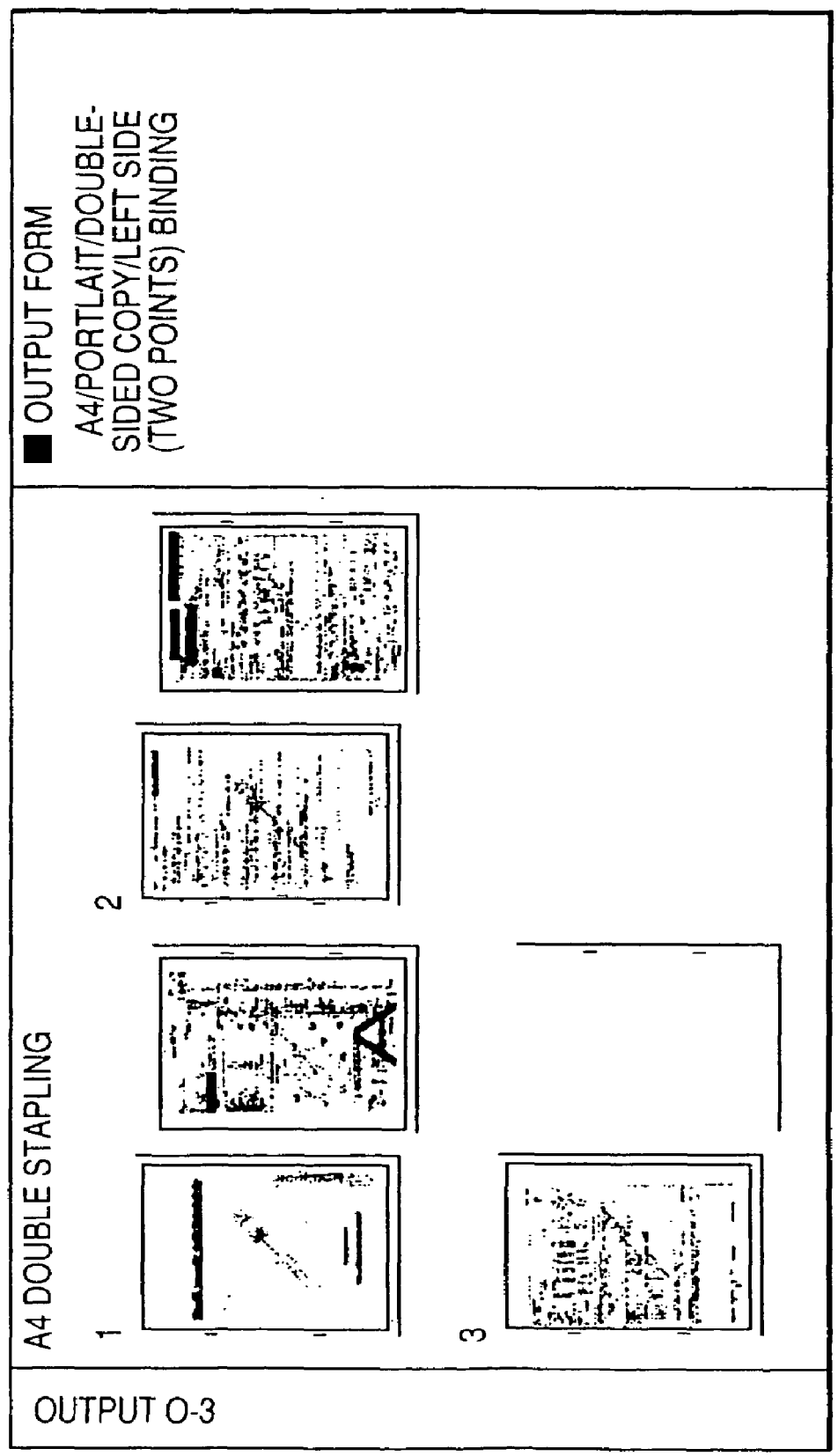
FIG. 10 is a diagram showing an example of the paper size of the examination material output from the multifunctional machine shown in FIG. 1.

Moreover, in the present embodiment, a printed paper (i.e., the examination material) is formed and generated as the output. FIGS. 8 to 10 respectively shows output examples of the formed examination materials, that is, three output examples output O-1, output O-2 and output O-3 respectively obtained by designating paper sizes, output formats (e.g., a full-surface format, etc.), finishing (e.g., stapling, punching, etc.) are obtained.

More specifically, the output O-1 shown in FIG. 8 is the material which is obtained by A3 landscape double-sided printing and stapling of two points at the left side.

The output O-2 shown in FIG. 9 is the material which is obtained by A3 landscape double-sided printing and no stapling.

The output O-3 shown in FIG. 10 is the material which is obtained by A4 portrait double-sided printing and stapling of two points at the left side.

The present invention is of course applicable to an output example other than the original example shown in FIG. 7 and the output examples of the examination materials shown in FIGS. 8 to 10.

Next, an operation environment and a previously prepared file formation procedure in the present embodiment will be explained.

Figure 11:
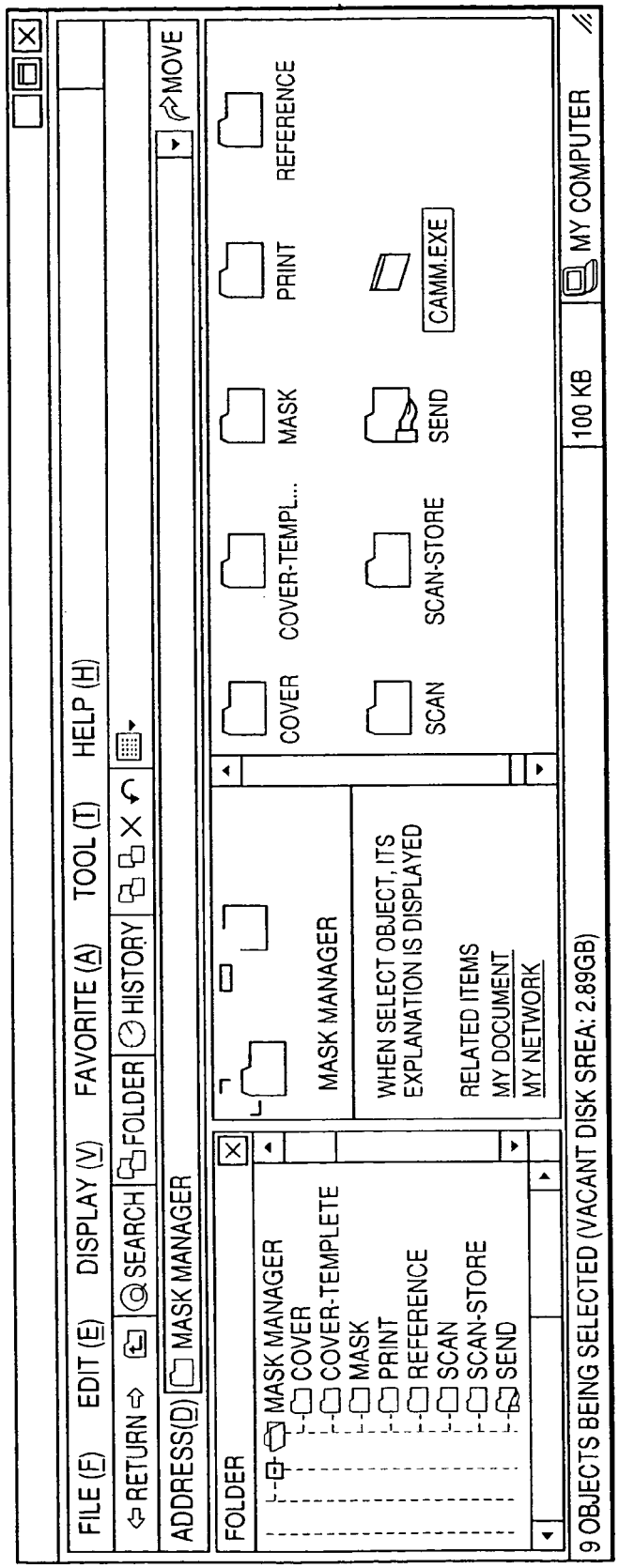
FIG. 11 is a diagram showing a display example of a hierarchy of folders held in a disk portion of a storage unit provided in a host shown in FIG. 1.

The present invention operates using arbitrary folders and files, and examples of these folders and files are shown in FIG. 11.

FIG. 11 is the diagram showing the display example of the hierarchy of the folders secured in the disk device 1030-3 of the storage unit 1030 provided in the host 10 shown in FIG. 1. Here, it should be noted that FIG. 11 shows the state displayed on the display unit 1040 shown in FIG. 1.

In the present embodiment, the folder "¥MaskManager¥Send" being the directory of the disk device 1030-3 in the storage unit 1030 is set as a "transmission destination" folder. The "transmission destination" folder is the folder to be designated as the destination of original data transmission in the printer (i.e., the multifunctional machine 20) (corresponding to the send folder in FIG. 6). Here, it should be noted that shared setting and access right setting may be appropriately performed to the "transmission destination" folder if necessary.

Moreover, a folder "¥MaskManager¥Scan" being the directory of the disk device 1030-3 is set as an "original scan data" folder which is used to store the original data transmitted from the "transmission destination" folder by the material formation application 30 (corresponding to the scan folder in FIG. 6).

Furthermore, a folder "¥MaskManager¥Scan-Store" being the directory of the disk device 1030-3 is set as a "processed original data" folder which is used to store the original data, of which the material formation has ended, transmitted from the "original scan data" folder by the material formation application 30.

Furthermore, a folder "¥MaskManager¥Mask" being the directory of the disk device 1030-3 is set as a "mask position pattern" folder which is used to store mask position pattern data arbitrarily generated by the operator (corresponding to the mask folder in FIG. 6).

Furthermore, a folder "¥MaskManager¥Cover" being the directory of the disk device 1030-3 is set as a "cover data" folder which is used to store the cover data arbitrarily generated by the operator (corresponding to the cover folder in FIG. 6).

Furthermore, a folder "¥MaskManager¥Cover-Template" being the directory of the disk device 1030-3 is set as a "cover template data" folder which is used to store a previously prepared template of the cover data.

Furthermore, a folder "¥MaskManager¥Print" being the directory of the disk device 1030-3 is set as an "examination conference material storage" folder which is used to store the material data (corresponding to the print folder in FIG. 6).

Furthermore, a folder "¥MaskManager¥Reference" being the directory of the disk device 1030-3 is set as a "reference data" folder which is used to store the data to be internally referred by the material formation application 30.

Here, it should be noted that of course the directory structures, the folder names, and the number of folders are not limited to those described in the present embodiment.

(Mask Position Pattern Data Generation Process)

Hereinafter, a procedure of generating (or forming) the mask position pattern data in the present embodiment will be explained with reference to FIGS. 12 and 13.

Figure 12:
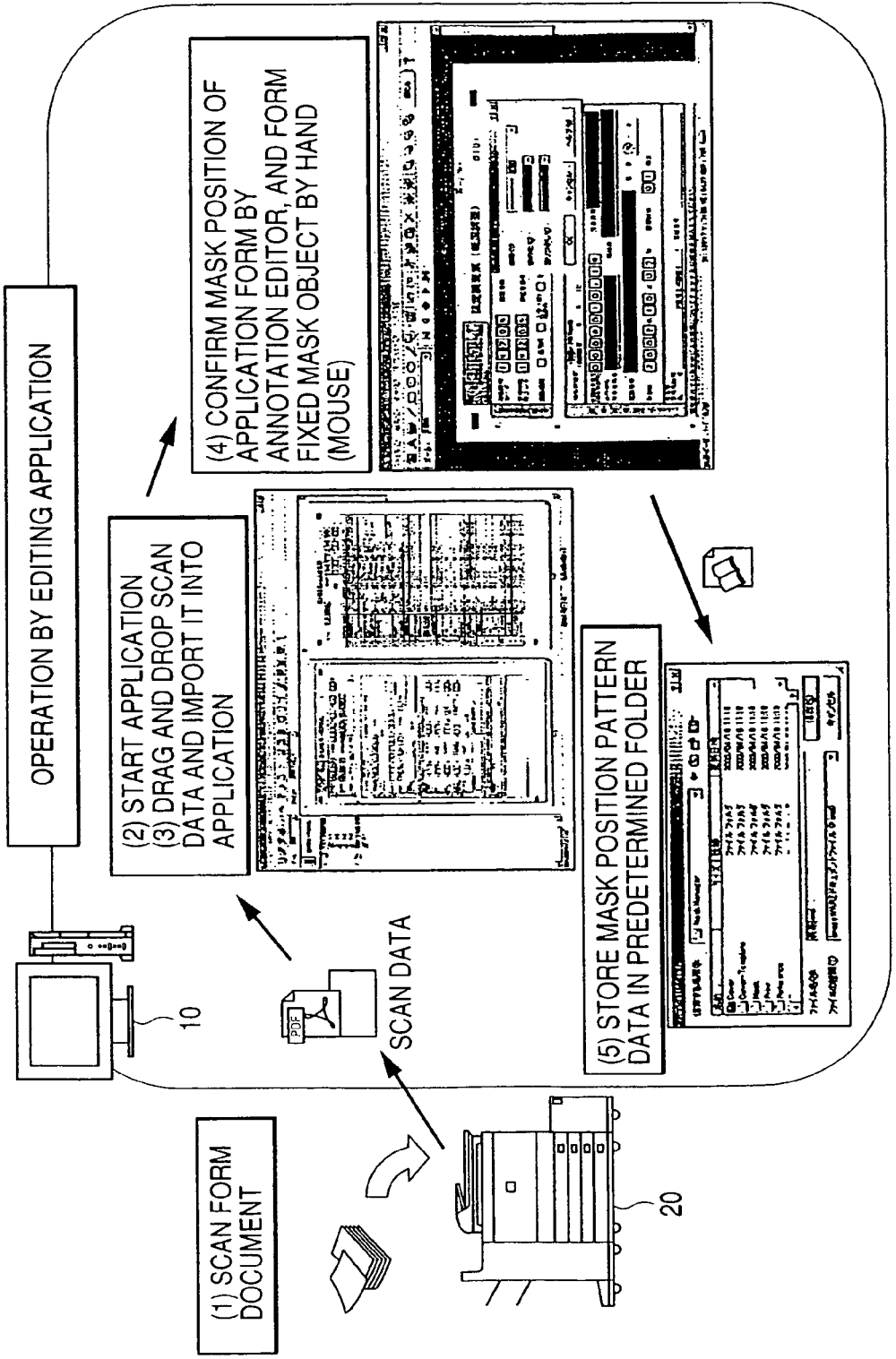
FIG. 12 is a diagram for explaining an example of a mask position pattern data generation process in the document administration system according to the present invention.

FIG. 12 is the diagram for explaining an example of the mask position pattern data generation process in the document administration system according to the present invention. In FIG. 12, the same parts as those in FIG. 11 are denoted by the same numerals as those in FIG. 11 respectively, and the thick lines roughly indicate the data flow.

As shown in FIG. 12, in the mask position pattern data generation process according to the present embodiment, the mask position pattern data is generated for each page of the form by the operator with use of a mask data generation application (i.e., an annotation editor), and the generated data is then stored. Incidentally, the detailed procedure for generating the mask position pattern data will be explained with reference to FIG. 13.

Figure 13:
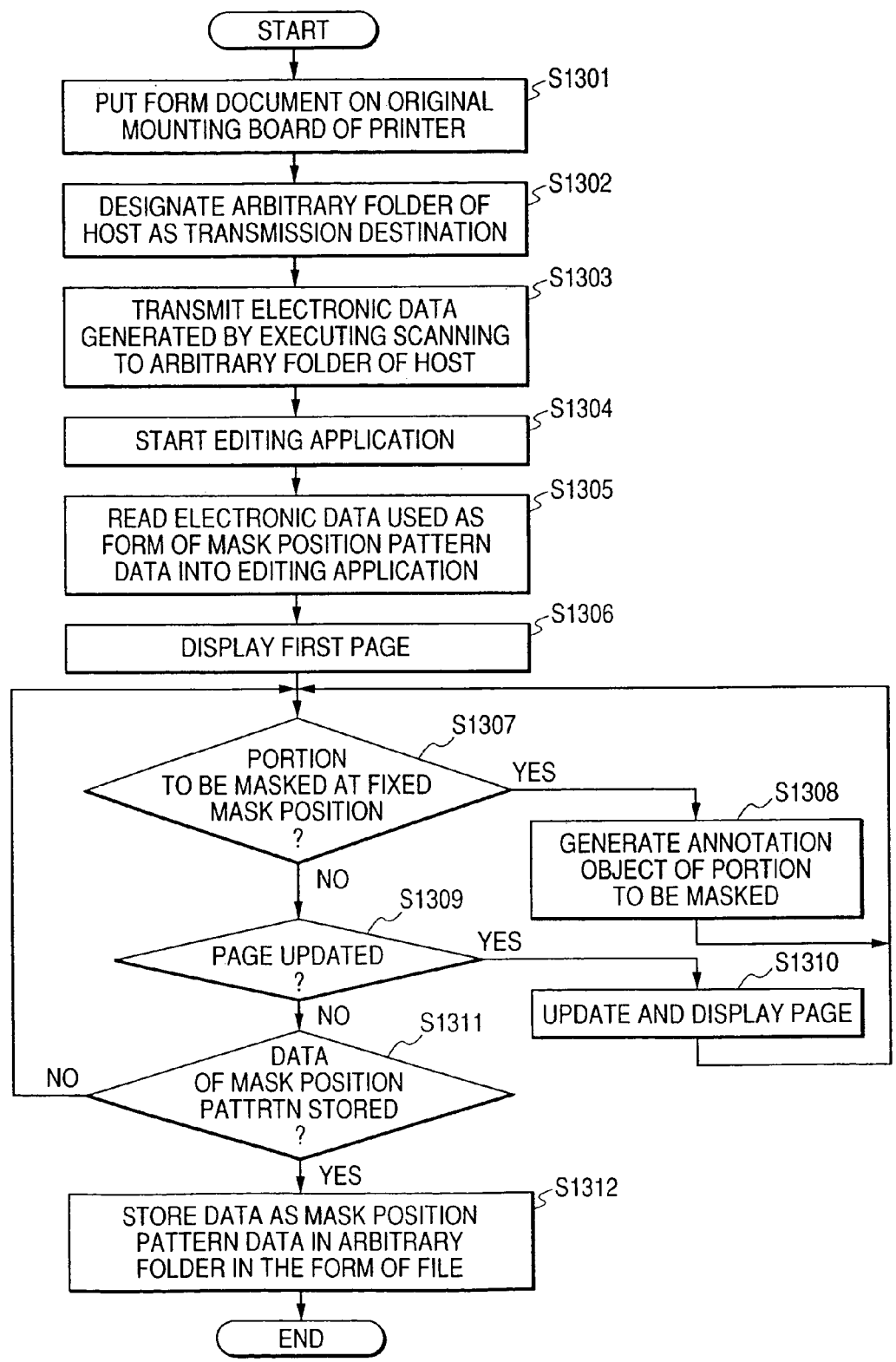
FIG. 13 is a flow chart showing an example of a first data processing procedure in the document administration system according to the present invention.

FIG. 13 is a flow chart showing an example of a first data processing procedure in the document administration system according to the present invention. Here, it should be noted that the process in the flow chart of FIG. 13 corresponds to the data processing procedure to be executed by the control units 1010 and 2010 of the host 10 and the multifunctional machine 20 shown in FIG. 1, and symbols S1301 to S1312 in FIG. 13 denote respective steps.

Moreover, in the present embodiment, to previously generate the mask position pattern data, it is necessary for the operator to specify a mask position and its area size on each application form. Therefore, an application document form on which character strings such as "name", "address" and the like, figure item positions, rule areas, writing areas and the like have been already defined as the information to specify the mask position and the like and to which an applicant actually writes necessary matters is used. Here, the application document form to be used may be the form before the contents necessary for the actual application are written or the form after the contents have been written.

First, the application document form existing as a paper document is put on an original mounting board (provided in the RDF or the like) by the operator (step S1301).

Next, an arbitrary folder of the host 10 is designated as the transmission destination through the operation unit 2060 at the multifunctional machine 20 (step S1302), thereby indicating the scanning.

Thus, the control unit 2010 of the multifunctional machine 20 starts the scan process, whereby the electronic data of the form (i.e., the mask position pattern generation data) is generated and stored in the disk device 2030-3 of the storage unit 2030 in the multifunctional machine 20. Then, the mask position pattern generation data is transmitted to the folder designated by the operator in the disk device 1030-3 of the storage unit 1030 in the host 10 by the control unit 2010 of the multifunctional machine 20 through the connection unit 2020 of the multifunctional machine 20 and the connection unit 1020 of the host 10 (step S1303).

Incidentally, when the application document consists of the plural pages and includes the two-sided originals as shown in FIG. 7, the generation data including the plural pages each of which corresponds to each printed surface is generated.

Besides, the application document form reading process can be performed even if the scan function of the multifunctional machine 20 is not used, that is, an original digitized by another stand-alone scanner or the like can be used as the input data.

Likewise, when the same data as the application document is generated by using another arbitrary application and system, the data thus generated can be used as the input data.

Next, in response to an operator's instruction, the control unit 1010 starts the editing application 40 (step S1304). Thus, formation data (i.e., the data to be used for forming the mask position pattern data) stored in the arbitrary folder can be specified. Then, the operator captures and transfers the specified data to the editing application 40 through, e.g., a drag and drop operation with use of the pointing device such as a mouse or the like (step S1305), whereby the obtained formation data is stored in the RAM 1030-1 of the storage unit 1030 of the host 10.

The control unit 1010 of the host 10 then causes the display unit 1040 to display the formation data (step S1306).

Figure 14:
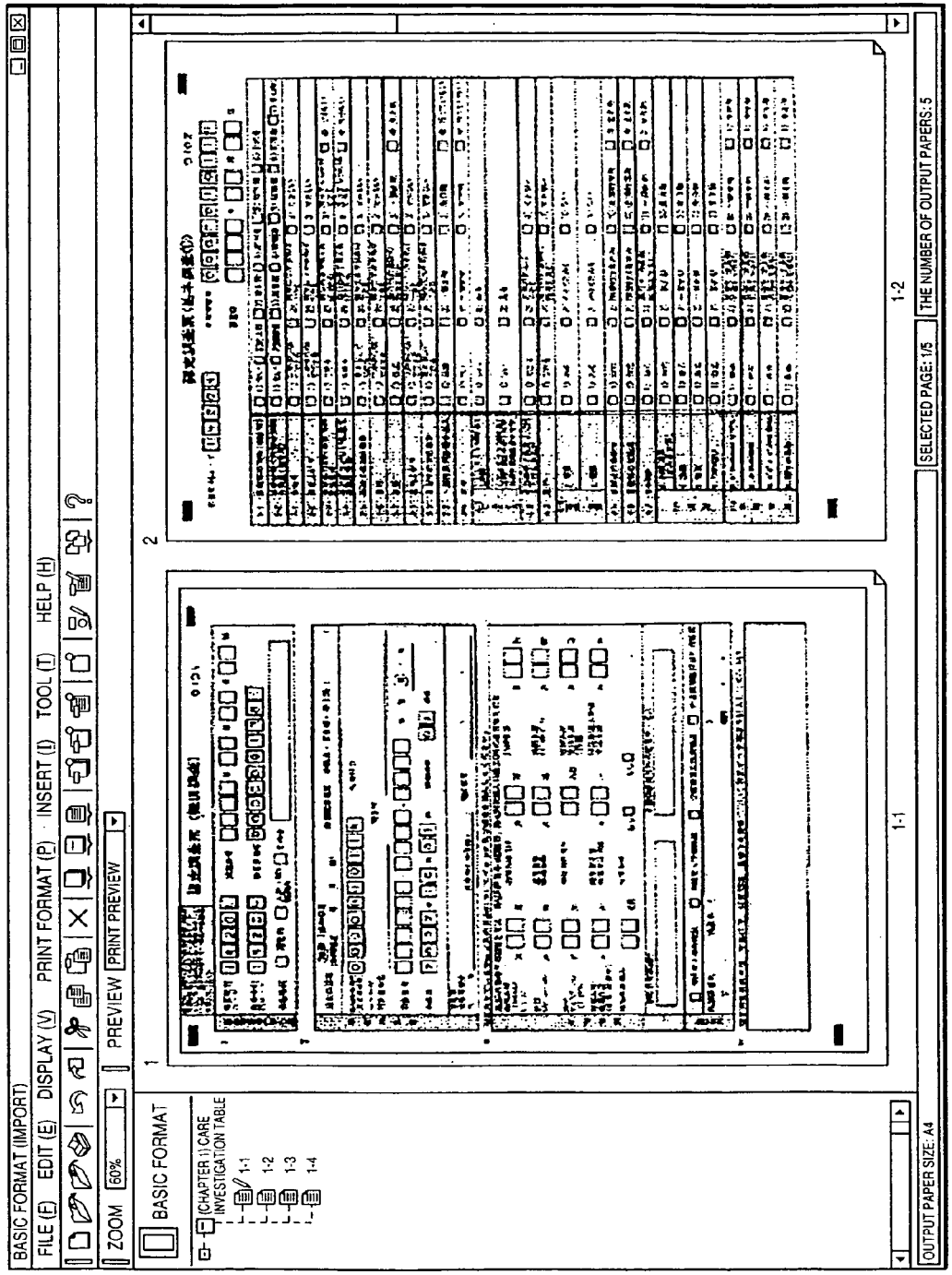
FIG. 14 is a diagram for explaining an example of formation data to be displayed on a display unit of the host shown in FIG. 1.

FIG. 14 is a diagram for explaining an example of the formation data to be displayed in the step S1306.

Subsequently, the operator generates the mask position pattern data as confirming the formation data of the mask position pattern data by using the editing application 40.

Figure 15:
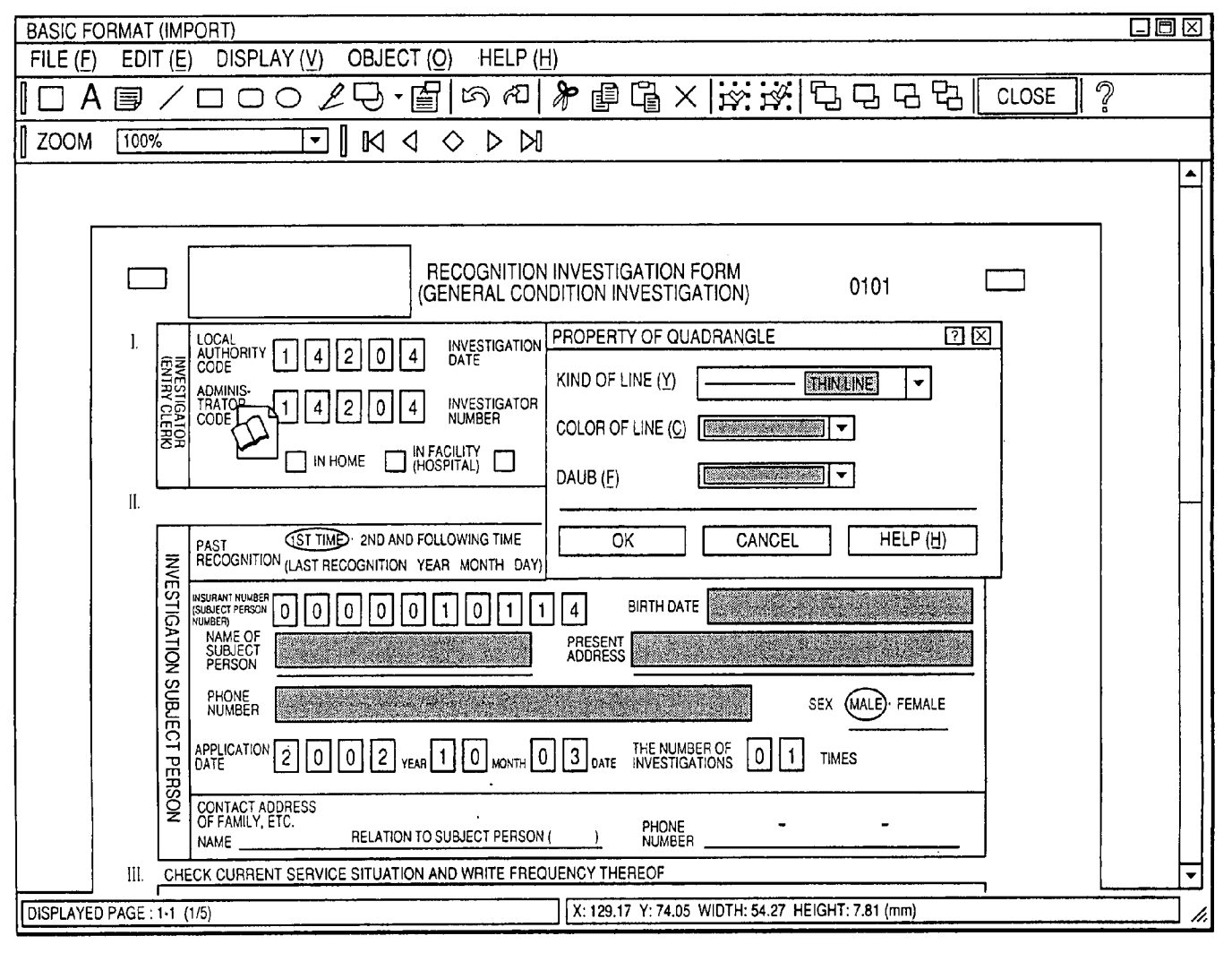

FIG. 15 shows a part of the operation for generating the mask position pattern data, that is, FIG. 15 is the diagram showing an example of a mask area setting screen to be displayed on the display unit 1040 of the host 10 shown in FIG. 1. As can be seen from FIG. 15, writing areas of a phone number, a birth date and the like are masked with black. This means that, by using an annotation function of the editing application 40, a mask position setting process is performed to the section which has been considered by the operator to be masked.

Here, the annotation function is the function which is used in the mask data generation operation by the operator to generate the mask position pattern data for designating the area to be masked when the examination material is formed from the application document. More specifically, a mask position designation object (hereinafter, referred to as an annotation object) such as a rectangle, a circle or the like is disposed by the operator to the area to be masked. Preferably, the annotation object should be previously registered in the form of vector data in the editing application 40. Then, the operator selects a desired-shaped annotation object, deforms it freely, and disposes the deformed object to the area intended to be masked so that the area in question is virtually masked with black (bedaubed) as shown in FIG. 15. Thus, the mask position pattern data is generated.

What is important is that, even if the annotation object is disposed, the object in question is not overwritten with respect to the formation data existing in the object-disposed position. In other words, the annotation object is not drawn to the formation data but is drawn to a transparent or semitransparent layer superposed on the formation data, and the annotation object is thus stored together with the formation data.

In the present embodiment, the above operation is performed by the operator according to the editing application 40. However, the present invention is not limited to the procedure of the above operation, the structure of the editing application 40, the data format of the annotation object, the shape of the annotation object, and the like.

Here, the detailed procedure for generating the mask position pattern data will be explained as before with reference to the flow chart of FIG. 13. That is, it is judged by the operator whether or not the section to be masked exists, by using the formation data displayed on the display unit 1040 according to the editing application 40. When it is judged that the section to be masked exists, the process of setting the annotation object is performed by the operator in the manner as described above.

At that time, it is judged by the control unit 1010 in the host 10 whether or not the operator performs an operation to set the annotation object (step S1307). Then, when it is judged that the operator performs the operation to add the annotation object, for example, the operator clicks a not-shown "object addition" button, then the data concerning the annotation object is generated, the generated data is reflected on the mask position pattern data stored in the RAM 1030-1 of the storage unit 1030 in the host 10 (step S1308), and the flow returns to the step S1307.

On the contrary, when it is judged by the control unit 1010 of the host 10 in the step S1307 that there is no section to be masked at the fixed position on the page in question, or that the annotation objects have already been disposed to all the sections to be masked, then it is further judged whether or not the operator performs an operation to change the page without adding the annotation object (step S1309). When it is judged that the operator performs the operation to change the page by depressing, e.g., a not-shown "display next page" button, the page designated by the operator is displayed on the display unit 1040 of the host 10 (step S1310), and the flow returns to the step S1307.

On the contrary, when it is judged by the control unit 1010 of the host 10 in the step S1309 that the operator does not perform the operation to change the page, then it is further judged whether or not the operator performs an operation to store the mask position pattern in the file (step S1311). When it is judged that the operator performs the operation to store the mask position pattern in the file, a not-shown file storage dialog box is displayed on the display unit 1040 of the host 10 to urge the operator to designate the folder "¥MaskManager¥Mask" and input an arbitrary file name.

Then, the mask position pattern data is stored according to the input information (step S1312), and the process ends.

On the contrary, when it is judged by the control unit 1010 of the host 10 in the step S1311 that the operator does not perform the operation to store the mask position pattern in the file, then the process returns to the step S3007.

Figure 16:
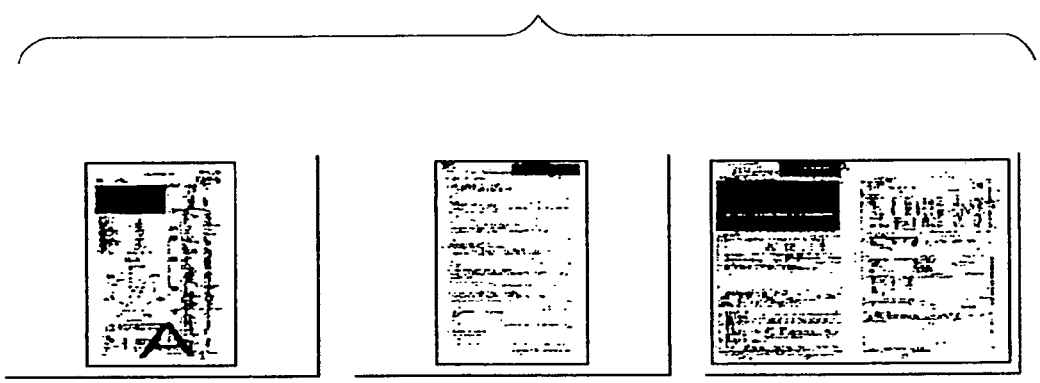
FIG. 16 is a diagram showing an example of a mask position pattern data concealing state to be displayed on the display unit of the host shown in FIG. 1.

FIG. 16 is a diagram showing an example of the screen for confirming a mask position pattern data concealing state to be displayed on the display unit 1040 of the host 10 shown in FIG. 1.

As shown in FIG. 16, the mask position pattern for the original D1 shown in FIG. 7 is registered as the mask position pattern data. Of course, the mask position pattern data in the present embodiment is merely one example, and mask positions and page constitutions are not limited to those in the present embodiment.

Incidentally, in the present embodiment, it should be noted that the concealing is not directly applied to the formation data of the mask position pattern data. That is, the layer of the mask position pattern data is transparently superposed on the image layer of the formation data, and the superposed layers are displayed.

Besides, it should be noted that the formation data is used also to form or generate a form information table in a later-described material formation process.

(Cover Data Generation Process)

Figure 17:
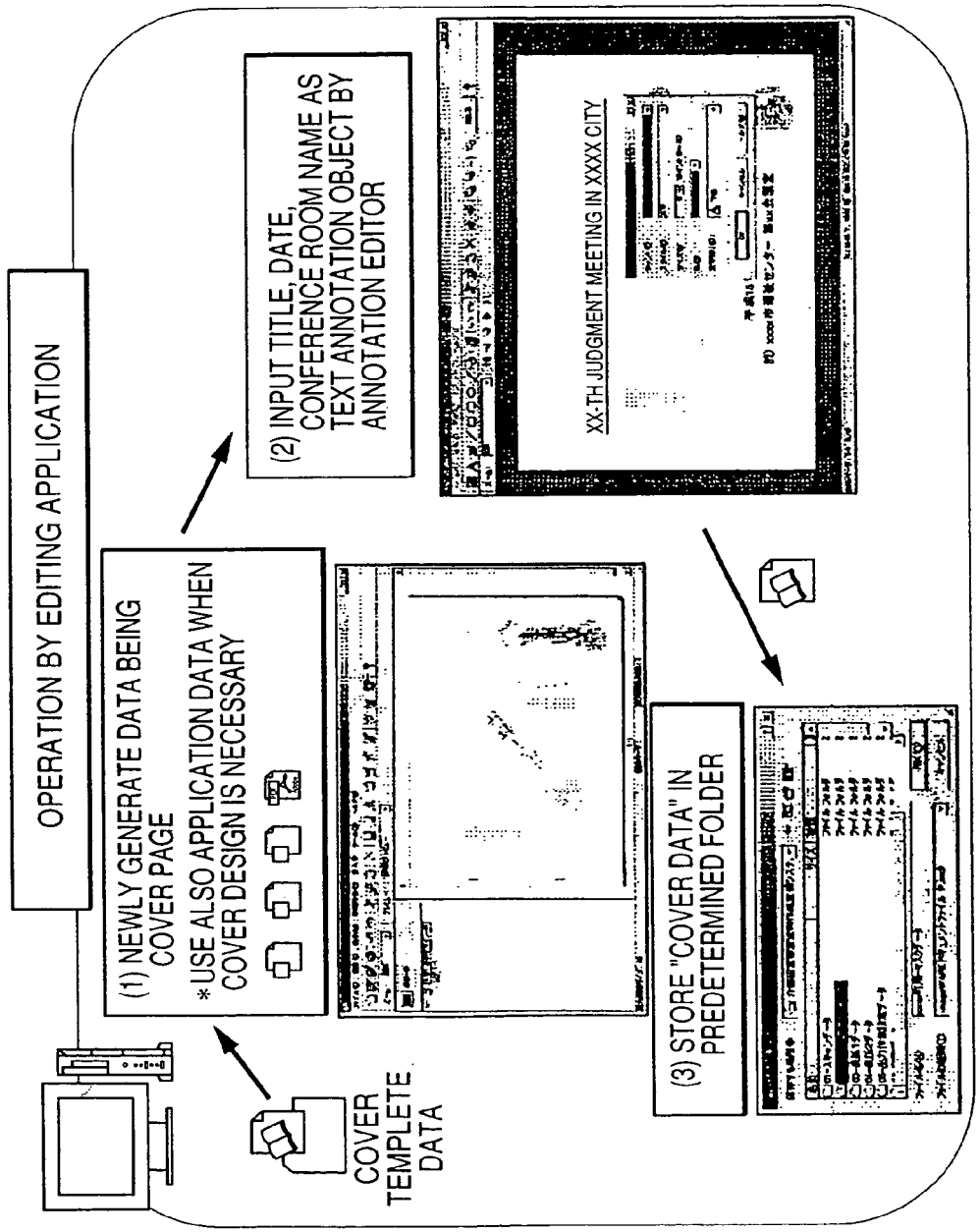
FIG. 17 is a diagram for explaining a cover formation process state in the document administration system according to the present invention.

FIG. 17 is a diagram for explaining a cover formation process state in the document administration system according to the present invention. In FIG. 17, the thick lines indicate the data flow. Here, it should be noted that the process in FIG. 17 corresponds to the cover formation process according to the editing application 40.

Figure 18:
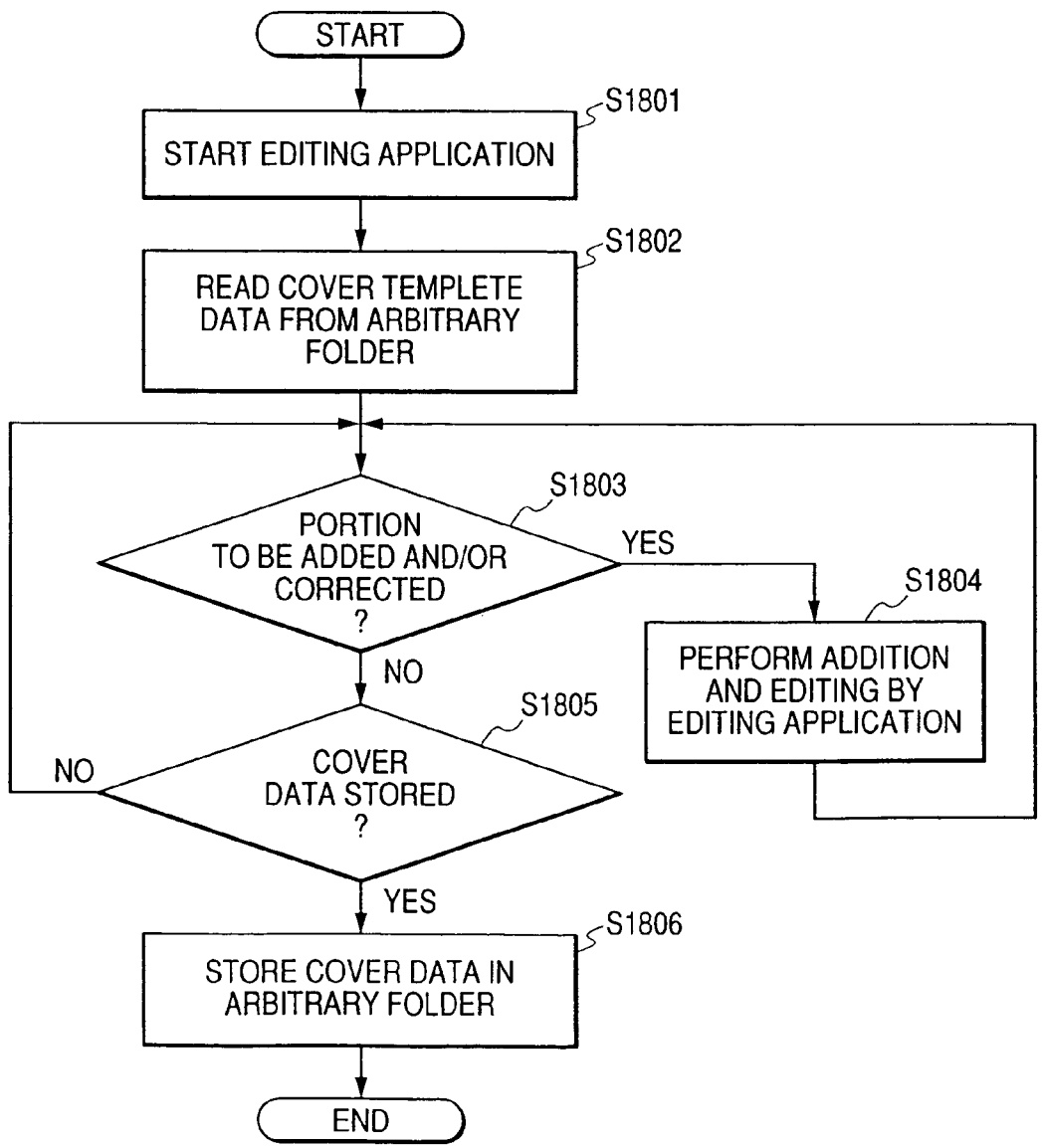
FIG. 18 is a flow chart showing an example of a second data processing procedure in the document administration system according to the present invention.

FIG. 18 is a flow chart showing an example of a second data processing procedure in the document administration system according to the present invention. Here, it should be noted that the process in the flow chart of FIG. 18 corresponds to the data processing procedure (i.e., a cover data generation procedure) to be executed by the control unit 1010 of the host 10 shown in FIG. 1, and symbols S1801 to S180.6 in FIG. 18 denote respective steps.

In the present embodiment, the cover data is previously generated by the operator, and the generated cover data is automatically read when the material is formed. However, the present invention is not limited to this.

Incidentally, as one method of generating the cover data, there is a method of previously preparing the template of the cover data in the application, and then generating the cover data by using the prepared data. The present embodiment will be explained along this method.

First, the operator starts the editing application 40 (step S1801), and specifies the template of the cover data stored in the folder of the directory "¥MaskManager¥Cover-Template". Then, the operator captures and transfers the specified template to the editing application 40 through, e.g., a drag and drop operation with use of the input unit 1070 such as a mouse or the like (step S1802), whereby the template image of the cover data is displayed on the display unit 1040 of the host 10.

Subsequently, the operator confirms the content of the cover data on the display unit 1040 and edits the template image according to need by appropriately handling the editing application 40. Then, it is judged by the control unit 1010 whether or not the operator performs the editing by using the editing application 40 (step S1803). When it is judged that the operator performs the editing, the editing content is formed and reflected on the cover data stored in the RAM 1030-1 of the storage unit 1030 (step S1804), and the flow returns to the step S1803.

Further, it is judged by the control unit 1010 whether or not the operator performs an operation to store the cover data in the file (step S1805). When it is judged that the operator performs the operation to store the cover data in the file, a not-shown file storage dialog box is displayed on the display unit 1040 of the host 10 to urge the operator to designate the folder "¥MaskManager¥Cover" and input an arbitrary file name. Then, the cover data is stored according to the input information (step S1806), and the process ends.

On the contrary, when it is judged in the step S1805 that the operator does not perform the operation to store the cover data in the file, the process returns to the step S1803 to continue the process.

Thus, the cover data is generated. Incidentally, the cover data generation process is not essential in the present invention, but it is possible by providing a cover to obtain subordinate effects of simplifying material administration and improving appearance.

Besides, even if the template of the cover data previously prepared is not used, arbitrary cover data generated by another arbitrary application and system may be stored in the folder "¥MaskManager¥Cover".

(Material Data Generation Process)

Next, a material data generation procedure which is a third data processing procedure in the document administration system according to the present invention will be explained.

Figure 19:
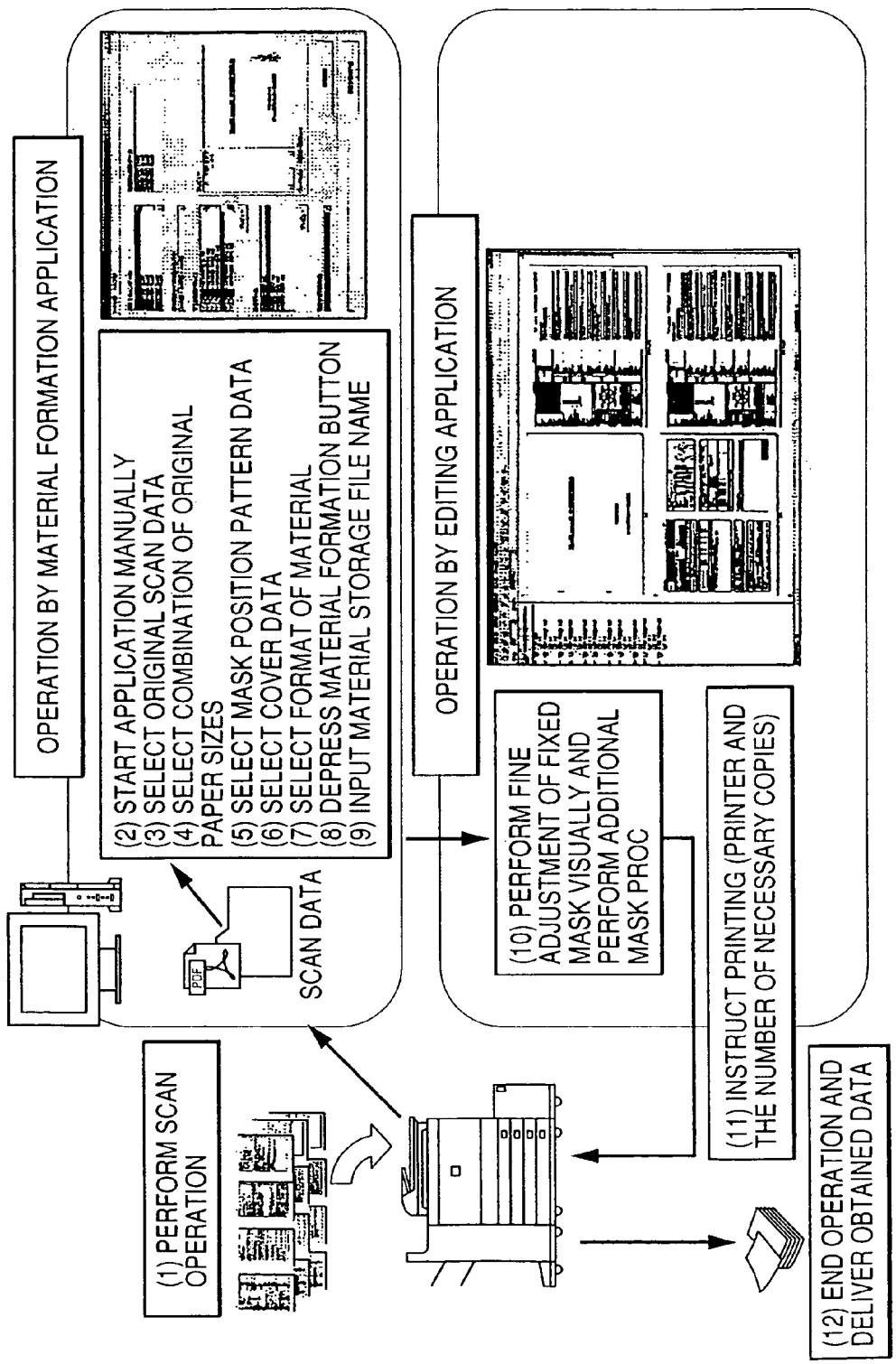
FIG. 19 is a diagram for explaining a material formation process state in the document administration system according to the present invention.

FIG. 19 is a diagram for explaining a material data generation process state and the print process in the document administration system according to the present invention. In FIG. 19, the thick lines indicate the data flow. Here, it should be noted that the process in FIG. 19 corresponds to the process using the material formation application 30 and the editing application 40.

Figure 20:
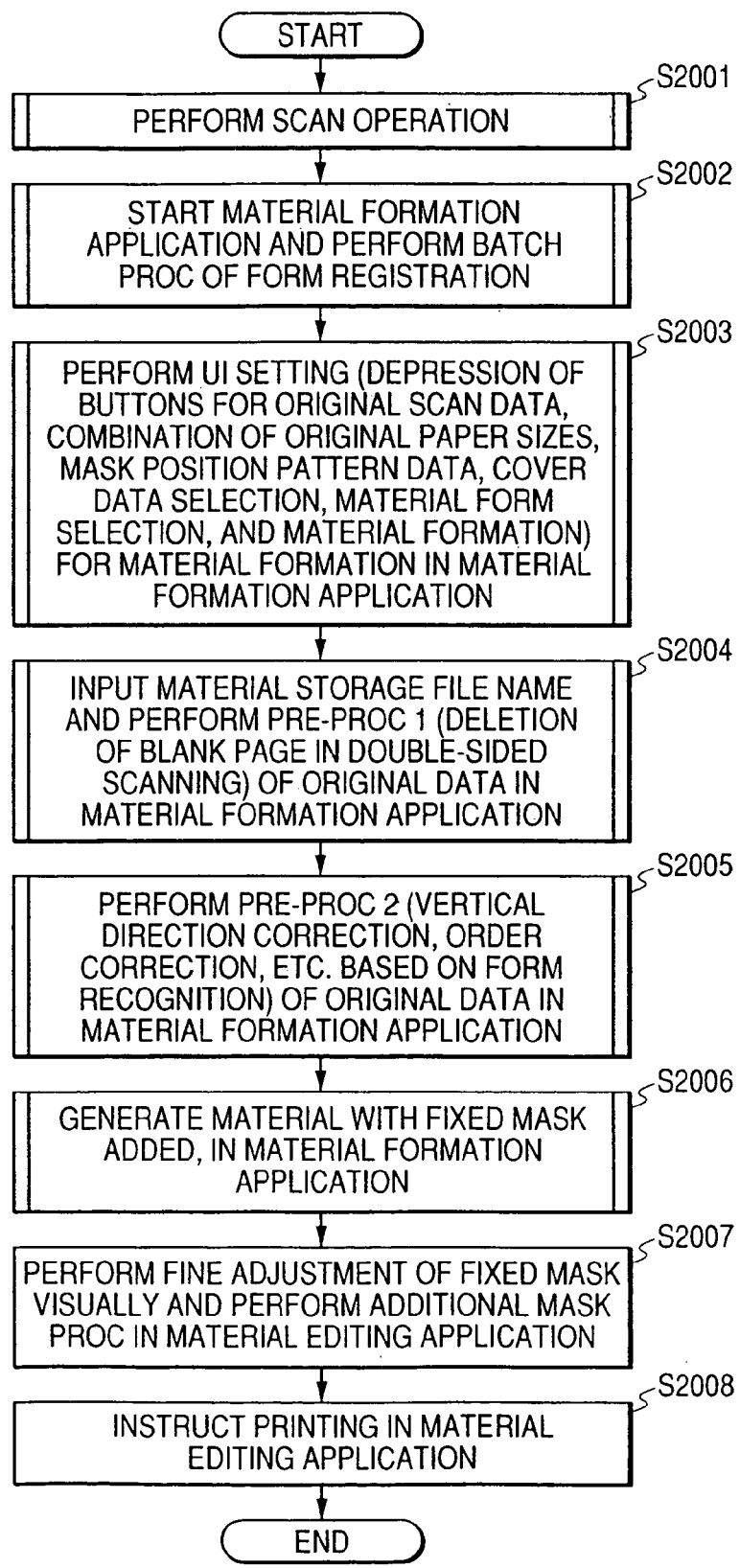
FIG. 20 is a flow chart showing an example of a third data processing procedure in the document administration system according to the present invention.

FIG. 20 is a flow chart showing an example of the third data processing procedure in FIG. 19. Here, it should be noted that the process in the flow chart of FIG. 20 corresponds to the data processing procedure (i.e., a print data generation procedure) to be executed by the control unit 1010 of the host 10 shown in FIG. 1, and flow charts shown in later-described FIGS. 21 to 26 correspond to the detailed contents of the respective steps in FIG. 20.

In a step S2001 of FIG. 20, the operator digitizes an application document (i.e., an original) by reading paper documents with use of the scanner. However, when the digitized data already exists, the process in the step S2001 is unnecessary.

In a step S2002, the material formation application 30 is automatically or manually started to obtain the above mask position pattern data, the form information and the like. Then, the obtained information is registered as the administration information of the material formation application 30.

In a step S2003, the user interface of the material formation application 30 is handled by the operator to perform various settings concerning the material formation.

In a step S2004, a storage file name of the material to be formed is input by the operator. Then, after the name was input, a first preprocess for image formation to the original data designated through the user interface is performed according to the material formation application 30. Here, it should be noted that the first preprocess is the process to detect and delete blank data included in the original data.

In a step S2005, a second preprocess for image formation is performed to correct a direction and order of the original data.

In a step S2006, a process to apply the previously prepared mask position pattern data to the original data and a process to store the mask-applied data are performed.

In a step S2007, a process to adjust a mask position and add an arbitrary mask to the data stored in the step S2006 is performed by the operator according to the editing application 40. Here, it should be noted that the process in the step S207 is arbitrarily performed according to need.

In a step S2008, it is instructed to print the data generated based on the above steps.

Subsequently, the detailed processes in the respective steps shown in FIG. 20 will be explained with reference to FIGS. 21 to 26 and 35.

Figure 21:
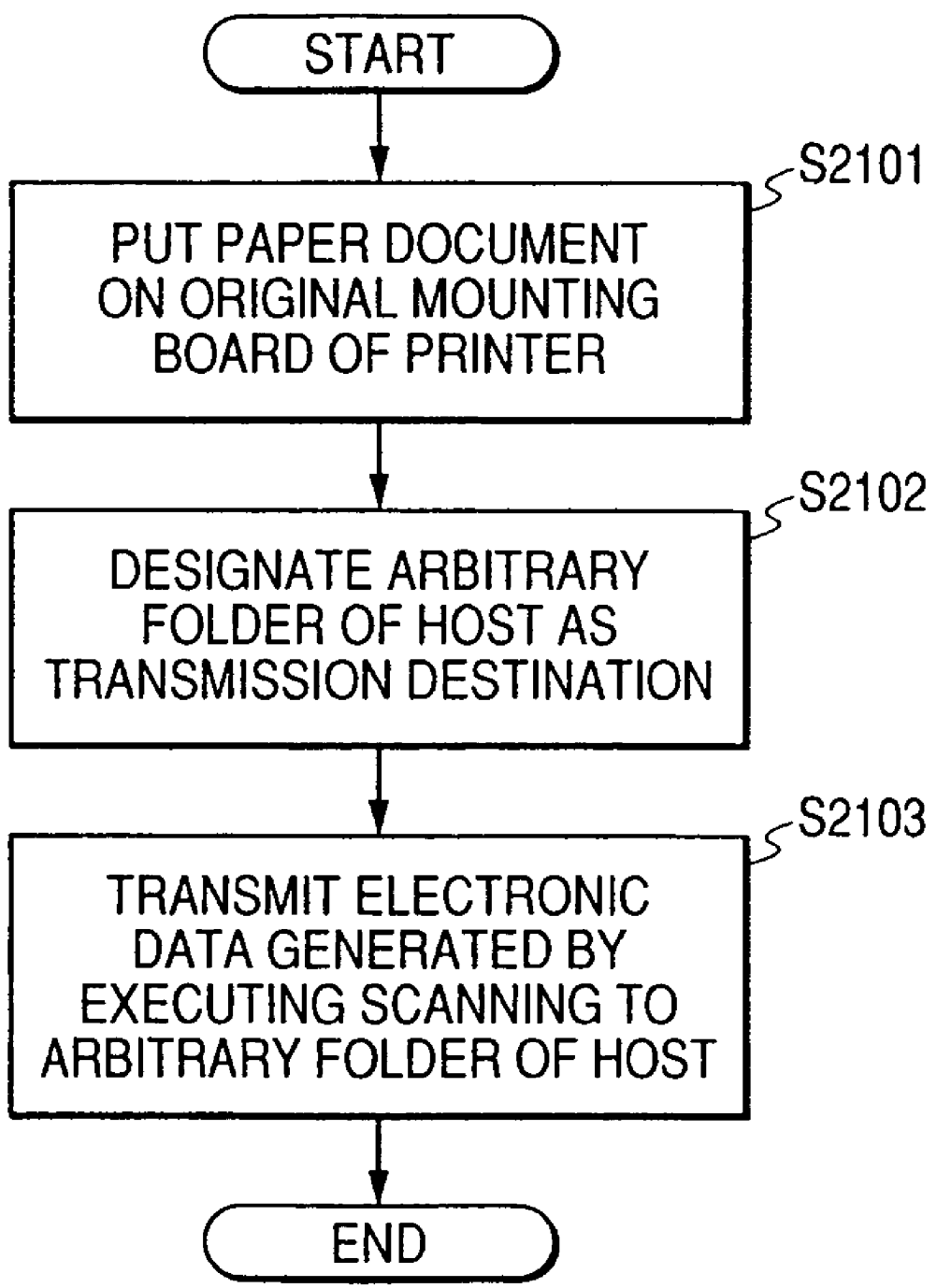
FIG. 21 is a flow chart showing an example of an original digitizing process in the third data processing procedure.

First, the process of digitizing the application document in the step S2001 of FIG. 20 will be explained in detail with reference to FIG. 21.

That is, in case of forming the examination material, the operator puts a paper application document (i.e., an original) on the original mounting board of the reading unit 2050 of the multifunctional machine 20.

Then, the original put on the original mounting board is detected by the control unit 2010 of the multifunctional machine 20 (step S2101). Next, an arbitrary folder (directory "¥MaskManager¥Send" in the present embodiment) of the host 10 is designated as the transmission destination by the operator in the print unit 2040. The folder designation operation is detected by the control unit 2010 of the multifunctional machine 20 (step S2102), and thus scanning is instructed.

The control unit 2010 of the multifunctional machine 20 starts the scanning to generate the digitized application document data (i.e., original data) on the disk device 2030-3 of the storage unit 2030 in the multifunctional machine 20. Incidentally, the application document as one set consisting of plural papers or plural sets of the application documents may be simultaneously put on the original mounting board, that is, the present invention is not limited to how to put the application document on the original mounting board. However, because a specific effect of the present invention is to be able to perform in a lump the mask process and the material data formation process with respect to the plural sets, the present embodiment is explained on the premise that the plural sets of the application documents are put on the original mounting board.

Here, the digitized original data will be explained as data shown in FIG. 27.

Figure 27:
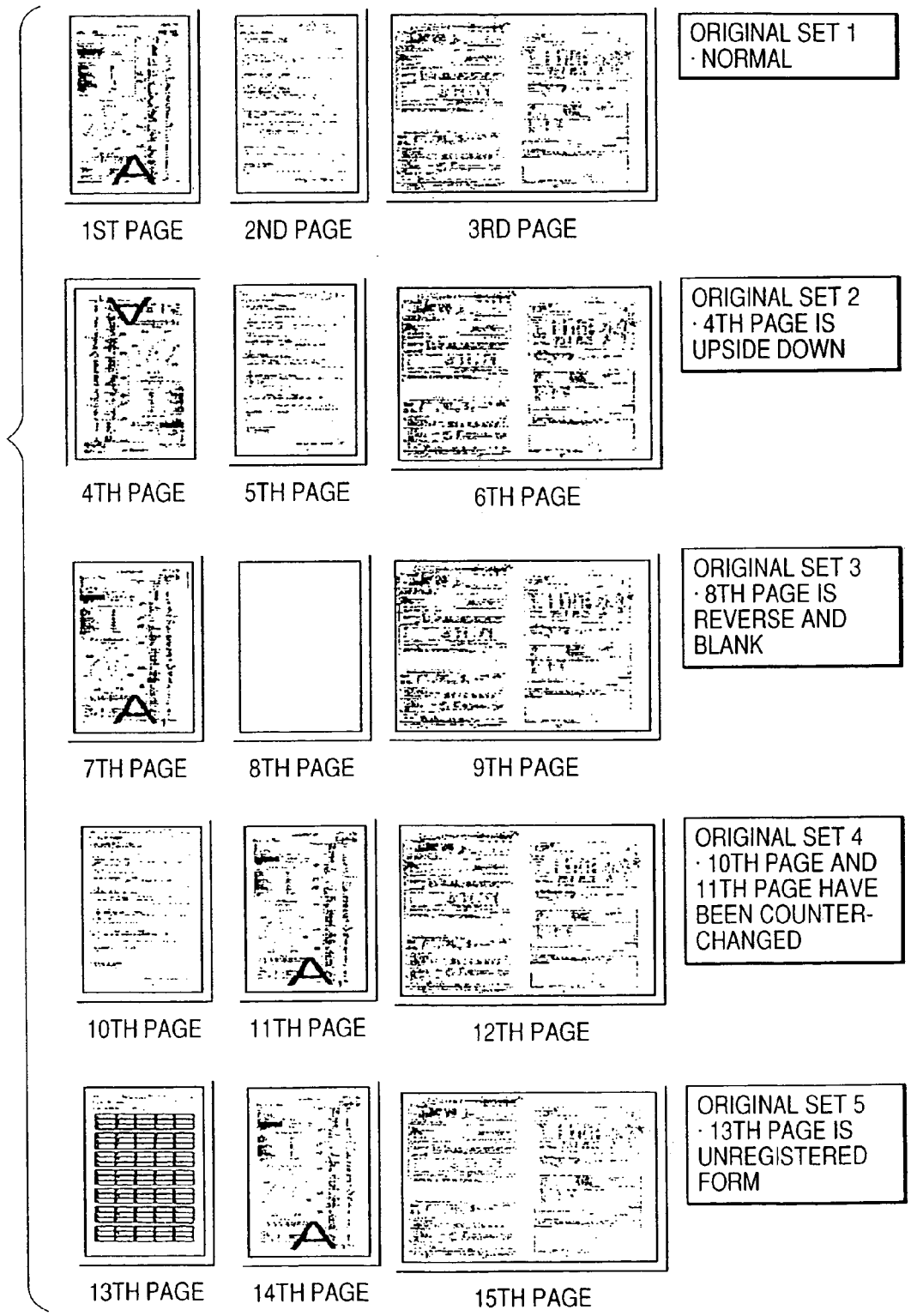
FIG. 27 is a schematic diagram showing an example of original scan data shown in FIG. 5.

In an original set 1 (first page to third page) of FIG. 27, the data is normal. In an original set 2 (fourth page to sixth page), the original of the fourth page has been scanned upside down. In an original set 3 (seventh page to ninth page), the original of the eighth page has been scanned reversedly. In an original set 4 (tenth page to twelfth page), the originals have been scanned in the state that the tenth and eleventh pages are reversed to each other in the order. In an original set 5 (thirteenth page to fifteenth page), the original of the thirteenth page is essentially unnecessary. Otherwise, the original of the thirteenth page has been scanned in the state of another form.

Hereinafter, the flowchart of FIG. 21 will be explained again.

The control unit 2010 of the multifunctional machine 20 transmits the original data to the folder "¥MaskManager¥Send" being the directory of the disk device 1030-3 of the storage unit 1030 of the host 10 (step S2103).

Incidentally, it is also possible to generate the original data by digitizing the application document with use of another scanner or the like without using the scan function of the multifunctional machine 20 and then store the generated original data in the same directory "¥MaskManager¥Send".

Likewise, it is possible to generate the data of the same format as that of the application document by using another arbitrary application and system and then store the obtained application data as the original data in the same directory "¥MaskManager¥Send".

Figure 22:
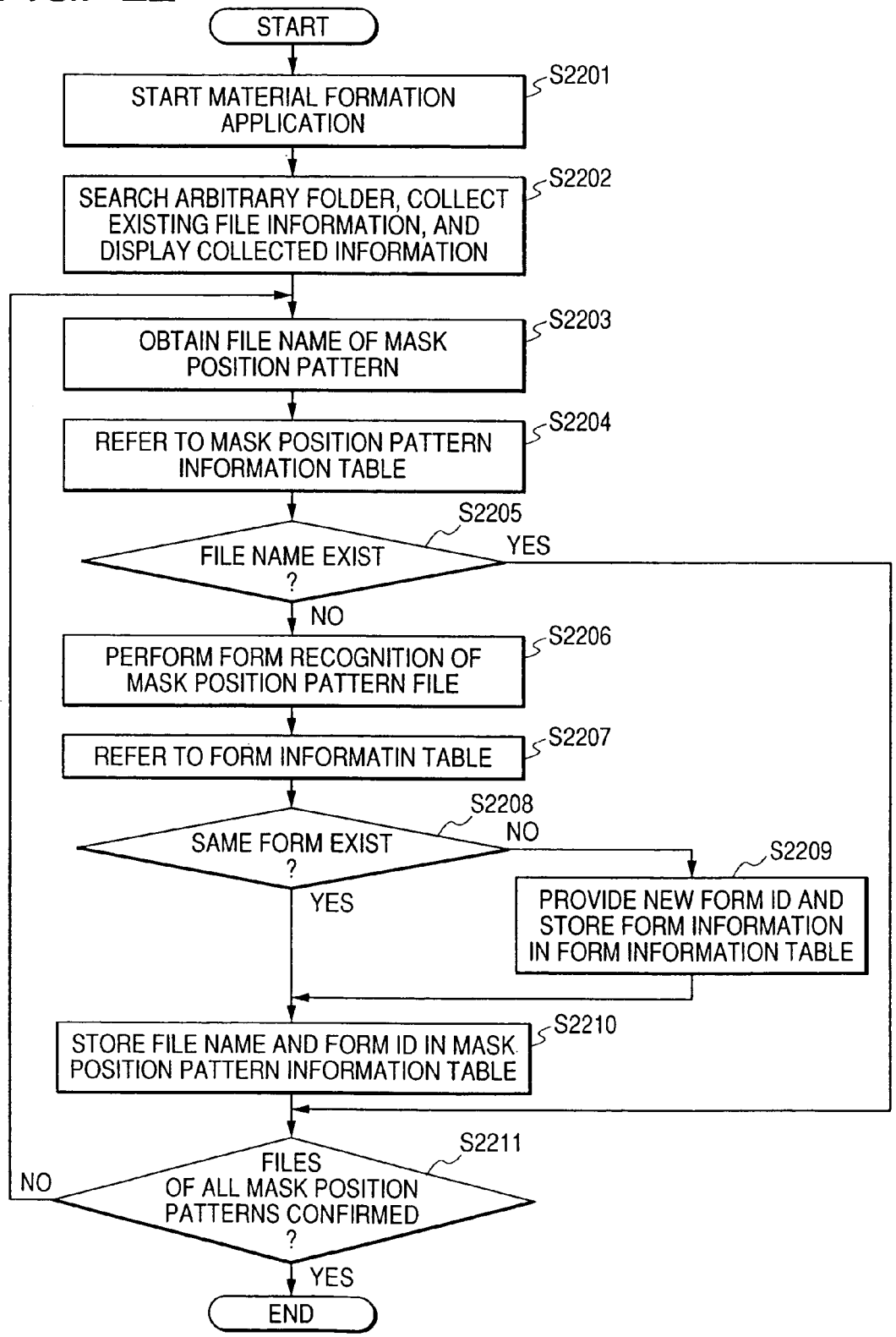
FIG. 22 is a flow chart showing an example of form registration in the third data processing procedure.

Next, the form registration process according to the material formation application 30 will be explained with reference to FIG. 22. It should be noted that the process in question corresponds to the process explained in the step S2002 of FIG. 20.

After the digitizing process of the original explained with reference to FIG. 21 ended and the original data was input in the predetermined folder in the host 10, the control unit 1010 of the host 10 starts the material formation application 30 in response to operator's handling in a step S2201. Then, the control unit 1010 causes the display unit 1040 to display a dialog box as shown in FIG. 28.

Figure 28:
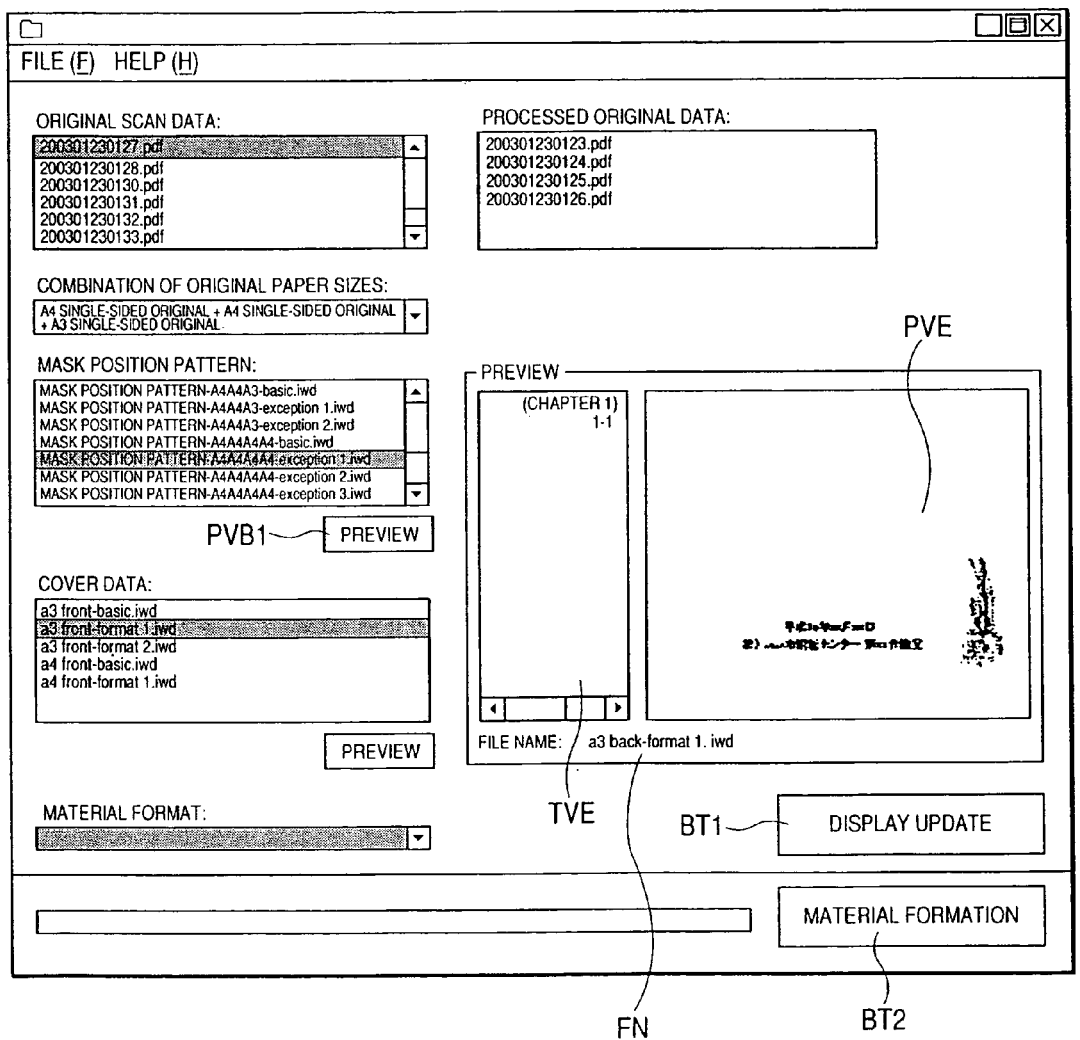
FIG. 28 is a diagram showing an example of a dialog box based on a material formation application.

FIG. 28 is the diagram showing an example of the dialog box which is based on the material formation application 30 and displayed on the display unit 1040 shown in FIG. 1.

As shown in FIG. 28, in the present embodiment, original scan data, an original paper size, a mask position pattern, cover data, a material format, processed original data are listed and displayed so as not to be specifically associated with others.

The operator can confirm the contents of the mask position pattern data and the cover data by previewing the displayed data. Here, because a concrete operation to preview the displayed data is not the essence of the present invention, the explanation thereof will be omitted. In FIG. 28, symbol BT1 denotes a display update button, and BT2 denotes a material formation button.

Hereinafter, the flow chart of FIG. 22 will be explained again.

The control unit 1010 of the host 10 searches the folder of FIG. 11 being the target of the material formation application 30, obtains (or collects) the information concerning the existing file, stores the obtained file information in the RAM 1030-1 of the storage unit 1030 in the host 10, and then reflects and displays the stored information in the dialog box shown in FIG. 28 (step S2202).

More specifically, the control unit 1010 of the host 10 searches the files in a "transmission destination" (send) folder, and confirms the states (or the statuses) of the existing files.

Here, when the control unit 1010 of the host 10 confirms the file in the state that the transmission of the original data from the multifunctional machine 20 ended and a file generation process ended, the control unit 1010 transfers the file in question to an "original scan data" (scan) folder.

On one hand, when the control unit 1010 of the host 10 confirms the original data file in the state that the transmission from the multifunctional machine 20 ended and a file generation process does not end, the control unit 1010 does not transfer the file in question.

Because the material formation application 30 does not aim for the "transmission destination" (send) folder as the target to be displayed, the operator does not naturally select the file stored in the "transmission destination" (send) folder. For this reason, there is no situation that the material is formed by using the file that the generation of original data file does not end, whereby certainty of the formed material can be improved.

Subsequently, the control unit 1010 of the host 10 causes to display the content of the "original scan data" (scan) folder in a original scan data list box, display the content of a "processed original data" (scan-store) folder in a processed original data list box, display the content of a "mask position pattern" (mask) folder in a mask position pattern list box, and display the content of a "cover data" (cover) folder in a cover data list box. Here, it should be noted that the content of the folder is preferably a file name registered in each corresponding folder.

After the process in the step S2202 ended, the flow advances to a step S2203.

In the step S2203, the control unit 1010 of the host 10 obtains the file name of the arbitrary mask position pattern data existing in the mask folder. Here, it should be noted that the mask position pattern data to be obtained is generated in the above mask position pattern data generation process.

Then, in a step S2204, the control unit 1010 of the host 10 refers to a mask position pattern information table shown in FIG. 29 on the basis of the obtained file name of the mask position pattern data, and the flow advances to a step S2205.

Incidentally, when the mask position pattern information table itself does not exist, in the step S2204, the control unit 1010 of the host 10 forms a vacant mask position pattern information table which has the data structure as shown in FIG. 29 and in which internal data does not exist, in the disk device 1030-3 of the storage unit 1030 of the host 10.

FIG. 29 is the diagram showing an example of the mask position pattern information table which is formed and stored in the disk device 1030-3 of the storage unit 1030 of the host 10 shown in FIG. 1.

As shown in FIG. 29, on the mask position pattern information table, the file name of the mask position pattern data is associated with an ID (i.e., a form ID) for discriminating the form of the corresponding file. Here, the form ID will be explained later.

Hereinafter, the flow chart of FIG. 22 will be explained again.

It is judged by the control unit 1010 of the host 10 whether or not the file name of the target mask position pattern exists on the mask position pattern information table (step S2205). When it is judged that the file name of the target mask position pattern exists, the flow advances to a step S2211. On the contrary, when it is judged that the file name of the target mask position pattern does not exist on the mask position pattern information table, the flow advances to a step S2206.

Next, in the step S2206, the control unit 1010 of the host 10 performs a form recognition process for the mask position pattern data file to obtain the form information.

Here it should be noted that the form recognition method is well known in the art and is not the essence of the present invention, whereby the detailed explanation thereof will be omitted.

Hereinafter, the flow chart of FIG. 22 will be explained again.

The control unit 1010 of the host 10 refers to a form information table shown in FIG. 30 on the basis of the form recognition information (step S2207). Incidentally, when the form information table itself does not exist, the control unit 1010 of the host 10 forms a vacant form information table which has the data structure as shown in FIG. 30 and in which internal data does not exist, in the disk device 1030-3 of the storage unit 1030 of the host 10.

FIG. 30 is the diagram showing an example of the form information table which is formed and stored in the disk device 1030-3 of the storage unit 1030 of the host 10 shown in FIG. 1. As shown in FIG. 30, on the form information table, a form ID added to each form, a form page ID added to each page of the form, and form page information indicating the form information of each page of the form are associated with others.

Here, the form indicates a format of an application document, and the form ID indicates unique information added to each format. In the case where the material is formed by using the document administration system according to the present invention, if there are plural application document formats, different form ID's are added respectively to these formats.

For example, in FIG. 30, because there are four form ID's 1 to 4, it is understandable that four kinds of application document formats have been registered on the form information table. Moreover, form page ID's 1 to 3 have been associated with and added to the form ID 1, and this means that the application document registered as the form ID 1 consists of three pages. Furthermore, necessary information is associated with each page to which the form page ID has been added, and the associated information has been stored. For example, the application document page which has the form ID 1 and the form page ID 1 is set as the page which has the size A4, the direction P (portrait), and a cell T1 being an application matter writing area defined to the page in question and having coordinates (X11, Y11, X12, Y12).

Therefore, the file of each stored mask position pattern data and the form information are associated with each other by the mask position pattern information table shown in FIG. 29 and the form information table shown in FIG. 30.

For example, it is understandable that, a file "mask position-A4A4A3-basic.iwd" defined as the mask position pattern data No. 01 corresponds to the application document having the form ID 1. Here, it should be noted that such a file name is arbitrarily added by the operator.

Hereinafter, the flow chart of FIG. 22 will be explained again.

In a step S2208, it is judged by the control unit 1010 based on the form recognition result of the mask position pattern in the step S2206 whether or not the same form information as the mask position pattern exists on the form information table. When it is judged that the same form information as the mask position pattern exists on the form information table, the flow advances to a step S2210. Here, it should be noted that the judgment in the step S2208 is performed by comparing each form information defined on the form information table with form recognition result of the read application document.

On the contrary, when it is judged by the control unit 1010 in the step S2208 that the same form information as the mask position pattern does not exist on the form information table, the flow advances to a step S2209. On one hand, when in the above step S2206 the form information table itself does not exist and the vacant form information table is newly formed, it is judged by the control unit 1010 in the step S2208 that the same form information as the mask position pattern does not exist on the form information table, and the flow advances to the step S2209.

In the step S2209, the control unit 1010 stores (registers) the form information of the mask position pattern obtained through the form recognition on the form information table existing in the disk device 1030-3 of the storage unit 1030 of the host 10 by providing a new form ID as new form information, in the form shown in FIG. 30. Then, the flow advances to the step S2210.

Next, in the step S2210, the control unit 1010 stores (registers) the file name of the mask position pattern and the same form ID as the form information of the mask position pattern in question on the mask position pattern information table existing in the disk device 1030-3 of the storage unit 1030 of the host 10, in the form shown in FIG. 29. Then, the flow advances to the step S2211.

Next, in the step S2211, the control unit 1010 judges whether or not the files of all the mask position patterns are confirmed. When it is judged that the files of all the mask position patterns are not confirmed, the flow returns to the step S2203.

On the contrary, when it is judged in the step S2211 that the files of all the mask position patterns are confirmed, the process ends. Then, it waits for an instruction from the operator to the dialog box shown in FIG. 28.

By the processes in the above steps S2201 to S2211, the operator need not consciously register the form. That is, when the material formation application 30 is started, the file of the mask position pattern and the target form information are automatically associated and registered. After that time, when the mask process is performed to a new application document of a different form, the new target form is automatically registered by forming a mask position pattern file for the new application document according to the working procedure shown in FIG. 12, thereby improving working efficiency.

Moreover, as in the related background art, it is possible to manually designate, associate and register the file of the arbitrary mask position pattern and its form information by providing a registration button in the dialog box of the material formation application 30 shown in FIG. 28.

Figure 23:
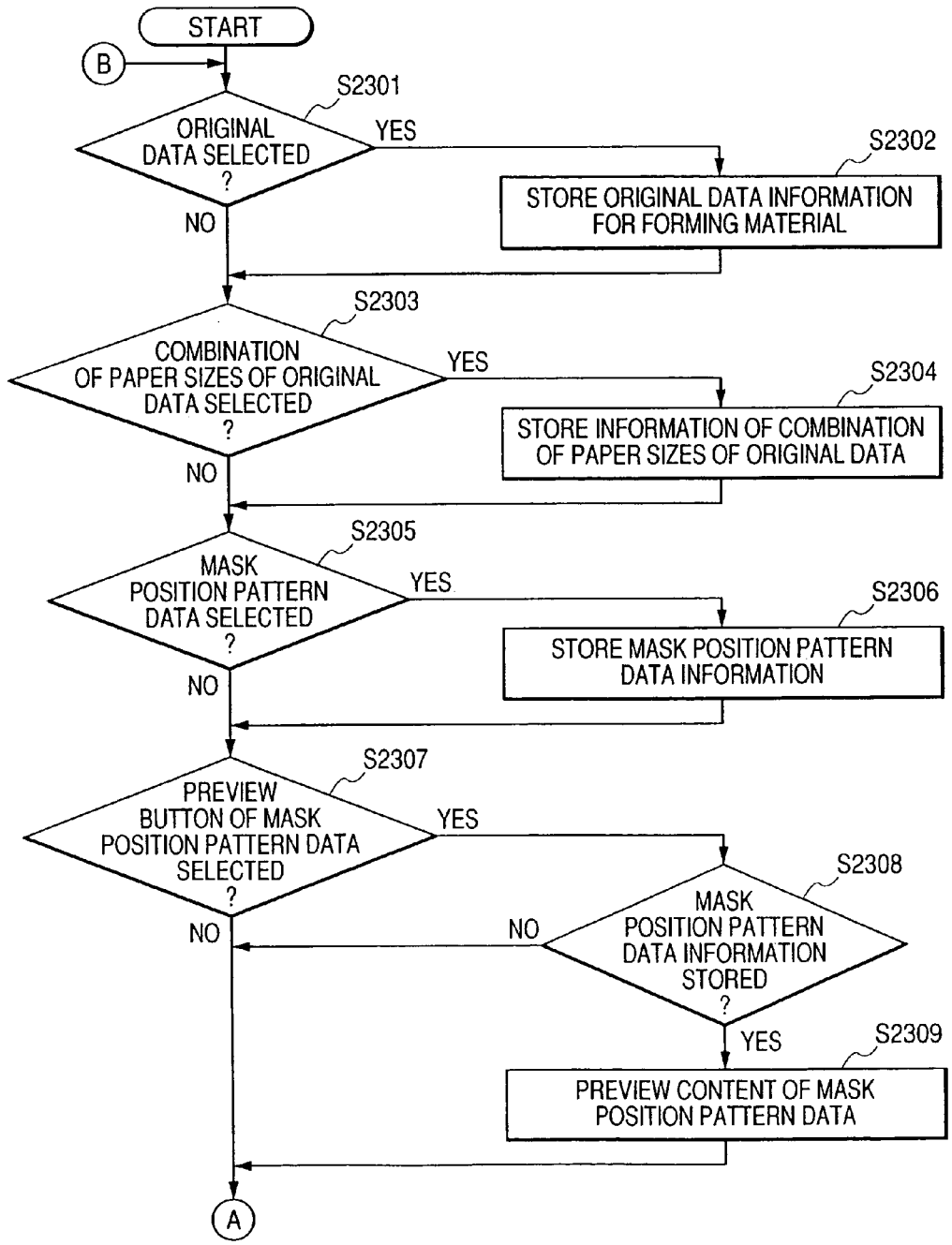
FIG. 23 which is composed of FIGS. 23A and 23B is a flow chart showing an example of various setting processes in the third data processing procedure.

Subsequently, the material formation process using the user interface based on the material formation application 30 will be explained with reference to FIG. 23 which is composed of FIGS. 23A and 23B. Here, it should be noted that the process in FIGS. 23A and 23B corresponds to the process of the step S2003 in FIG. 20.

First, in a step S2301, it is judged whether or not the original data for forming the material is selected in the dialog box shown in FIG. 27. Here, it should be noted that the original data indicates the file which is displayed in the original scan data list box and the processed original data list box.

When the file displayed in the original scan data list box is selected and the material formation button BT2 shown in FIG. 28 is depressed, the control unit 1010 of the host 10 automatically moves the selected file to the "processed original data" (scan-store) folder. After that, the file in question is displayed in the original scan data list box.

Thus, it is possible to reduce operator's working to move the file.

Moreover, because the area (section) for displaying the file is automatically changed, it is possible to easily discriminate material-unformed original data and material-formed original data, whereby it is possible to avoid an operator's error in selecting the file. Furthermore, it is possible to improve efficiency in searching when the once-formed material is again formed.

In any case, when it is judged by the control unit 1010 in the step S2301 that the original data is selected, the information concerning the original data for forming the material is stored in the RAM 1030-1 of the storage unit 1030 of the host 10 (step S2302), and the flow advances to a step S2303.

On the contrary, when it is judged by the operator in the step S2301 that the original data is not selected, it is further judged by the control unit 1010 whether or not the combination of paper sizes of the original data is selected in the dialog box of FIG. 28 (step S2303). Then, when it is judged that the combination of paper sizes of the original data is selected, the information concerning the combination of paper sizes of the original data is stored in the RAM 1030-1 (step S2304).

Incidentally, in the present embodiment, the combinations of the paper sizes of the original data include, e.g., "A4 single-sided paper+A4 single-sided paper+A3 single-sided paper", "A4 single-sided paper+A4 single-sided paper+A4 single-sided paper+A4 single-sided paper", "A4 single-sided paper+A4 single-sided paper+A4 double-sided paper" and the like. However, the present invention is of course applicable to another combination of paper sizes.

On the other hand, when it is judged by the control unit 1010 in the step S2303 that the combination of paper sizes of the original data is not selected, it is further judged on the dialog box shown in FIG. 28 whether or not the mask position pattern data is selected (step S2305). When it is judged by the control unit 1010 that the mask position pattern data is selected, the information concerning the mask position pattern data is stored in the RAM 1030-1 (step S2306), and the flow advances to a step S2307.

On the other hand, when it is judged by the control unit 1010 in the step S2305 that the mask position pattern data is not selected, it is further judged on the dialog box shown in FIG. 28 whether or not a preview button PVB1 of the mask position pattern data is selected (step S2307). When it is judged by the control unit 1010 that the preview button PVB1 of the mask position pattern data is selected, it is further judged by the control unit 1010 whether or not the information concerning the mask position pattern data is stored in the RAM 1030-1 (step S2308). When it is judged by the control unit 1010 that the information concerning the mask position pattern data is not stored, the flow advances to a step S2310.

On the other hand, when it is judged by the control unit 1010 in the step S2308 that the information concerning the mask position pattern data is stored, the information (i.e., a file name, etc.) concerning the mask position pattern data stored in the RAM 1030-1 is obtained. Then, the page information is displayed in a tree view area TVE, and the file content is displayed in a preview area PVE. Moreover, a file name FN is displayed at the bottom of the preview area PVE (step S2309).

Incidentally, in addition to the content of the form data, the mask data can be displayed in the preview area PVE. Besides, the preview content can be changed by changing the page information in the tree view area TVE with use of the input unit 1070 such as the mouse or the like. Moreover, in a case where the mask position pattern data consists of plural pages, the mask data can be confirmed with respect to each page.

Hereinafter, the flow chart of FIGS. 23A and 23B will be explained again.

When it is judged by the control unit 1010 in the step S2307 that the preview button PVB1 of the mask position pattern data is not selected, it is further judged on the dialog box shown in FIG. 28 whether or not the cover data is selected (step S2310). When it is judged by the control unit 1010 that the cover data is selected, the information concerning the cover data is stored in the RAM 1030-1 (step S2311), and the flow advances to a step S2312.

On the other hand, it is judged by the control unit 1010 in the step S2310 that the cover data is not selected, it is further judged by the control unit 1010 whether or not the preview button of the cover data is selected in the dialog box (step S2312). When it is judged by the control unit 1010 that the preview button of the cover data is selected, it is further judged whether or not the information concerning the cover data is stored in the RAM 1030-1 (step S2313). Then, when it is judged by the control unit 1010 that the information concerning the cover data is not stored in the RAM 1030-1, the flow advances to a step S2315.

On the other hand, when it is judged in the step S2313 that the information concerning the cover data is stored in the RAM 1030-1, the information (i.e., a file name, etc.) concerning the cover data stored in the RAM 1030-1 is obtained. Then, the page information is displayed in the tree view area TVE, and the page content (i.e., an image) is displayed in the preview area PVE. Moreover, the file name is displayed at the bottom of the preview area PVE (step S2314).

Incidentally, when it is judged by the control unit 1010 in the step S2312 that the preview button of the cover data is not selected, it is further judged whether or not a material format is selected in the dialog box shown in FIG. 28 (step S2315). Here, when it is judged by the control unit 1010 that the material format is selected, the information concerning the material format is stored in the RAM 1030-1 (step S2316).

Incidentally, the material format in the present embodiment includes A3-double stapling, A3-no stapling, A4-double stapling, and the like by way of example. However, the present invention is also applicable to another material format.

On the other hand, when it is judged in the step S2315 that the material format is not selected, it is further judged by the control unit 1010 whether or not a display update button BT1 is depressed on the dialog box shown in FIG. 28 (step S2317). When it is judged by the control unit 1010 that the display update button BT1 is depressed, the target folder of the material formation application 30 is searched, and the information concerning the existing file is collected and obtained. Then, the obtained information is stored in the RAM 1030-1, and the stored information is reflected on the dialog box (step S2318).

On the other hand, when it is judged by the control unit 1010 in the step S2317 that the display update button BT1 is not selected, it is further judged whether or not the material formation button BT2 is selected on the dialog box shown in FIG. 28 (step S2319). When it is judged by the control unit 1010 that the material formation button BT2 is selected, various setting processes for material formation shown in FIGS. 23A and 23B end for performing another process.

Figure 23B:
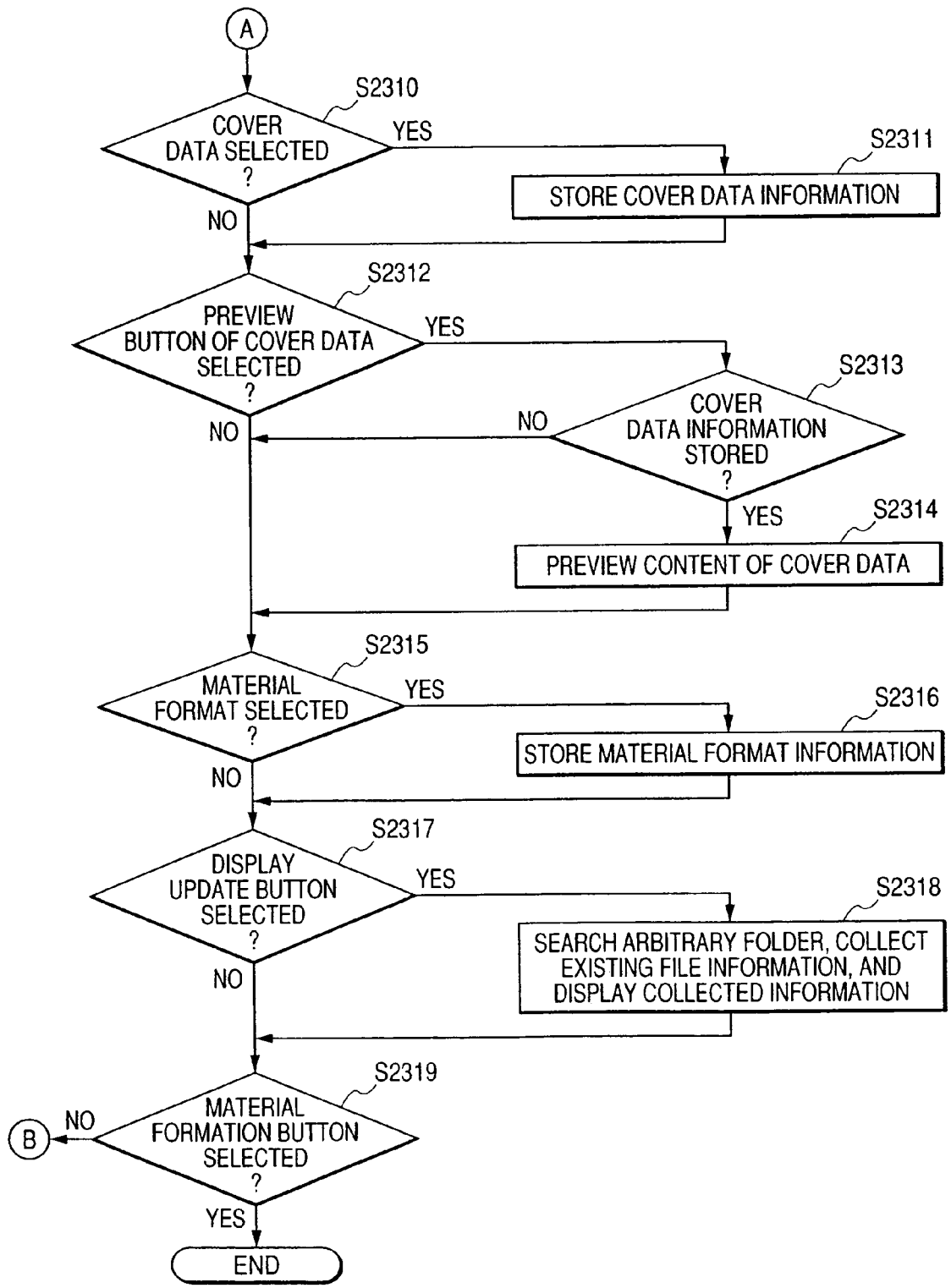

On the other hand, when it is judged by the control unit 1010 in the step S2319 that the material formation button BT2 is not selected, the flow returns to the step S2301 of the flow chart in FIGS. 23A and 23B.

Figure 24:
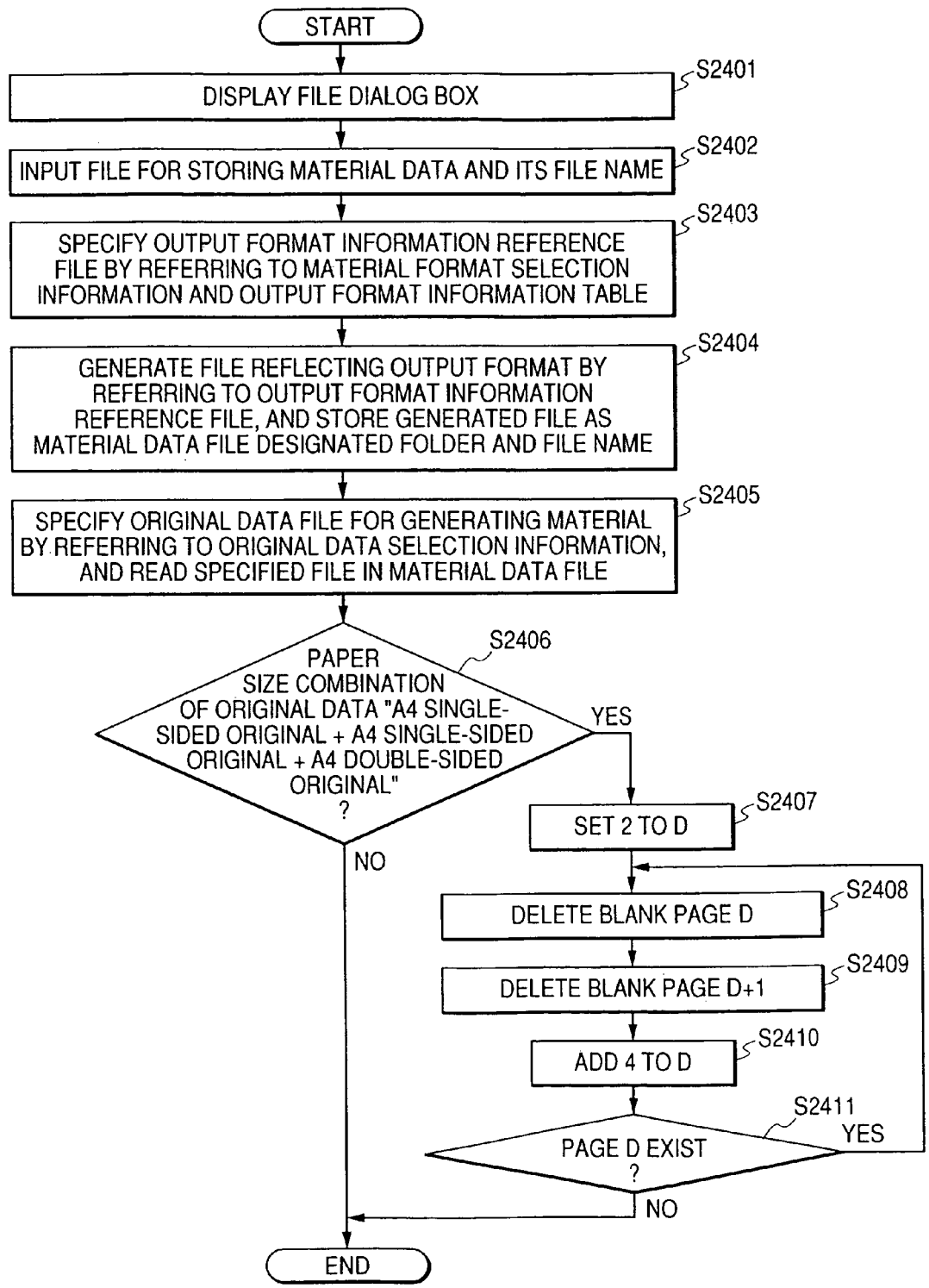
FIG. 24 is a flow chart showing an example of a material data storage process, a blank data detection process and a correction process in the third data processing procedure.

Next, a file storage process, a blank data detection process, and a blank data elimination process to be performed based on the material formation application 30 will be explained with reference to FIG. 24. Here, it should be noted that the process in FIG. 24 corresponds to the process of the step S2004 in FIG. 20.

First, in a step S2301, it is judged whether or not the original data for forming the material is selected in the dialog box shown in FIG. 27. Here, it should be noted that the original data indicates the file which is displayed in the original scan data list box and the processed original data list box.

When it is judged in the step S2319 that the material formation button BT2 is depressed by the operator, the control unit 1010 causes the display unit 1040 of the host 10 to display a not-shown file storage dialog box to urge the operator to designate the folder to which the material data is stored and to input an arbitrary file name (step S2401). Thus, the operator designates the folder to which the material data is stored and further inputs the arbitrary file name (step S2402).

Next, the control unit 1010 refers to material format information stored in the RAM 1030-1 of the storage unit 1030 and an output format information table shown in FIG. 31 existing in the material formation application 30, and thus specifies an output format reference file (step S2403).

FIG. 31 is the diagram showing an example of the output format information table stored in the RAM 1030-1 of the storage unit 1030 shown in FIG. 1.

Here, it is assumed that the material format information "A3-double stapling" is stored and an output format reference file "A3DoubleStaple.dat" is specified on the output format information table.

Next, the control unit 1010 refers to the output format reference file "A3DoubleStaple.dat" to obtain the output format information, and generates the data on which the obtained information is reflected. Then, the control unit 1010 stores the file as the material data in the disk device 1030-3 of the storage unit 1030 by using the folder and the file name designated by the operator in the step S2402 (step S2404).

Next, the control unit 1010 refers to the information concerning the original data stored in the RAM 1030-1, specifies the file of the original data for which the material is formed, and then reads the specified file together with the material data stored in the step S2404 (step S2405).

Here, it is assumed that "200301230127.pdf" is stored as the information concerning the original data and its file content is read together with the material data.

Then, the control unit 1010 refers to the information concerning the combination of paper sizes of the original data stored in the RAM 1030-1 of the storage unit 1030 and thus judges whether or not the information in question indicates "A4 single-sided paper+A4 single-sided paper+A4 double-sided paper" (step S2406).

When it is judged by the control unit 1010 that the information concerning the combination of paper sizes of the original data indicates "A4 single-sided paper+A4 single-sided paper+A4 double-sided paper", "2" is set to a variable D used in a later-described process of deleting an unnecessary page.

Next, the control unit 1010 deletes page D data being the blank page (step S2408), and also deletes page D+1 data being the blank page (step S2409).

Subsequently, the control unit 1010 adds "4" to the variable D (step S2410), and judges whether or not a page D exits (step S2411). When it is judged by the control unit 1010 that the page D exists, the flow returns to the step S2408.

Thus, it is possible by repeating the steps S2408 to S2411 to automatically delete all blank pages even if plural sets of originals exist, whereby an efficient operation can be achieved.

On the other hand, when it is judged by the control unit 1010 in the step S2411 that the page D does not exit, the flow advances to a next process.

Figure 25:
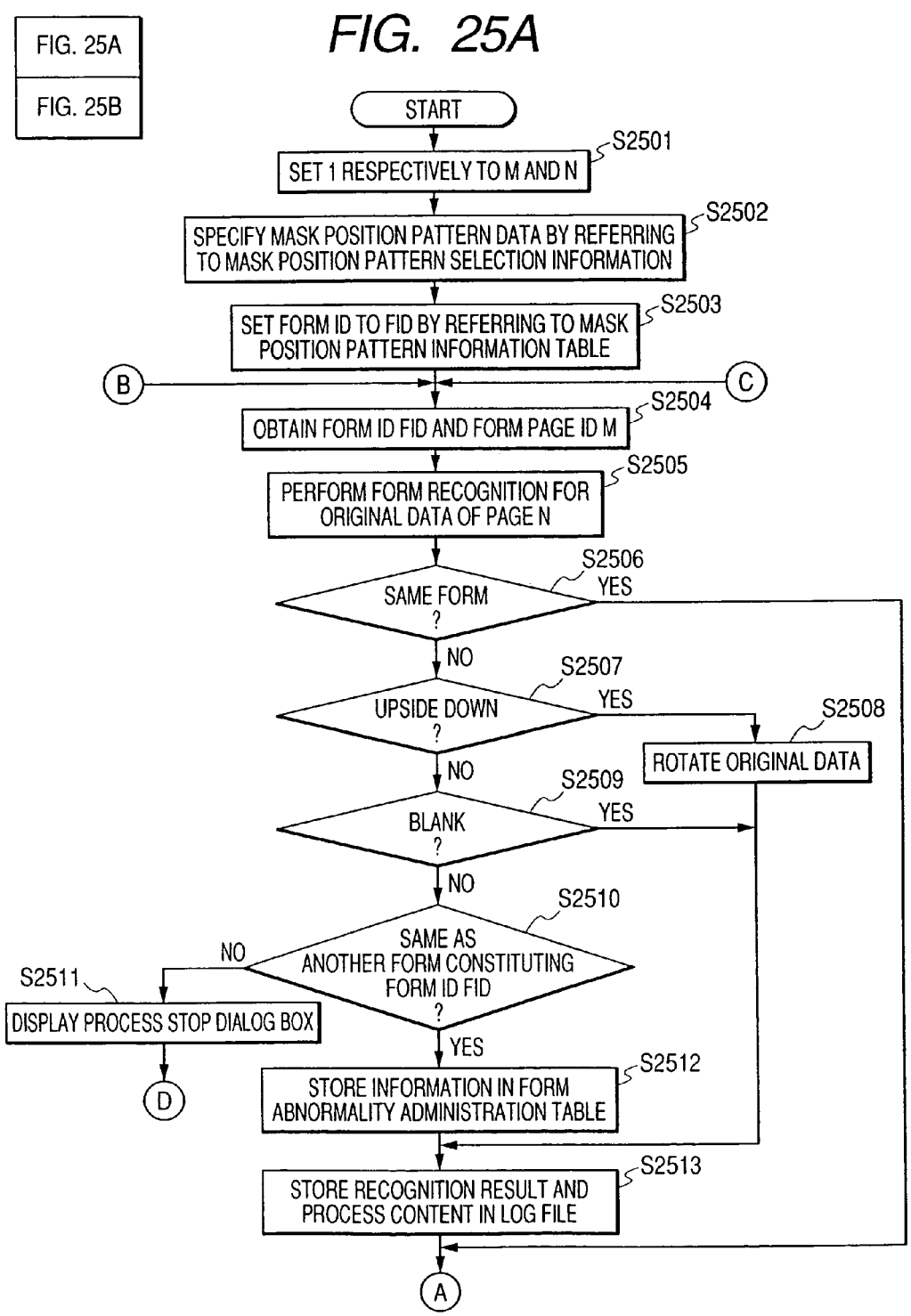
FIG. 25 which is composed of FIGS. 25A and 25B is a flow chart showing an example of a material data inversion and order detection process and a correction process in the third data processing procedure.
Figure 25B:
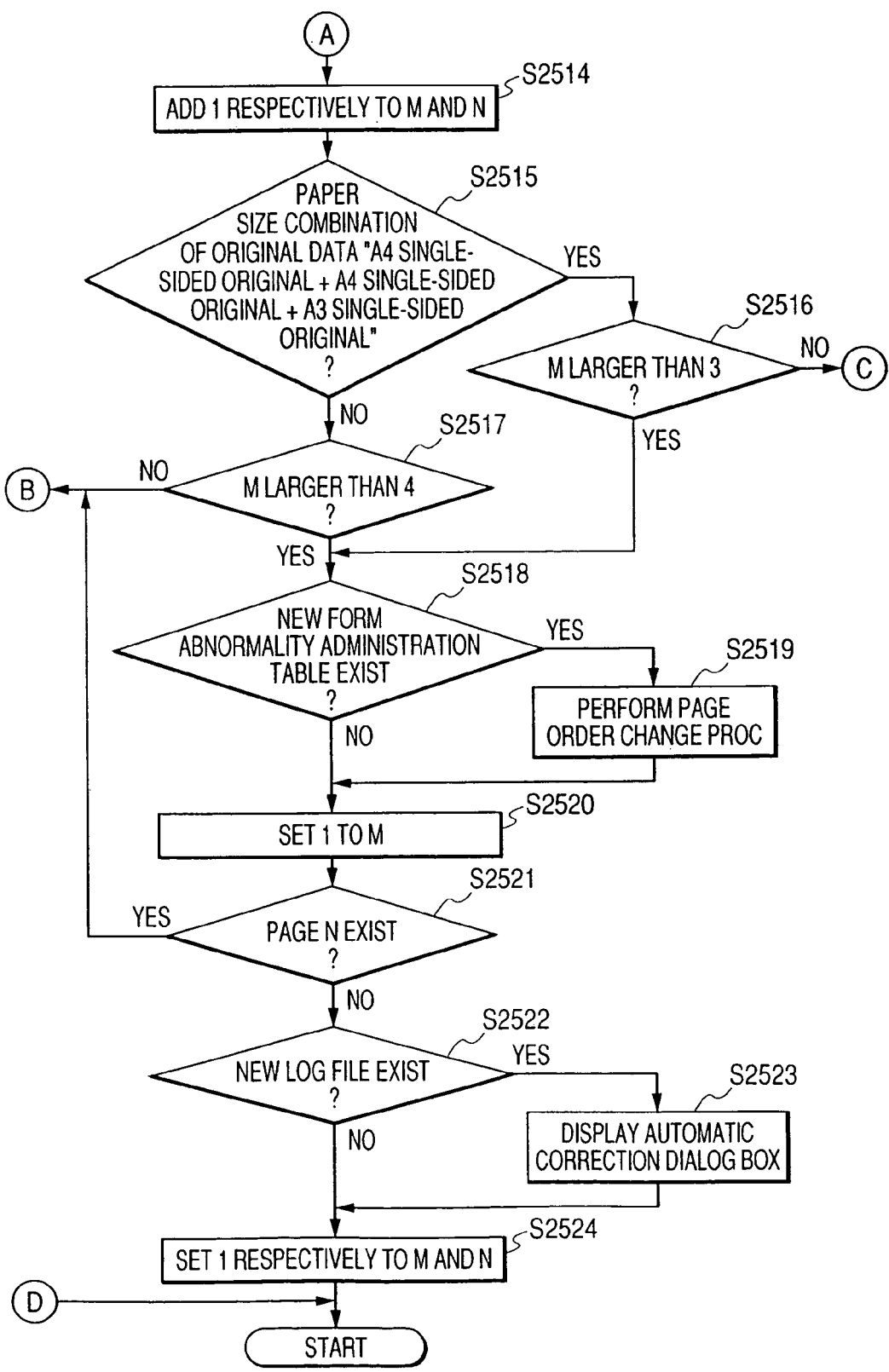

Subsequently, a process of correcting direction and order of the original data according to the material formation application 30 will be explained with reference to FIG. 25 which is composed of FIGS. 25A and 25B. Here, it should be noted that the process in FIGS. 25A and 25B corresponds to the process in the step S2005 in FIG. 20.

First, the control unit 1010 of the host 10 sets an initial value "1" to a variable M indicating a page number of the mask position pattern data used in the mask process, and likewise sets an initial value "1" to a variable N indicating a page number of the material data (step S2501).

Next, the control unit 1010 refers to the information concerning the mask position pattern data stored in the RAM 1030-1 of the storage unit 1030 and thus specifies the mask position pattern data (step S2502).

Here, it is assumed that the file "mask position-A4A4A3-basic.iwd" is stored as the information concerning original data, and the content of this file is equivalent to the file content shown in FIG. 16.

Next, in a step S2503, the control unit 1010 refers to the mask position pattern information table (FIG. 29) stored in the disk device 1030-3 of the storage unit 1030, and sets the form ID of the mask position pattern specified in the step S2502 to an FID being as a parameter. Here, it is assumed that "1" is set as the data of the FID.

Moreover, the control unit 1010 obtains the form ID FID and the form page ID M (i.e., the page number of the mask position pattern data) (step S2504), and specifies the form information being a form recognition target from the form information table (FIG. 30).

Subsequently, the control unit 1010 performs the form recognition to the data of the page N (i.e., the original data read into the material data) being the page of the material data, by using the form information specified in the step S2504 (step S2505). Then, it is judged in a next step S2506 whether or not the form is the same, and the flow advances to a step S2514 when it is judged that the form is the same.

On the other hand, when it is judged by the control unit 1010 in the step S2506 that the form is not the same, it is further judged whether or not the page N of the original data read into the material data is upside down with respect to the form (step S2507). For example, in FIG. 27, it is judged that the fourth page (N=4, M=1) is upside down.

When it is judged by the control unit 1010 in the step S2507 that the page is upside down, the page image of the material data (i.e., the original data read into the material data) is rotated by 180° and then stored (step S2508), and the flow advances to a step S2513.

Hereinafter, the flow chart of FIGS. 25A and 25B will be explained again.

In the step S2513, the control unit 1010 stores the recognition result and the processed content in a log file stored in the disk device 1030-3 of the storage unit 1030 as shown in FIG. 32. Here, it should be noted that the log file is newly formed if it does not exist in the disk device 1030-3. In that case, the page number, the detected result that the page is upside down, and the automatically corrected content are stored.

FIG. 32 is the schematic diagram showing an example of the log file in the document administration system according to the present invention.

On the other hand, when it is judged by the control unit 1010 in the step S2507 that the data read into the material data is not upside down with respect to the form, the flow advances to a step S2509. Then, it is judged in the step S2509 whether or not the original data read into the material data is blank. For example, in FIG. 27, it is judged that the eighth page (N=8, M=2) is blank.

When it is judged by the control unit 1010 in the step S2509 that the original data read into the material data is blank, the control unit 1010 of the host 10 stores the recognition result and the processed content in the log file of the disk device 1030-3 of the storage unit 1030 as shown in FIG. 32. In that case, the page number, the detected result that the page is blank, and a fact that no correction is performed are stored.

On the other hand, when it is judged by the control unit 1010 in the step S2509 that the original data read into the material data is not blank, the flow advances to a step S2510.

Then, it is judged by the control unit 1010 in the step S2510 whether or not the form of the original data is the same as another form constituting the form ID FID. When it is judged that the form of the original data is the same as another form constituting the form ID FID, the control unit 1010 stores a form abnormality administration table as shown in FIG. 33 in the disk device 1030-3 (step S2512).

FIG. 33 is the diagram showing an example of the structure of the form abnormality administration table. Here, the use of the form abnormality administration table will be explained with reference to the example shown in FIG. 27. That is, in case of the tenth page (N=10, M=1), the control unit 1010 specifies from the form information table that another form page ID constituting the form ID FID "1" is "2" and "3". Then, the control unit 1010 specifies the form information of M=2 and M=3, performs the form recognition sequentially, and thus judges whether or not the form of the original data is the same as another form constituting the form ID FID. That is, in this example, it is judged by the control unit 1010 that the tenth page is the same as another form ID (M=2) constituting the form ID FID (=1).

In that case, the page number (=10), the mask position pattern form page ID (=1) and the original data form ID (=2) are stored as out-of-order data in the form abnormality administration table of FIG. 33.

Likewise, in case of the eleventh page (N=11, M=2) in FIG. 27, the control unit 1010 specifies from the form information table that another form page ID constituting the form ID FID "1" is "1" and "3". Then, the control unit 1010 specifies the form information of M=1 and M=3, performs the form recognition sequentially, and thus judges whether or not the form of the original data is the same as another form constituting the form ID FID. That is, in this example, it is judged by the control unit 1010 that the eleventh page is the same as another form ID (M=1) constituting the form ID FID (=1).

As the result, the control unit 1010 stores the form abnormality administration table as shown in FIG. 33 in the disk device 1030-3 of the storage unit 1030 of the host 10 (step S2512). In that case, the page number (=11), the mask position pattern form page ID (=2) and the original data form ID (=1) are stored as out-of-order data.

Then, the control unit 1010 of the host 10 stores the recognition result and the processed content in the log file of the disk device 1030-3 of the storage unit 1030 as shown in FIG. 32. In that case, the page number and the detected content that the pages are out of order are stored (step S2513).

Incidentally, when it is judged by the control unit 1010 in the step S2510 that the material data (i.e., the original data read into the material data) is the same as another form constituting the form ID FID, the recognition result and the processed content are stored in the log file in a not-shown step. In that case, the page number and the content that the process is stopped are stored.

Then, a massage that the process is stopped is displayed on the display unit 1040 of the host 10 (step S2511).

More specifically, in the example of FIG. 27, it is judged that the thirteenth page (N=13, M=1) is not the same as other form ID's (M=1, M=2, M=3) constituting the form ID FID (=1). That is, this page is an irrelevant form original, and thus a normal material cannot be formed when the process is continued, whereby a warning is given to the operator and the process is stopped in that case.

Subsequently, in the step S2514, the control unit 1010 adds "1" respectively to the variables M and N.

Then, in a step S2515, the control unit 1010 refers to information concerning the combination of paper sizes of the original data stored in the RAM 1030-1 and judges whether or not the information in question corresponds to "A4 single-sided paper+A4 single-sided paper+A3 single-sided".

When it is judged by the control unit 1010 in the step S2515 that the information in question corresponds to "A4 single-sided paper+A4 single-sided paper+A3 single-sided", it is further judged by the control unit 1010 whether or not the variable M is larger than "3" (step S2516).

Then, when it is judged by the control unit 1010 that the variable M is not larger than "3", the flow returns to the step S2504. On the other hand, when it is judged by the control unit 1010 that the variable M is larger than "3", the flow advances to a step S2518.

Incidentally, when it is judged by the control unit 1010 in the step S2515 that the information concerning the combination of paper sizes of the original data does not correspond to "A4 single-sided paper+A4 single-sided paper+A3 single-sided", the flow advances to a step S2517.

In the step S2517, it is judged by the control unit 1010 whether or not the variable M is larger than "4". Here, when it is judged that the variable M is not larger than "4", the flow returns to the step S2504. On the other hand, when it is judged that the variable M is larger than "4", the flow advances to the step S2518.

In the step S2518, it is judged by the control unit 1010 whether or not the form abnormality administration table exists in the disk device 1030-3.

When it is judged in the step S2518 that the form abnormality administration table exists in the disk device 1030-3, the flow advances to a step S2519. In the step S2519, the control unit 1010 obtains the form abnormality administration table, performs a process of changing page order of the material data (i.e., the original data read into the material data), and then stores the processed data in the log file in a not-shown step. Here, it should be noted that the log file is newly formed if it does not exist in the disk device 1030-3. The flow then advances to a step S2520. In that case, the page number and the page-changed content are stored.

Thus, when the page order of the original data is different from that of the form, it is possible to change the page order of the original data so that the original data coincides with the form.

Hereinafter, the flow chart of FIGS. 25A and 25B will be explained again.

When it is judged by the control unit 1010 in the step S2518 that the form abnormality administration table does not exist in the disk device 1030-3, the flow advances to the step S2520.

Then, in the step S2520, the control unit 1010 sets "1" to the variable M, and the flow advances to a step S2521.

In step S2521, the control unit 1010 refers to the page N of the material data stored in the disk device 1030-3 to judge whether or not the page N exists. Here, when it is judged by the control unit 1010 that the page N exists, the flow returns to the step S2504.

On the other hand, when it is judged by the control unit 1010 in the step S2521 that the page N does not exist, the flow advances to a step S2522. Then, it is judged by the control unit 1010 in the step S2522 whether or not a new log file exists in the disk device 1030-3 of the storage unit 1030.

When it is judged by the control unit 1010 in the step S2522 that the new log file exists in the disk device 1030-3, the flow advances to a step S2523 to cause the display unit 1040 of the host 10 to display a message dialog box indicating that a problem existing in the original data has been corrected.

Then, in a step S2524, the control unit 1010 of the host 10 sets an initial value "1" to the variable M indicating the page number of the mask position pattern data used in the mask process. Likewise, the control unit 1010 sets an initial value "1" to the variable N indicating the page number of the material data. Then, the process ultimately ends.

As described above, by the processes shown in FIGS. 25A and 25B, the operator can easily know from the dialog box that the problem had been included in the original data, the problem capable of being cared has been automatically corrected, and the process was stopped due to the problem. Thus, it is possible for the operator to solve the problems in the original data by referring to the log file and thus achieve sure material formation smoothly.

Incidentally, it is possible for the operator to confirm the result of such automatic correction by using the editing application.

Moreover, with respect to the blank page detection, it is possible to replace a defective page with an essential (or original) page by using the editing application, whereby it is efficient as compared with the case where the entire operation is reattempted.

Subsequently, a process of applying preformed mask position pattern data to the original data and a process of storing the data to which the mask has been applied both performed based on the material formation application 30 will be explained with reference to FIG. 26. Here, it should be noted that the process in FIG. 26 corresponds to the process in the step S2006 of FIG. 20.

Figure 26:
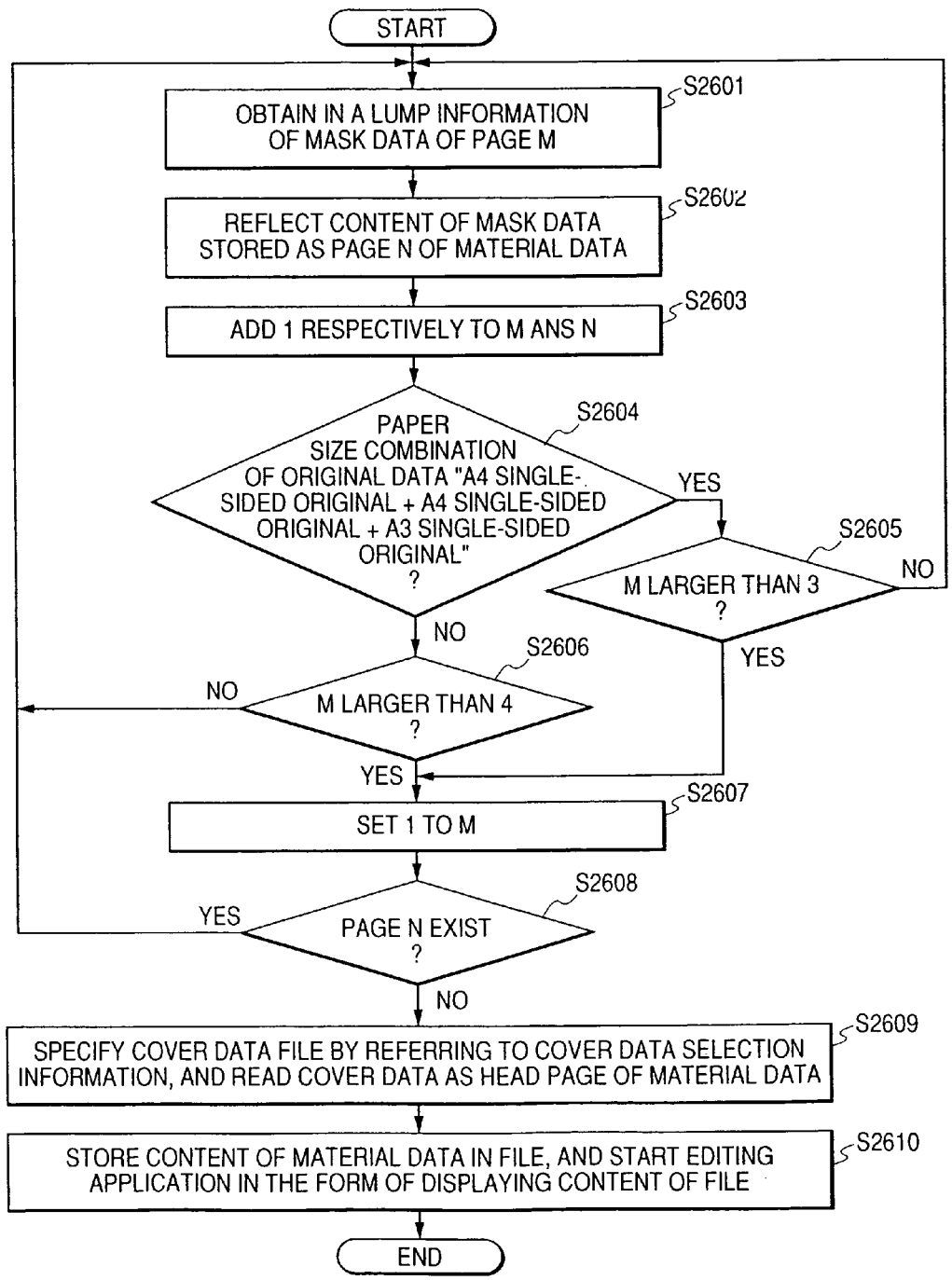
FIG. 26 is a flow chart showing an example of a mask data application process in the third data processing procedure.

In a step S2601 of FIG. 26, the control unit 1010 refers to the file "mask position-A4A4A3-basic.iwd" of the mask position pattern data stored in the disk device 1030-3 and thus obtains in a lump the information concerning the mask data of the page M.

Then, in a next step S2602, the control unit 1010 reads the data of the page N from the material data stored in the disk device 1030-3, and reflects the content of the held mask data on the read data of the page N.

Subsequently, in a next step S2603, the control unit 1010 adds "1" respectively to the variables M and N.

Subsequently, in a next step S2604, the control unit 1010 refers to the information concerning the combination of paper sizes of the original data stored in the RAM 1030-1 of the storage unit 1030 and thus judges whether or not the information in question indicates "A4 single-sided paper+A4 single-sided paper+A3 single-sided paper". Here, when it is judged by the control unit 1010 that the information concerning the combination of paper sizes of the original data indicates "A4 single-sided paper+A4 single-sided paper+A3 single-sided paper", the flow advances to a step S2605.

In the step S2605, it is judged whether or not the variable M is larger than "3".

Here, when it is judged by the control unit 1010 of the host 10 that the variable M is not larger than "3", the flow returns to the step S2601. On the other hand, when it is judged by the control unit 1010 that the variable M is larger than "3", the flow advances to a step S2607.

Incidentally, when it is judged by the control unit 1010 in the step S2604 that the information concerning the combination of paper sizes of the original data does not correspond to "A4 single-sided paper+A4 single-sided paper+A3 single-sided", the flow advances to a step S2606. In the step S2606, it is judged by the control unit 1010 whether or not the variable M is larger than "4".

Here, when it is judged in the step S2606 that the variable M is not larger than "4", the flow returns to the step S2601. On the other hand, when it is judged that the variable M is larger than "4", the flow advances to the step S2607.

Then, in the step S2607, the control unit 1010 sets "1" to the variable M, and the flow advances to a step S2608.

In step S2608, the control unit 1010 refers to the page N of the material data stored in the disk device 1030-3 of the storage unit 1030 to judge whether or not the page N exists.

Here, when it is judged by the control unit 1010 in the step S2608 that the page N exists, the flow returns to the step S2601.

Thus, by repeating the processes in the steps S2601 to S2608 up to the last page of the material, it is possible to automatically and easily apply the predetermined mask data even to the original data in which there are the plural sets of application documents each consisting of plural-page originals.

Incidentally, when it is judged by the control unit 1010 in the step S2608 that the page N does not exist, the flow advances to a step S2609.

In the step S2609, the control unit 1010 specifies the file of the cover data by referring to the information of the cover data stored in the disk device 1030-3 of the storage unit 1030, and reads the specified cover data as a headmost page. Then, the flow advances to a step S2610.

Figure 34:
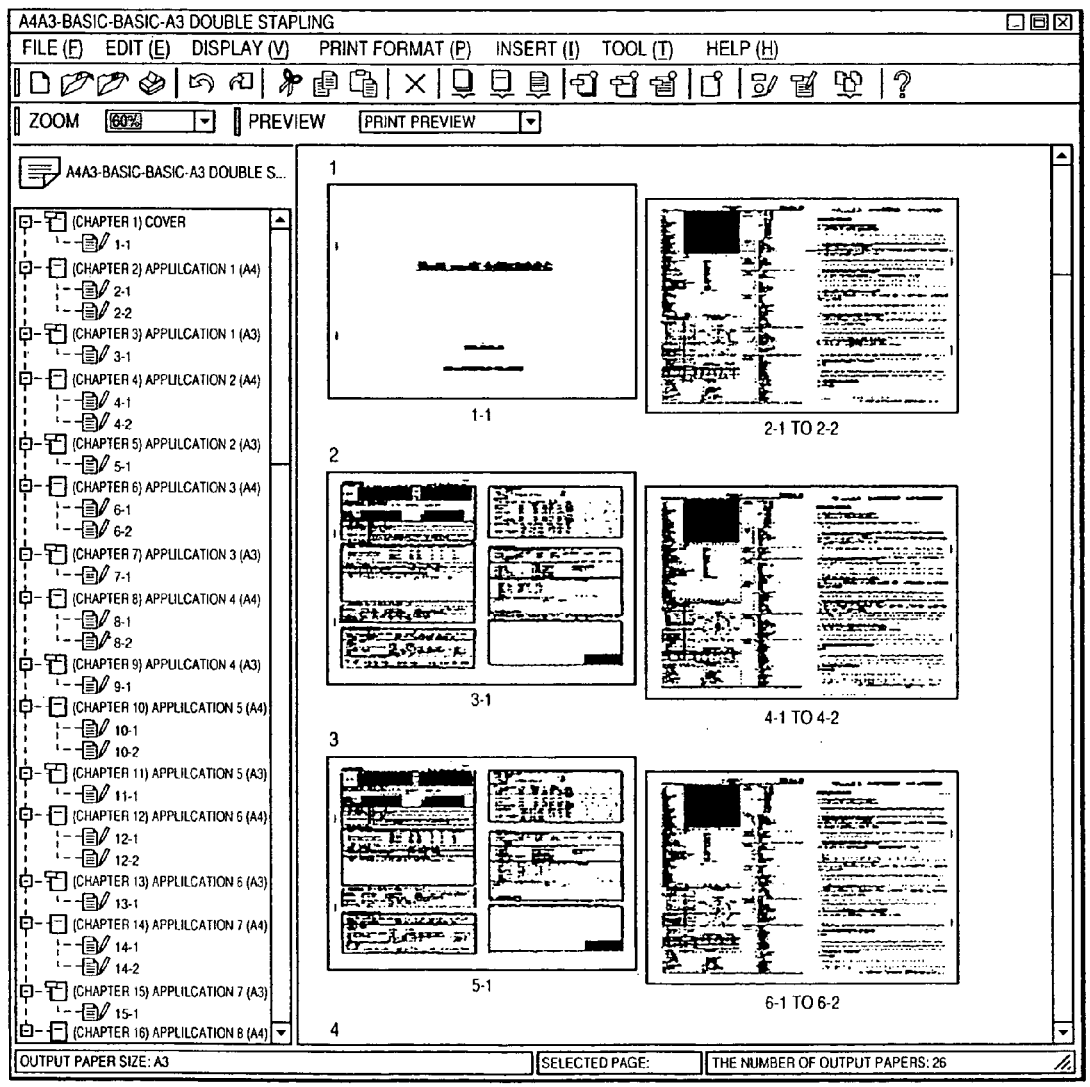
FIG. 34 is a diagram showing an example of an editing screen based on an editing application.

In the step S2610, the control unit 1010 stores the material data in the disk device 1030-3 of the storage unit 1030 as a file, reads the stored material data into the RAM 1030-1 of the storage unit 1030 of the host 10, and causes the display unit 1040 of the host 10 to display the content of the read file in the form of an application screen as shown in FIG. 34, thereby starting the editing application 40.

Thus, the process of applying the pregenerated mask data to the original data completely ends.

(Examination Document Print Process)

Subsequently, a process of adjusting a mask position, a process of adding an arbitrary mask and a process of printing a material all executable by the editing application 40 will be explained. Here, it should be noted that these processes correspond to the processes in the steps S2007 and S2008 shown in FIG. 20.

FIG. 34 is the diagram showing an example of an editing screen based on the editing application 40. That is, it is possible on the editing screen by the editing application 40 to confirm position, size and content of automatically generated mask data at a fixed position, and it is also possible to confirm a print format, a layout and the like.

Figure 35:
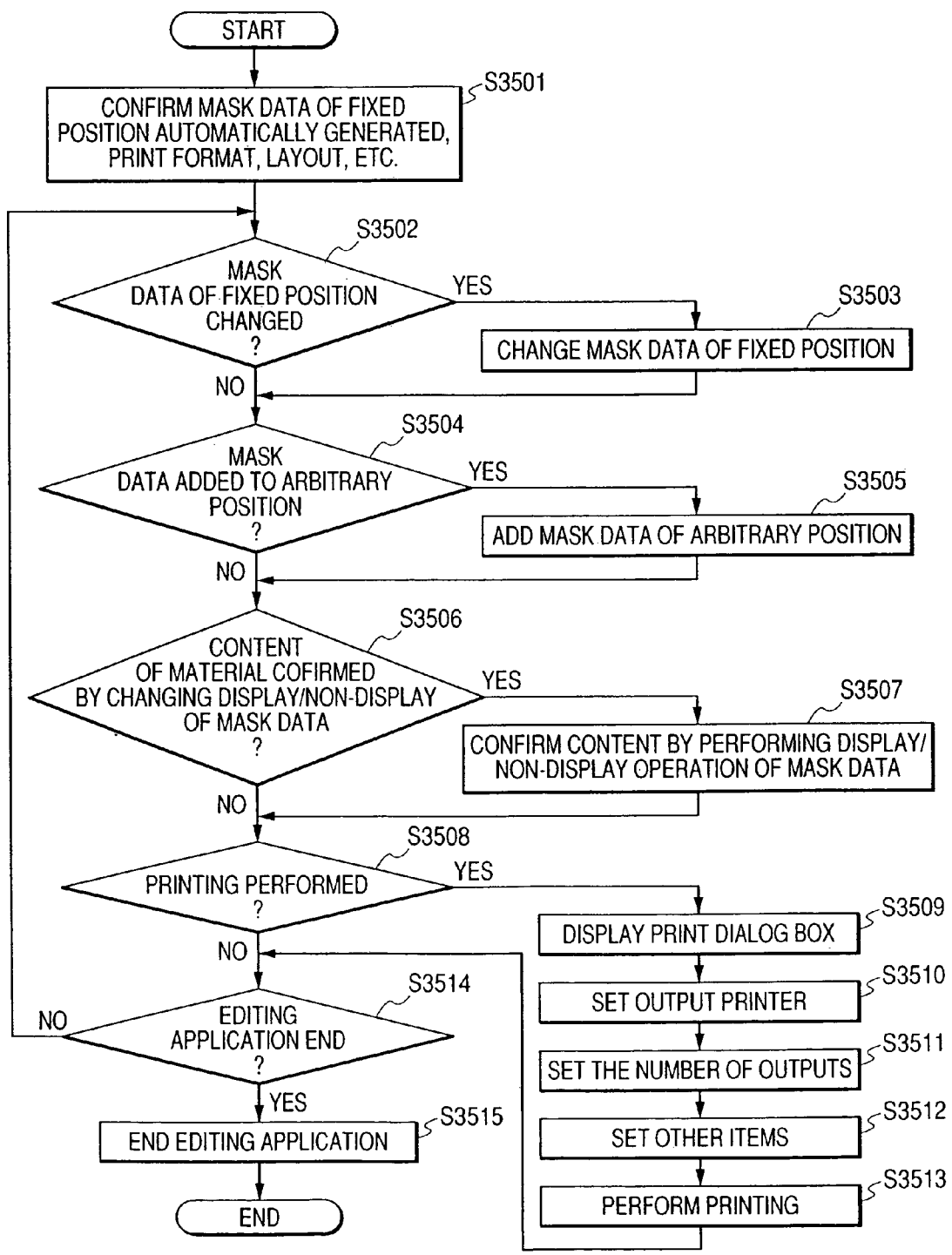
FIG. 35 a flow chart showing an example of a fourth data processing procedure in the document administration system according to the present invention.

FIG. 35 a flow chart showing an example of a fourth data processing procedure in the document administration system according to the present invention. Here, it should be noted that the process in the flow chart of FIG. 35 corresponds to the data processing procedure (i.e., a print data generation procedure) to be executed by the control unit 1010 of the host 10 of the multifunctional machine 20 shown in FIG. 1, and symbols S3501 to S3515 denote respective steps.

Initially, as described above, the control unit 1010 of the host 10 displays the material data generated based on the material formation application 30 on the screen of the editing application 40 as shown in FIG. 34, whereby the operator confirms the position, the size and the content of the mask data, the print format, the layout, and the like (step S3501).

Next, it is judged by the control unit 1010 whether or not attributes such as the mask data position, the mask data size, the mask data color, the full-surface and the like at the fixed position in the displayed material data are changed by the operator. That is, it is judged whether or not an operation to change the mask data at the fixed position is performed by the operator (step S3502). Here, when it is judged that the operation to change the mask data at the fixed position in the displayed material data is performed by the operator, the information concerning the changed mask data is stored in the RAM 1030-1 (step S3503), and the flow advances to a step S3504.

On the other hand, when it is judged by the control unit 1010 in the step S3502 that the operation to change the mask data at the fixed position in the displayed material data is not performed by the operator, the flow advances directly to the step S3504.

Then, it is judged in the step S3504 whether or not arbitrary mask data is added to the displayed material data by the operator. That is, it is judged whether or not an operation to add the mask data to an arbitrary position is performed by the operator. Here, when it is judged by the control unit 1010 that the operation to add the mask data to the arbitrary position is performed by the operator, the information concerning the added mask data is stored in the RAM 1030-1 (step S3505), and the flow advances to a step S3506.

On the other hand, when it is judged by the control unit 1010 in the step S3504 that the operation to add the arbitrary mask data to the displayed material data is not performed by the operator, the flow advances directly to the step S3506.

Then, it is judged by the control unit 1010 in the step S3506 whether or not an operation to change (or switch) displaying and non-displaying of the mask data in the displayed material data is performed by the operator. It should be noted that such a change operation is arbitrarily performed according to, e.g., a purpose for visually confirming an image existing in the masked portion.

Figure 36:
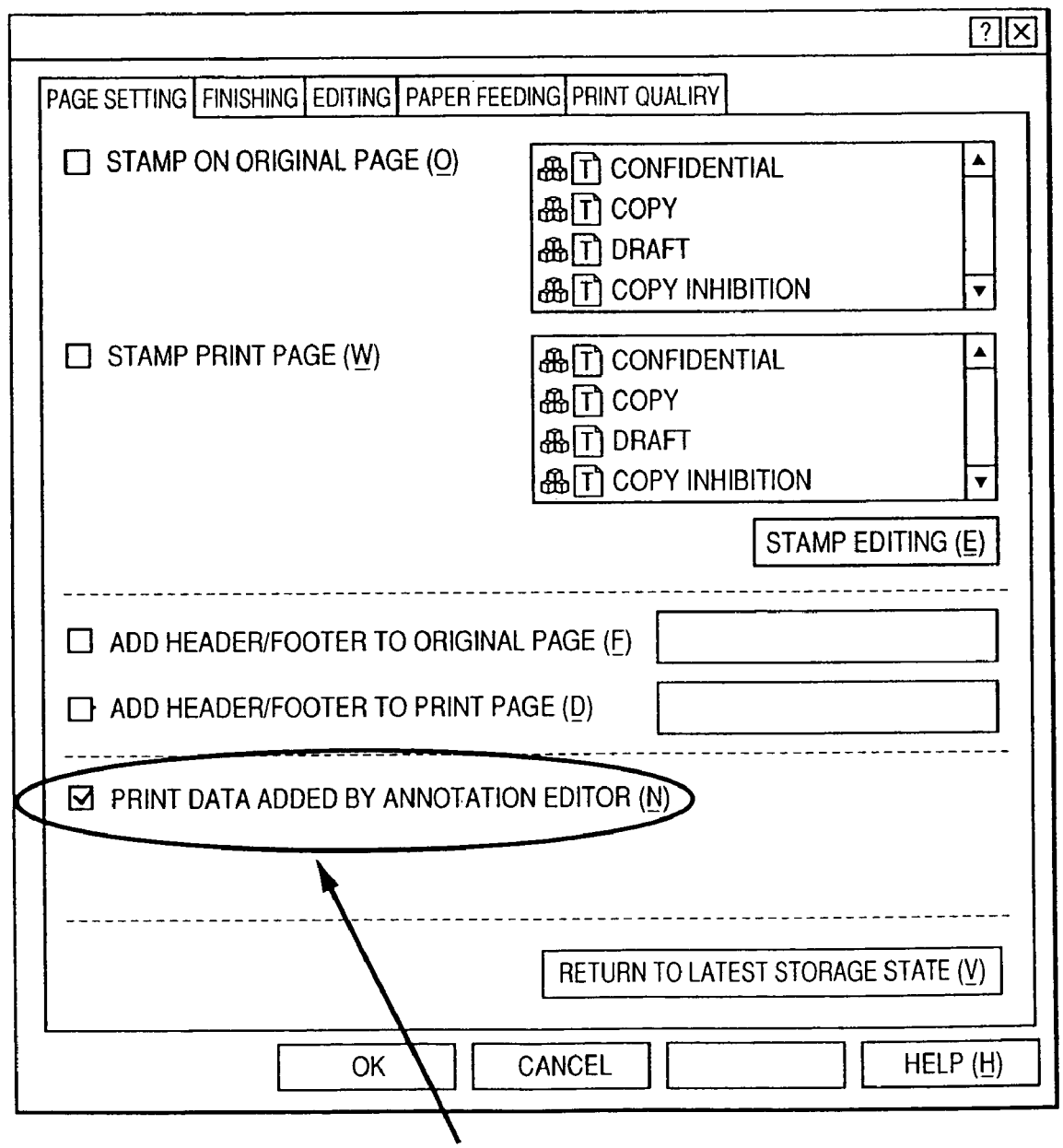
FIG. 36 is a diagram showing an example of a mask data setting dialog box.

Here, when it is judged that the operation to change the displaying and the non-displaying of the mask data is performed by the operator with use of an input screen shown in FIG. 36, the control unit 1010 performs the operation to change (or switch) the displaying and the non-displaying of the mask data in accordance with operator's handling on the input screen, whereby the operator can visually confirm the content of the material (step S3507). After then, the flow advances to a step S3508.

FIG. 36 is the diagram showing an example of a dialog box concerning print setting. As shown in FIG. 36, it is possible to perform mask data print designation/non-print designation by adding/deleting a check mark to/from a mask data print designation check box, and it is also possible to perform mask data display designation/non-display designation by adding/deleting a check mark to/from a mask data display designation check box.

Here, it is assumed that a mask data display state is being selected. Thus, when a subsequent print process is performed by changing the displaying and the non-displaying of the mask data, the masked material and the non-masked material can be easily changed over and printed.

Hereinafter, the flow chart of FIG. 35 will be explained again.

It is judged by the control unit 1010 in the step S3508 whether or not an operation to perform the print process in the displayed material data is performed by the operator. Here, when it is judged that the operation to perform the print process is performed by the operator (that is, the operator intends to perform printing), a not-shown print dialog box is displayed on the display unit 1040 of the host 10 (step S3509).

On the print dialog box, the operator sets a printer at an output destination, the number of prints, and other necessary matters, and then instructs to actually perform printing. When it is detected that the operator's instruction to perform the printing is input, the control unit 1010 sets the printer (step S3510), sets the number of prints (step S3511), sets other matters according to need (step S3512), and starts the print process (step S3513). After then, the flow advances to a step S3514.

On the other hand, when it is judged in the step S3508 that the operation to perform the print process is not performed by the operator (that is, the operator does not intend to perform printing), the flow advances directly to the step S3514.

Next, it is further judged by the control unit 1010 in the step S3514 whether or not an operation to end the editing application 40 is performed by the operator. Here, when it is judged that the operation to end the editing application 40 is not performed by the operator, the flow returns to the step S3502.

On the other hand, when it is judged by the control unit 1010 in the step S3514 that the operation to end the editing application 40 is performed by the operator, the control unit 1010 ends the editing application 40 (step S3515), and the process ultimately ends.

Incidentally, although it is not shown in the flow chart of FIG. 35, when it is instructed by the operator to perform the storage process on the basis of the editing application 40, the control unit 1010 performs the process to reflect the content corrected by the editing application 40 on the material data stored in the disk device 1030-3. In that case, it should be noted that the corrected content may be overwritten or stored with a different name.

As explained above, when the material formation application 30 and the editing application 40 are loaded into the RAM 1030-1 and then the loaded applications are executed, the control unit 1010 of the host 10 refers to the mask position pattern data to be selected, and thus generates the output data with the predetermined area masked without changing and modifying the image existing in the predetermined area of the input original data.

At that time, the control unit 1010 performs the form recognition to each page of the original data, and then judges whether or not the form recognition result of each page coincides with the page form information of each page of the form information corresponding to the mask position pattern data. Here, when it is judged by the control unit 1010 that the form recognition result of each page does not coincide with the page form information of each page of the form information corresponding to the mask position pattern data, the control unit 1010 performs the various editing processes so that the original data coincides with the form information, and further performs the output data generation process.

As explained above, according to the present invention, even if the paper original having plural pages includes a problem in its page order, it is possible to effectively generate and edit the ultimately output data appropriately mask-processed.

Moreover, the form for recognizing a format is not consciously registered by the operator but is automatically registered by the document administration apparatus (or method), whereby it is possible to remarkably improve working efficiency.

According to the present invention, the data in which the mask process has been performed only to the necessary portion can be displayed on the screen without changing the original image, that is, with the original images accumulated and maintained, whereby the confirmation operation is easy for the operator. Further, even if it is necessary to correct the mask area according to a mask designation situation, the operator can easily correct the mask area. Thus, it is possible to achieve the correct mask process suitable for an original description (or writing) situation, and it is thus possible to effectively edit and process the output data.

Moreover, because the operation to register a form can be performed in addition to the original input process, the original registration process, the original mask process, the mask editing process, the output process and the like, division of the operations can be achieved, whereby it is possible to remarkably improve working efficiency.

Incidentally, the medium reading unit 1050 includes any kinds of medium readers such as an FD drive, an MO drive, a CD-ROM drive, an IC memory card drive and the like. Further, the target to be read by the medium reading unit 1050 may include any kinds of recording media such as a had disk, a magnetooptical disk, a CD-ROM, an IC memory card and the like.

Hereinafter, the structure of a data processing program capable of being read by the document administration system according to the present invention will be explained with reference to a memory map shown in FIG. 37.

FIG. 37 is the diagram for explaining the memory map of a storage medium which stores the various data processing programs capable of being read by the document administration system according to the present invention.

Incidentally, although it is not illustrated specifically, also information (including version information, creator information, etc.) for administrating the program groups stored in the storage medium may occasionally be stored in the storage medium, and information (including icon information for discriminatively displaying a program, etc.) depending on an OS or the like on the program reading side may occasionally be stored in the storage medium.

Moreover, the data depending on the various programs are administrated on the directory of the storage medium. Besides, a program install various programs into a computer, a program to uncompress installed programs and data when the installed programs and data have been compressed, and the like are occasionally stored.

Furthermore, the functions shown in FIGS. 13, 18, 20 to 26, and 35 may be executed by a host computer based on externally installed programs. In that case, the present invention is applicable even in a case where an information group including programs is supplied from a storage medium (such as a CD-ROM, a flash memory, an FD or the like) or an external storage medium through a network to an output apparatus.

Incidentally, it is needless to say that the object of the present invention can be achieved in a case where the storage medium storing the program codes of software to realize the functions of the above embodiment is supplied to a system or an apparatus and then a computer (or CPU or MPU) in the system or the apparatus reads and executes the program codes stored in the storage medium.

In that case, the program codes themselves read from the storage medium realize the new functions of the present invention, whereby the storage medium storing these program codes constitutes the present invention.

Therefore, because the form of program is no object if it has an actual function as the program, an object code, a program executed by an interpreter, script data supplied to an OS, and the like may be included as the program.

As the storage medium for supplying the program codes, for example, a flexible disk, a hard disk, an optical disk, a magnetooptical disk, a CR-ROM, a CD-R, a CD-RW, a DVD-ROM, a magnetic tape, a nonvolatile memory card, a ROM, an EEPROM, a silicon disk or the like can be used.

Besides, as a method of supplying programs, there is a method of connecting with a home page on the Internet by using a browser of a client computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different home pages. That is, a WWW server, an FTP (file transfer protocol) server and the like for downloading the program files for achieving the function processes of the present invention with use of the computer to plural operators are included in the scope of the present invention.

Moreover, it is possible to encrypt the program of the present invention, store the encrypted program in a storage medium such as a CD-ROM or the like, distribute the obtained storage media to operators, cause the operator who has satisfied a predetermined condition to download key information for decrypting the encrypted program from the home page through the Internet, cause the operator in question to install the decrypted program into an appropriate computer, and thus achieve the functions of the present invention.

Moreover, it is needless to say that the present invention includes not only a case where the functions of the above embodiment are realized by executing the program codes read by the computer, but also a case where an OS (operating system) or the like functioning on the computer executes a part or all of the actual process according to instructions of the program codes, whereby the functions of the above embodiment are achieved by that process.

Furthermore, it is needless to say that the functions of the above embodiment can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

While the present invention has been described with reference to what is presently considered to be the preferred embodiment, it is to be understood that the invention is not limited to the disclosed embodiment. On the contrary, the present invention is intended to cover various modifications and equivalent arrangements (including the organic combination of respective embodiments) included within the spirit and scope of the appended claims. The scope of the following claims is to be accorded the broadest interpretation so as to encompass all such modifications and equivalent structures and functions.

What is claimed is:

1. A document administration apparatus, comprising:
   a first storage unit constructed to store a plurality of sets of original data, each set of the plurality of sets of original data including a plurality of pages;
   a mask data generation unit constructed to generate mask data to effect masking of at least one predetermined area of a certain one of the plurality of sets of the original data stored in said first storage unit, the mask data comprising a plurality of mask position patterns, each mask position pattern provided for a plurality of pages;
   a second storage unit constructed to store the plurality of mask position patterns generated by said mask data generation unit, wherein the plurality of mask position patterns can be applied for the plurality of sets of original data stored in said first storage unit;
   a selection unit constructed to select one of the plurality of mask position patterns stored in said second storage unit;
   a display unit constructed to display the mask position pattern selected by said selection unit in a state such that the mask position pattern is superposed on the one set of original data, without changing the one set of original data; and
   an editing unit constructed to edit the mask position pattern displayed on said display unit,
   wherein the masking is effected by applying an N-th page of the mask position pattern selected by said selection unit to an N-th page of the plurality of pages forming the one set of original data stored in said first storage unit, wherein the masking is repeated for others of the plurality of sets of original data using the selected mask position pattern, and wherein the plurality of pages have different sizes.

2. A document administration apparatus according to claim 1, further comprising a display change unit constructed to instruct displaying and non-displaying of the mask data to be displayed on said display unit.

3. A document administration apparatus according to claim 1, further comprising an output data generation unit constructed to generate output data based on the original data,
   wherein said output data generation unit includes
   an output format holding unit constructed to hold output format information of the output data,
   an output format designation unit constructed to accept designation of the output format information held by said output format holding unit, and
   an output data generator constructed to generate the output data such that the output format information designated by said output format designation unit is applied to the original data selected by said selection unit.

4. A document administration apparatus according to claim 3, wherein said output data generator compares a page constitution of the original data selected by said selection unit with the output format information designated by said output format designation unit, and processes the original data based on a compared result so that the original data coincides with the output format information.

5. A document administration apparatus according to claim 3, further comprising:
   a cover data generation unit constructed to generate cover data constituting a part of the output data; and
   a cover data selection unit constructed to select the cover data generated by said cover data generation unit, before the output data is generated by said output data generation unit.

6. A document administration apparatus according to claim 1, wherein the mask data generated by said mask data generation unit includes form information, the apparatus further comprising:
   a form information obtaining unit constructed to obtain the form information from the mask data generated by said mask data generation unit;
   a form information registration unit constructed to add, in units of form and in units of page constituting the form, inherent information to the form information obtained by said form information obtaining unit, and store and register the obtained information;
   mask data information registration unit constructed to associate the inherent information in units of form stored and registered in said form information registration unit with inherent information of the mask data, and store and register the associated information; and
   form information comparison unit constructed to compare the form information obtained by said form information obtaining unit with the form information stored and registered in said form information registration unit,
   wherein, when it is judged as a result of the comparison by said form information comparison unit that the form information obtained by said form information obtaining unit is the same as the form information already stored and registered in said form information registration unit, the inherent information in units of form of the already stored and registered form information is associated with the mask data being the origin of the form information obtained by said form information obtaining unit, and the associated information is stored and registered in said mask data information registration unit.

7. A document administration apparatus according to claim 6, further comprising:
   an original data comparison unit constructed to compare the original data with the form information stored and registered in said form information registration unit; and
   a correction unit, when it is judged by said original data comparison unit that the original data does not coincide with the form information, constructed to correct the original data so that the original data coincides with the form information.

8. A document administration method of a document administration apparatus, comprising:
   an original data storage step of storing a plurality of sets of original data, each set of the plurality of sets of original data including a plurality of pages;
   a mask data generation step of generating mask data to effect masking of at least one predetermined area of a certain one of the plurality of sets of the original data stored in said original data storage step, the mask data comprising a plurality of mask position patterns, each mask position pattern provided for a plurality of pages;
   a mask data storage step of storing the plurality of mask position patterns generated in said mask data generation step, wherein the plurality of mask position patterns can be applied for the plurality of sets of original data stored in said original data storage step;
   a selection step of selecting one of the plurality of mask position patterns stored in said mask data storage step;
   a display step of displaying the mask position pattern selected in said selection step in a state such that the mask position pattern is superposed on the one set of original data, without changing the one set of original data; and an editing step of enabling to edit the mask position pattern displayed in said display step, wherein the masking is effected by applying an N-th page of the mask position pattern selected in said selection step to an N-th page of the plurality of pages forming the one set of original data stored in said original data storage step, wherein the masking is repeated for others of the plurality of sets of original data using the selected mask position pattern, and wherein the plurality of pages have different sizes.

9. A document administration method according to claim 8, further comprising a display change step of instructing displaying and non-displaying of the mask data displayed in said display step.

10. A document administration method according to claim 8, further comprising an output data generation step of generating output data based on the original data, wherein said output data generation step includes an output format holding step of holding output format information of the output data, an output format designation step of accepting designation of the output format information held in said output format holding step, and a subordinate output data generation step of generating the output data such that the output format information designated in said output format designation step is applied to the original data selected in said selection step.

11. A document administration method according to claim 10, wherein said subordinate output data generation step compares a page constitution of the original data selected in said selection step with the output format information designated in said output format designation step, and processes the original data based on a compared result so that the original data coincides with the output format information.

12. A document administration method according to claim 10, further comprising:

a cover data generation step of generating cover data constituting a part of the output data; and a cover data selection step of enabling to select the cover data generated in said cover data generation step, before the output data is generated in said output data generation step.

13. A document administration method according to claim 8, wherein the mask data generated in said mask data generation step includes form information, the method further comprising:

a form information obtaining step of obtaining the form information from the mask data generated in said mask data generation step;

a form information registration step of adding, in units of form and in units of page constituting the form, inherent information to the form information obtained in said form information obtaining step, and storing and registering the obtained information;

a mask data information registration step of associating the inherent information in units of form stored and registered in said form information registration step with inherent information of the mask data, and storing and registering the associated information; and a form information comparison step of comparing the form information obtained in said form information obtaining step with the form information stored and registered in said form information registration step, wherein, when it is judged as a result of the comparison in said form information comparison step that the form information obtained in said form information obtaining step is the same as the form information already stored and registered in said form information registration step, the inherent information in units of form of the already stored and registered form information is associated with the mask data being the origin of the form information obtained in said form information obtaining step, and the associated information is stored and registered in said mask data information registration step.

14. A document administration method according to claim 13, further comprising:

an original data comparison step of comparing the original data with the form information stored and registered in said form information registration step; and a correction step, when it is judged in said original data comparison step that the original data does not coincide with the form information, of correcting the original data so that the original data coincides with the form information.

15. A computer-executable program stored on a computer readable storage medium, the program for causing a computer to execute a document administration method, said program comprising code for:

an original data storage step of storing a plurality of sets of original data, each set of the plurality of sets of original data including a plurality of pages;

a mask data generation step of generating mask data to effect masking of at least one predetermined area of a certain one of the plurality of sets of the original data stored in said original data storage step, the mask data comprising a plurality of mask position patterns, each mask position pattern provided for a plurality of pages;

a mask data storage step of storing the plurality of mask position patterns generated in said mask data generation step, wherein the plurality of mask position patterns can be applied for the plurality of sets of original data stored in said original data storage step;

a selection step of selecting one of the plurality of mask position patterns stored in said mask data storage step;

a display step of displaying the mask position pattern selected in said selection step in a state such that the mask position pattern is superposed on the one set of original data, without changing the one set of original data; and an editing step of enabling to edit the mask position pattern displayed in said display step, wherein the masking is effected by applying an N-th page of the mask position pattern selected in said selection step to an N-th page of the plurality of pages forming the one set of original data stored in said original data storage step, wherein the masking is repeated for others of the plurality of sets of original data using the selected mask position pattern, and wherein the plurality of pages have different sizes.

16. A program according to claim 15, further comprising code for a display change step of instructing displaying and non-displaying of the mask data displayed in said display step.

17. A program according to claim 15, further comprising code for an output data generation step of generating output data based on the original data, wherein said output data generation step includes an output format holding step of holding output format information of the output data, an output format designation step of accepting designation of the output format information held in said output format holding step, and a subordinate output data generation step of generating the output data such that the output format information designated in said output format designation step is applied to the original data selected in said selection step.

18. A program according to claim 17, wherein said subordinate output data generation step compares a page constitution of the original data selected in said selection step with the output format information designated in said output format designation step, and processes the original data based on a compared result so that the original data coincides with the output format information.

19. A program according to claim 17, further comprising code for:

a cover data generation step of generating cover data constituting a part of the output data; and a cover data selection step of enabling to select the cover data generated in said cover data generation step, before the output data is generated in said output data generation step.

20. A program according to claim 15, wherein the mask data generated in said mask data generation step includes form information, the program further comprising code for:

a form information obtaining step of obtaining the form information from the mask data generated in said mask data generation step;

a form information registration step of adding, in units of form and in units of page constituting the form, inherent information to the form information obtained in said form information obtaining step, and storing and registering the obtained information;

a mask data information registration step of associating the inherent information in units of form stored and registered in said form information registration step with inherent information of the mask data, and storing and registering the associated information; and a form information comparison step of comparing the form information obtained in said form information obtaining step with the form information stored and registered in said form information registration step, wherein, when it is judged as a result of the comparison in said form information comparison step that the form information obtained in said form information obtaining step is the same as the form information already stored and registered in said form information registration step, the inherent information in units of form of the already stored and registered form information is associated with the mask data being the origin of the form information obtained in said form information obtaining step, and the associated information is stored and registered in said mask data information registration step.

21. A program according to claim 20, further comprising code for:

an original data comparison step of comparing the original data with the form information stored and registered in said form information registration step; and a correction step, when it is judged in said original data comparison step that the original data does not coincide with the form information, of correcting the original data so that the original data coincides with the form information.

\* \* \* \* \*